(12) United States Patent
Steege

(10) Patent No.: US 11,524,457 B2
(45) Date of Patent: Dec. 13, 2022

(54) METHOD AND APPARATUS FOR DIGITAL FABRICATION OF OBJECTS USING ACTUATED MICROPIXELATION AND DYNAMIC DENSITY CONTROL

(71) Applicant: Trio Labs, Inc., Morrisville, NC (US)

(72) Inventor: Adam T. C. Steege, Durham, NC (US)

(73) Assignee: TRIO LABS, INC., Morrisville, NC (US)

( * ) Notice: Subject to any disclaimer, the term of this patent is extended or adjusted under 35 U.S.C. 154(b) by 0 days.

(21) Appl. No.: 17/525,781

(22) Filed: Nov. 12, 2021

(65) Prior Publication Data
US 2022/0063196 A1    Mar. 3, 2022

Related U.S. Application Data

(63) Continuation of application No. 17/438,853, filed as application No. PCT/US2020/021378 on Mar. 6, 2020.
(Continued)

(51) Int. Cl.
*B29C 64/165* (2017.01)
*B29C 64/268* (2017.01)
(Continued)

(52) U.S. Cl.
CPC ............ *B29C 64/268* (2017.08); *B22F 10/12* (2021.01); *B22F 12/42* (2021.01); *B28B 1/001* (2013.01);
(Continued)

(58) Field of Classification Search
CPC ....... B33Y 10/00; B33Y 30/00; B29C 64/165; B29C 64/268; B29C 64/153; B29C 64/277; B22F 10/12; B22F 12/42; B28B 1/001
See application file for complete search history.

(56) References Cited

U.S. PATENT DOCUMENTS 5,697,043 A * 12/1997 Baskaran .............. C04B 35/636
419/36
6,596,224 B1   7/2003 Sachs et al.
(Continued)

FOREIGN PATENT DOCUMENTS

WO   WO 2016/164629 A1   10/2016
WO   WO 2017/147434 A1   8/2017
(Continued)

OTHER PUBLICATIONS

WO, International Search Report and Written Opinion, Application No. PCT/US20/21378, dated Jul. 17, 2020.
(Continued)

*Primary Examiner* — Joseph S Del Sole
*Assistant Examiner* — Jamel M Nelson
(74) *Attorney, Agent, or Firm* — Orrick, Herrington & Sutcliffe LLP

(57) ABSTRACT

A fabrication device includes a build surface to receive layers of material for production of a 3-dimensional solid representation of a digital model and an imaging component to bind respective portions of the build material into cross sections representative of portions of data contained in the digital model. The imaging component may be a programmable planar light source utilizing a micropixelation system and refractive pixel shifting mechanism, or other imaging system. The device may include a system for controlling the density of the printed part. The object may be a powder composite component using any of a variety of powder materials or a plastic component. The object may be further post-processed to produce a high precision metal or ceramic component.

15 Claims, 58 Drawing Sheets

Related U.S. Application Data

(60) Provisional application No. 62/817,431, filed on Mar. 12, 2019.

(51) Int. Cl.

| | | |
|---|---|---|
| *B33Y 10/00* | (2015.01) | |
| *B33Y 30/00* | (2015.01) | |
| *B29C 64/153* | (2017.01) | |
| *B29C 64/277* | (2017.01) | |
| *B22F 10/12* | (2021.01) | |
| *B22F 12/42* | (2021.01) | |
| *B28B 1/00* | (2006.01) | |

(52) U.S. Cl.
CPC .......... *B29C 64/153* (2017.08); *B29C 64/165* (2017.08); *B29C 64/277* (2017.08); *B33Y 10/00* (2014.12); *B33Y 30/00* (2014.12)

(56) References Cited

U.S. PATENT DOCUMENTS

| | | | | |
|---|---|---|---|---|
| 2003/0159798 A1* | 8/2003 | Jiang | ........................ | B22C 1/183 |
| | | | | 164/349 |
| 2016/0325495 A1* | 11/2016 | Kuhn | .................... | C04B 35/522 |
| 2017/0165748 A1* | 6/2017 | Kamachi | ................ | B33Y 10/00 |
| 2018/0025797 A1* | 1/2018 | Van Rooyen | .......... | B33Y 70/10 |
| | | | | 376/416 |
| 2018/0072630 A1* | 3/2018 | Beaman | .................. | C04B 35/64 |
| 2018/0141270 A1 | 5/2018 | Steege | | |
| 2019/0009464 A1* | 1/2019 | Steege | .................... | B22F 10/10 |
| 2019/0168299 A1* | 6/2019 | Prichard | ................. | B33Y 70/00 |
| 2019/0343769 A1* | 11/2019 | Kasperchik | ............ | B33Y 70/00 |

FOREIGN PATENT DOCUMENTS

| | | | |
|---|---|---|---|
| WO | WO 2019/028215 A1 | 2/2019 | |
| WO | WO-2019028215 A1 * | 2/2019 | ............. B22F 10/00 |

OTHER PUBLICATIONS

Shirazi, Seyed Farid Syed, et al. "A Review on powder-based additive manufacturing fortissue engineering: selective laser sintering and inkjet 3D printing", *Science and Technology of Advanced Materials*, vol. 16, pp. 1-20, May 5, 2015 (May 5, 2015) Abstract.
IN, Indian First Examination Report, Application No. 202117046474, dated Mar. 29, 2022.

\* cited by examiner

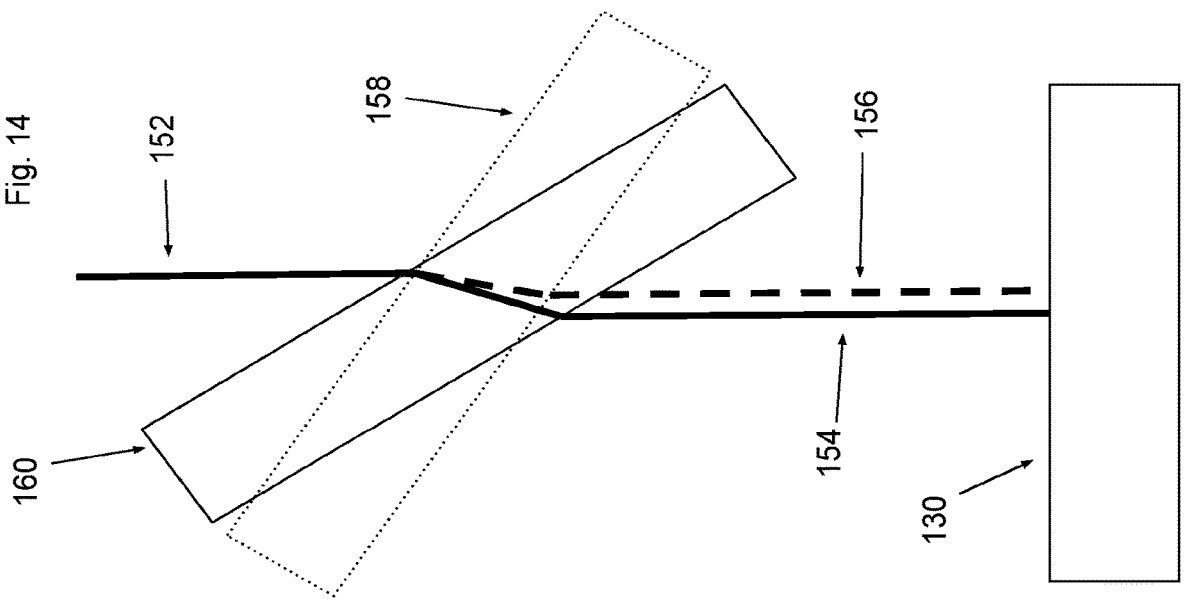
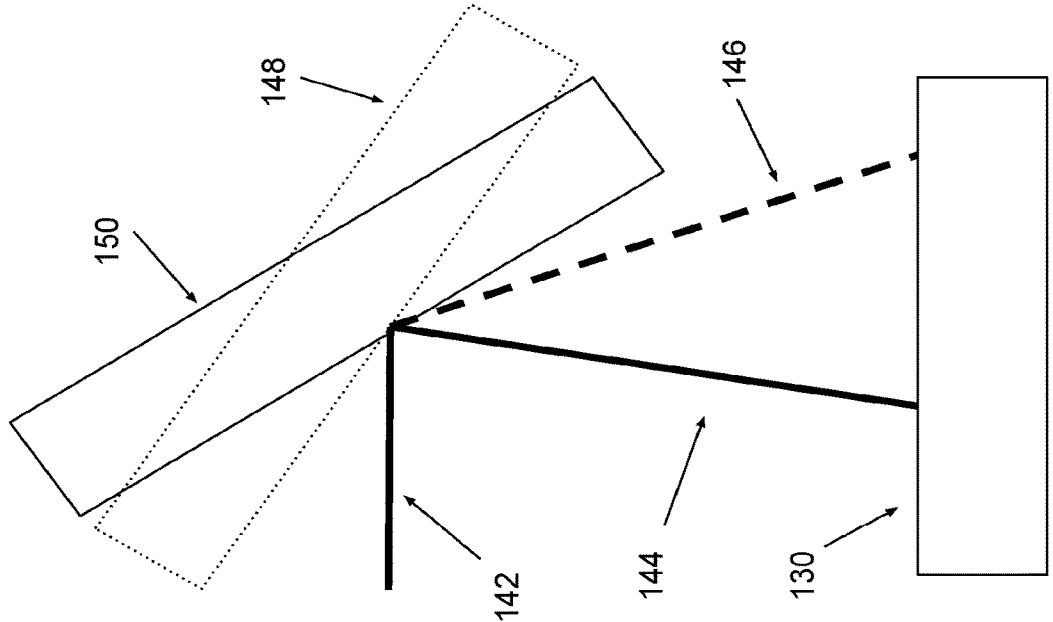

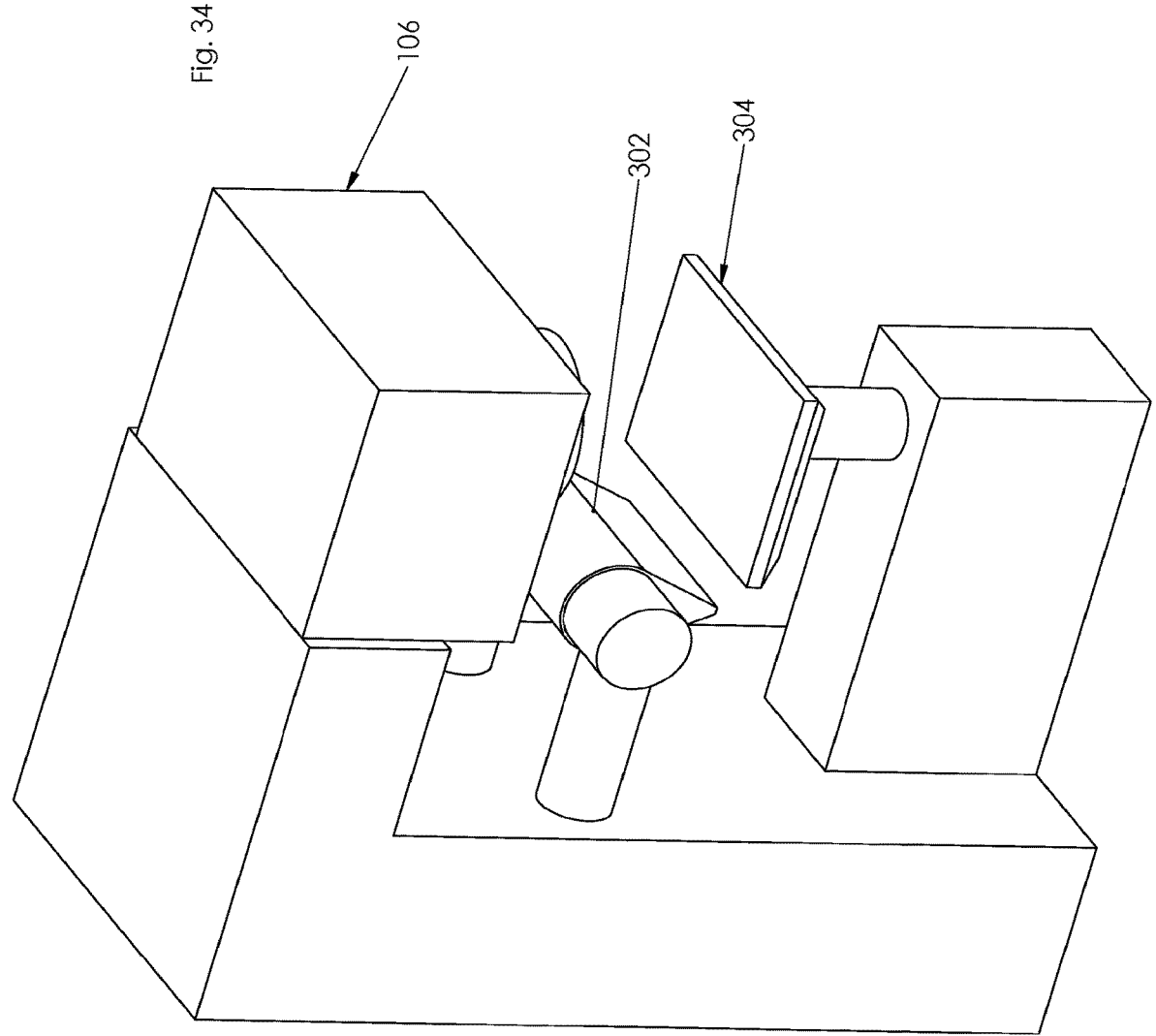

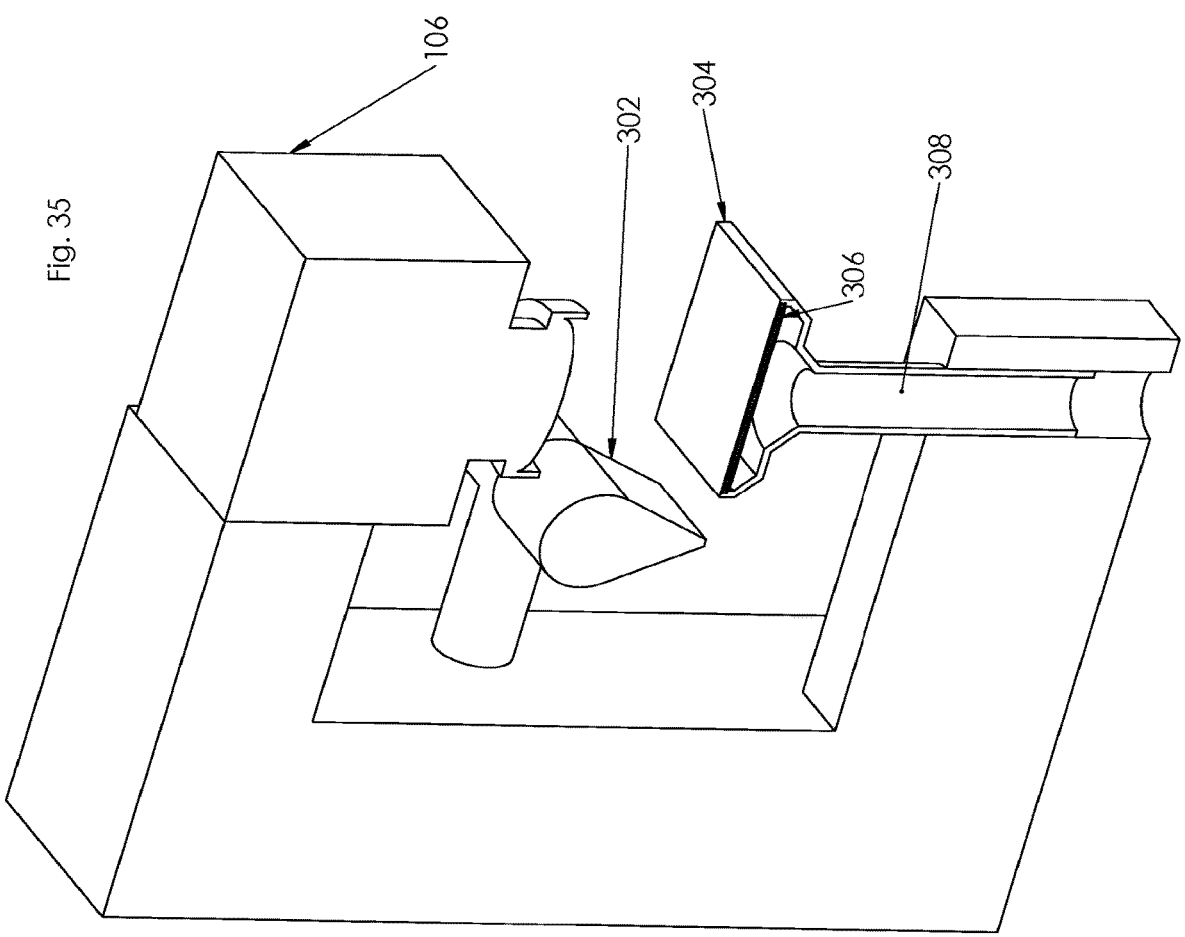

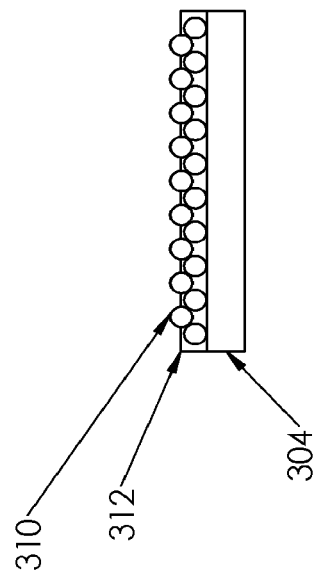
Fig. 36
Fig. 37
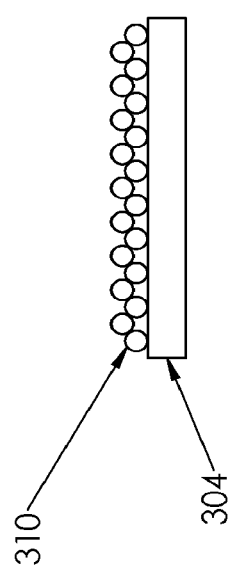
Fig. 38
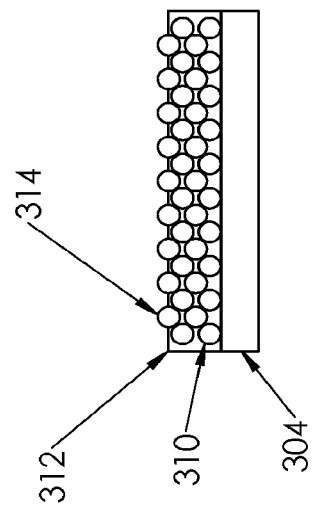
Fig. 39

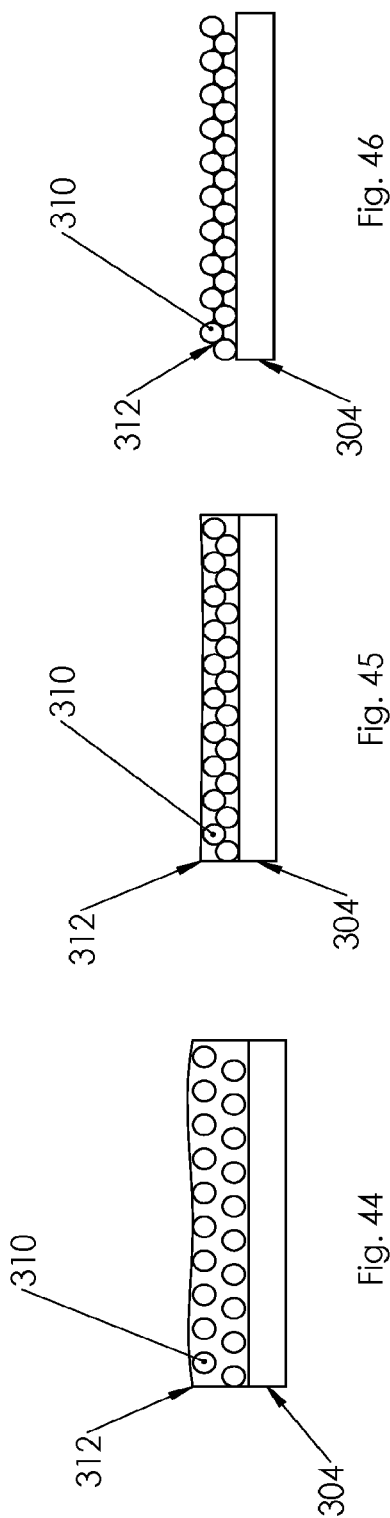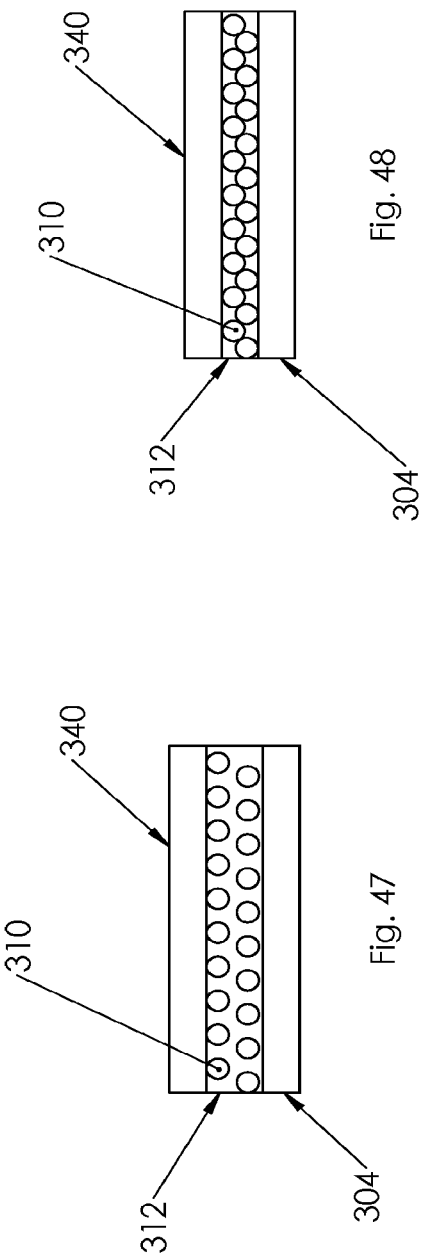

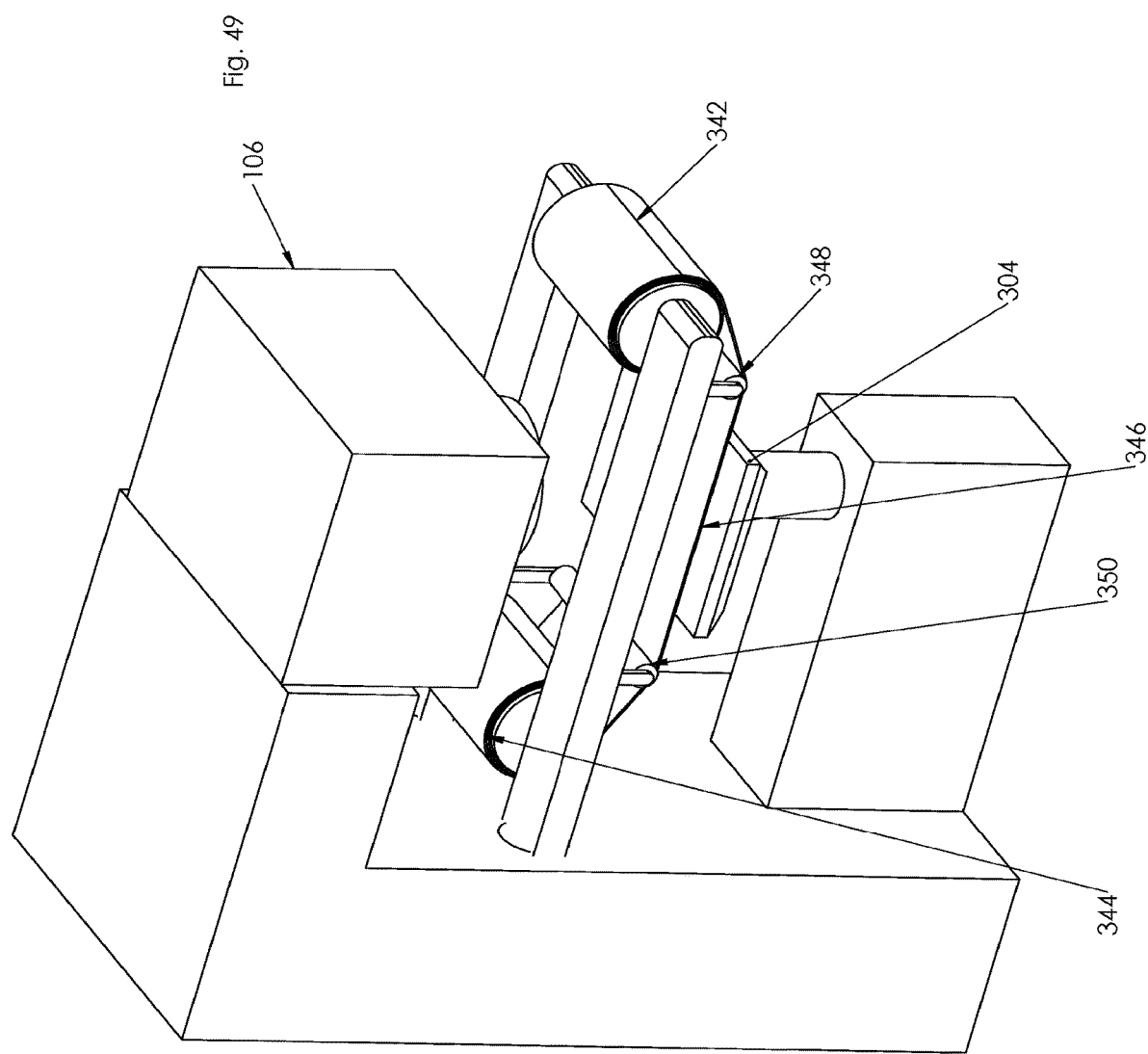

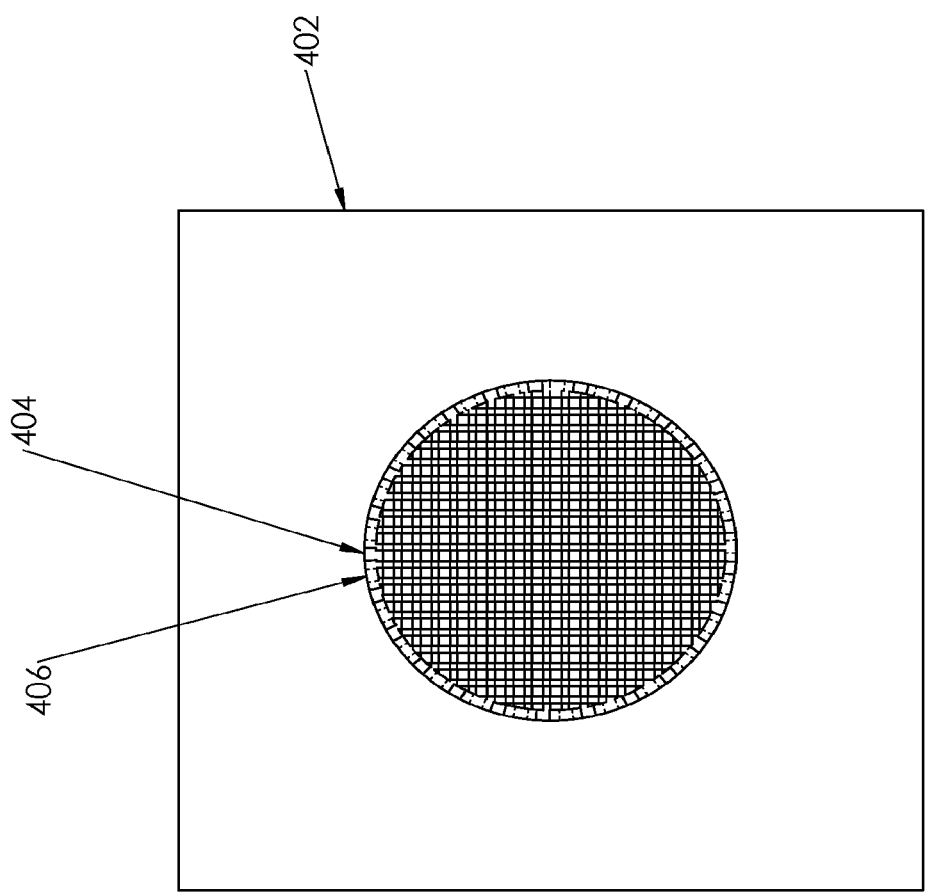

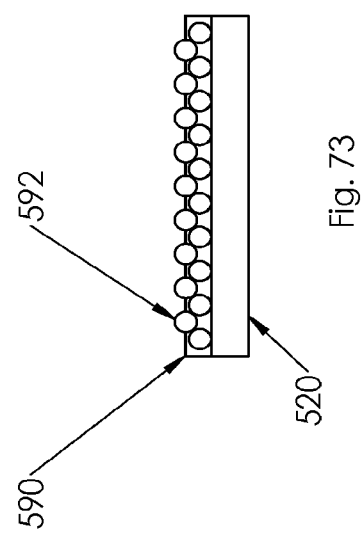
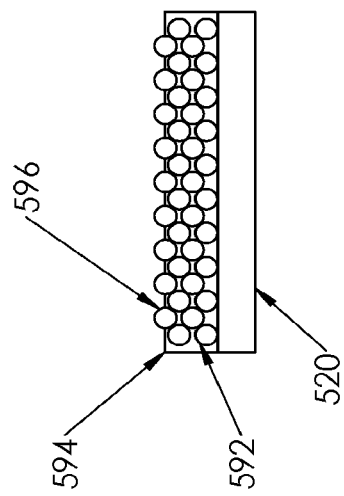
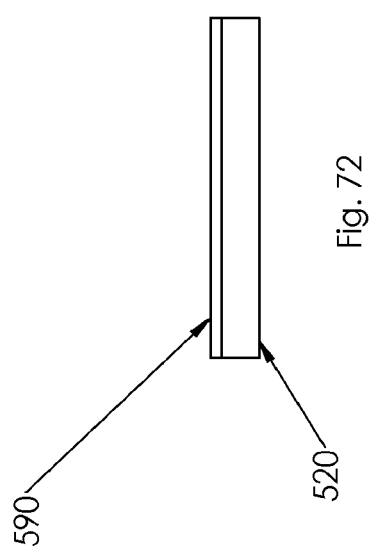
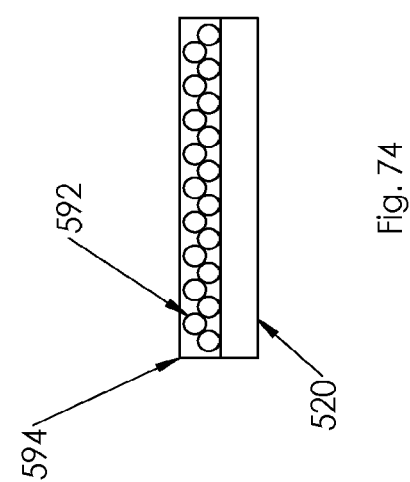

METHOD AND APPARATUS FOR DIGITAL FABRICATION OF OBJECTS USING ACTUATED MICROPIXELATION AND DYNAMIC DENSITY CONTROL

CROSS-REFERENCE TO RELATED APPLICATION

The present application is a continuation application of co-pending U.S. application Ser. No. 17/438,853, filed Sep. 13, 2021, which is the National Phase of PCT application No. PCT/US2020/021378 filed Mar. 6, 2020, which claims priority to U.S. Provisional Patent Application Ser. No. 62/817,431, filed Mar. 12, 2019, the disclosure of which is incorporated herein by reference in its entirety.

TECHNICAL FIELD

The subject matter disclosed herein relates generally to solid freeform fabrication of objects. More particularly, the subject matter disclosed herein relates to systems, devices, and methods for solid freeform fabrication of objects from metal, plastic, ceramic, and composite materials comprising combinations of one or more types of material.

BACKGROUND

Embodiments described herein generally relate to devices and methods for the solid freeform fabrication of objects from metal, plastic, ceramic, and composite materials comprising combinations of one or more types of material.

Additive manufacturing (AM), also known as solid freeform fabrication (SFF), 3D printing (3DP), direct digital manufacturing (DDM), and solid imaging, has increasingly become a widely adopted method of prototyping both visually demonstrative and functional parts. In some instances, this has become a cost effective means for production manufacturing as well. A wide variety of means for producing components based on digital models exist, and all have reduced the time and cost required for a complete design cycle, which has improved the pace of innovation in many industries.

Generally, SFF is accomplished in a layerwise fashion, where a digital model is split into horizontal slices, and each slice is produced as a 2D image on a build surface. The sequential fabrication of these slices produces an aggregate collection of thin layers which collectively compose the 3 dimensional object represented by the digital model. In contrast to traditional fabrication techniques, such as Computer Numerically Controlled (CNC) machining, injection molding, and other means, SFF has markedly reduced production time and cost, and as such has been widely adopted for research and development purposes where low volume production with traditional means would be exceedingly expensive. Additionally, SFF devices generally require less expertise to operate when compared to CNC machines. The cost of individual parts produced from CNC machines is generally higher, owing to longer setup times and higher costs of machine operation. CNC-produced parts will often have stronger and more detailed features than SFF-produced parts, which may make them desirable for some applications. Until SFF techniques can produce parts with the resolution and functionality of CNC-produced parts, the usage of SFF in part production will remain constrained.

Powder Injection Molding (PIM) is a mass production technique which has been widely adopted as a means of producing high precision components in materials which would not traditionally be possible with other molding methods. A powder is blended with a resin binder to form an injection feedstock, which is injected into a mold, similar to plastic injection molding. The part produced is a powder composite part, called a "green" part. The green part is subjected to a process called debinding, in which most of the binder is removed. The resulting part is called a "brown" part. This brown part is then subjected to thermal treatment to cause the powder particles to sinter together. The part shrinks during this process, and voids between the powder particles are removed. They final result is a part with near full density. Further post-processing may be utilized to achieve over 99.5% density, depending on the composition of the powder feedstock that was utilized.

Some of the most common techniques for SFF include stereolithography (SLA), selective deposition modeling (SDM), fused deposition modeling (FDM), and selective laser sintering (SLS). These approaches vary in the type of materials they can use, the manner in which layers are created, and the subsequent resolution and quality of parts produced. Typically, layers are produced in a bulk material deposition method, or in a selective material deposition method. In techniques that employ a bulk deposition method for layer production, layer imaging is typically accomplished by a thermal, chemical, or an optical process. There is one technology, binder jetting, which utilizes inkjet print heads to deposit binder into a powder bed to produce a part similar to the previously described green part in a PIM process. This green part can be post-processed in the same manner to produce a final component. Unfortunately, due to imperfections in the process of producing the green part, the final components produced through this process often fail to meet tolerances for high precision applications, particularly when it comes to surface finish. Additionally, the precision and speed of the binder jetting process is limited.

SUMMARY OF THE INVENTION

Embodiments of a device for solid freeform fabrication and associated methods are herein disclosed for the production of components (e.g., plastic, metal, and ceramic parts) for a variety of applications.

In some embodiments, the SFF methods and devices disclosed herein may include a surface for receiving layers of material for production of a 3-dimensional solid representation of a digital model, a component or components for depositing the required layers of build material, and a component or components for imaging the build material into cross sections representative of data contained in a digital model. In one embodiment, the build material is composed of a particulate material and a photocurable resin material. The combination of these materials at the build surface overcomes the rheological constraints of aforementioned devices which have been used to produce powder composite parts. In another embodiment, the build material is a photocurable resin material for the production of a polymer component. In another embodiment, the materials may be blended in advance of the build process, and the density of the blend may be altered during the build process to optimize the properties of the printed part.

In addition, in some embodiments, the methods and devices described below may utilize particulate material (e.g., ceramic, plastic, or metal) as one of the build materials. Parts produced from this device may be treated after the build process is complete to facilitate bonding between adjacent particles. Such treatment includes but is not limited to thermal, chemical, and pressure treatment, and combinations of these. The results of this fabrication and treatment process include but are not limited to solid metal parts, solid ceramic parts, solid plastic parts, porous metal parts, porous ceramic parts, porous plastic parts, solid composite plastic parts, and composite parts comprising one or more types of material.

Material deposition of particulate material may be achieved through several means, including but not limited to spreading via a blade mechanism, spreading via a combination of a powder metering system and blade mechanism, spreading via a combination of a powder metering system and a roller mechanism, electrostatic deposition on a transfer surface followed by deposition to a build surface, and electrostatic deposition to a roller mechanism followed by deposition to the build surface. Infusion of a photocurable material (e.g., resin) may be achieved through infusion through the body of the component being built via a specialized infusion build platform. Further methods of material deposition and in situ material blending will be described hereinbelow.

Additionally, methods of production of layers of a slurry blend of powder and binder may include spray deposition, dispensing the material via a pumping system, or other methods for dispensing methods for a viscous fluid. Layer production may further involve conditioning via a blade, a film imaging window, a film reinforced by a solid surface, or other methods to control layer thickness and uniformity.

Layer imaging may be achieved through several means, including but not limited to bulk imaging with a programmable planar light source, such as a DLP projector, wherein a refractive pixel shifting system is utilized to increase the effective resolution of the projection system. Pixels may be altered via a microlens system to further improve the resolution of the imaging process.

Further, in one aspect a solid freeform fabrication device is provided such that objects may be produced using a photocurable resin material in accordance with digital data representative of a given three dimensional object.

In another aspect, a SFF device is provided which may produce composite objects composed of particulate material and photocurable resin material.

In another aspect, a SFF device is provided which utilizes bulk deposition techniques for production of layers of material.

In another aspect, a SFF device is provided which combines particulate material with photocurable resin material for production of composite layers of material.

In another aspect, a SFF device is provided which allows for interchangeability of material components to enable the use of a wide variety of material combinations.

In another aspect, a SFF device is provided which achieves production of composite layers through in situ infusion of powder layers.

In another aspect, a SFF device is provided in situ combination of materials using an infusion platform.

In another aspect, a SFF device is provided which utilizes micropixelation in order to achieve improved resolution.

In another aspect, a SFF device is provided which utilizes means for pixel shifting to achieve improved resolution.

In another aspect, objects produced from an SFF device may be treated thermally, chemically, or mechanically to improve internal adhesion of material components.

In another aspect, a feedback system may be used to optimize the rate of material deposition.

In another aspect, blended feedstocks may be used which are altered during the build process in order to increase particulate loading density in a printed part.

In another aspect, printed parts may be treated chemically to improve surface quality prior to thermal treatment to achieve a high final density.

Further features of the subject invention will become more readily apparent from the following detailed description of the invention taken in conjunction with the accompanying drawings.

BRIEF DESCRIPTION OF THE DRAWINGS

Preferred embodiments of the subject invention will be described hereinbelow with reference to the drawings, wherein

FIG. 13 is a schematic representation of a reflective beam guidance system.

FIG. 14 is a schematic representation of a refractive beam guidance system.

FIG. 34 is an elevated perspective view of a second embodiment of a machine for solid freeform fabrication according to an embodiment of the presently disclosed subject matter.

FIG. 35 is a sectional view of the machine in FIG. 34.

FIG. 36 is a schematic representation of a first step of a materials handling process that may be used by the machine in FIG. 34.

FIG. 37 is a schematic representation of a second step of a materials handling process that may be used by the machine in FIG. 34.

FIG. 38 is a schematic representation of a third step of a materials handling process that may be used by the machine in FIG. 34.

FIG. 39 is a schematic representation of a fourth step of a materials handling process that may be used by the machine in FIG. 34.

FIG. 44 is a schematic representation of a first step of a materials handling process that may be used by the machine in FIG. 40.

FIG. 45 is a schematic representation of a second step of a materials handling process that may be used by the machine in FIG. 40.

FIG. 46 is a schematic representation of a third step of a materials handling process that may be used by the machine in FIG. 40.

FIG. 47 is a schematic representation of a first step of an alternate materials handling process that may be used by the machine in FIG. 40.

FIG. 48 is a schematic representation of a second step of an alternate materials handling process that may be used by the machine in FIG. 40.

FIG. 49 is an elevated perspective view of a fourth embodiment of a machine for solid freeform fabrication according to an embodiment of the presently disclosed subject matter.

FIG. 55 is a top view of an image which may be used to fabricate a second layer of the object in FIG. 53.

FIG. 72 is a schematic representation of a first step of a materials handling process that may be used by the machine in FIG. 71.

FIG. 73 is a schematic representation of a second step of a materials handling process that may be used by the machine in FIG. 71.

FIG. 74 is a schematic representation of a third step of a materials handling process that may be used by the machine in FIG. 71.

FIG. 75 is a schematic representation of a fourth step of a materials handling process that may be used by the machine in FIG. 71.

DETAILED DESCRIPTION OF THE DRAWINGS

Figure 1:
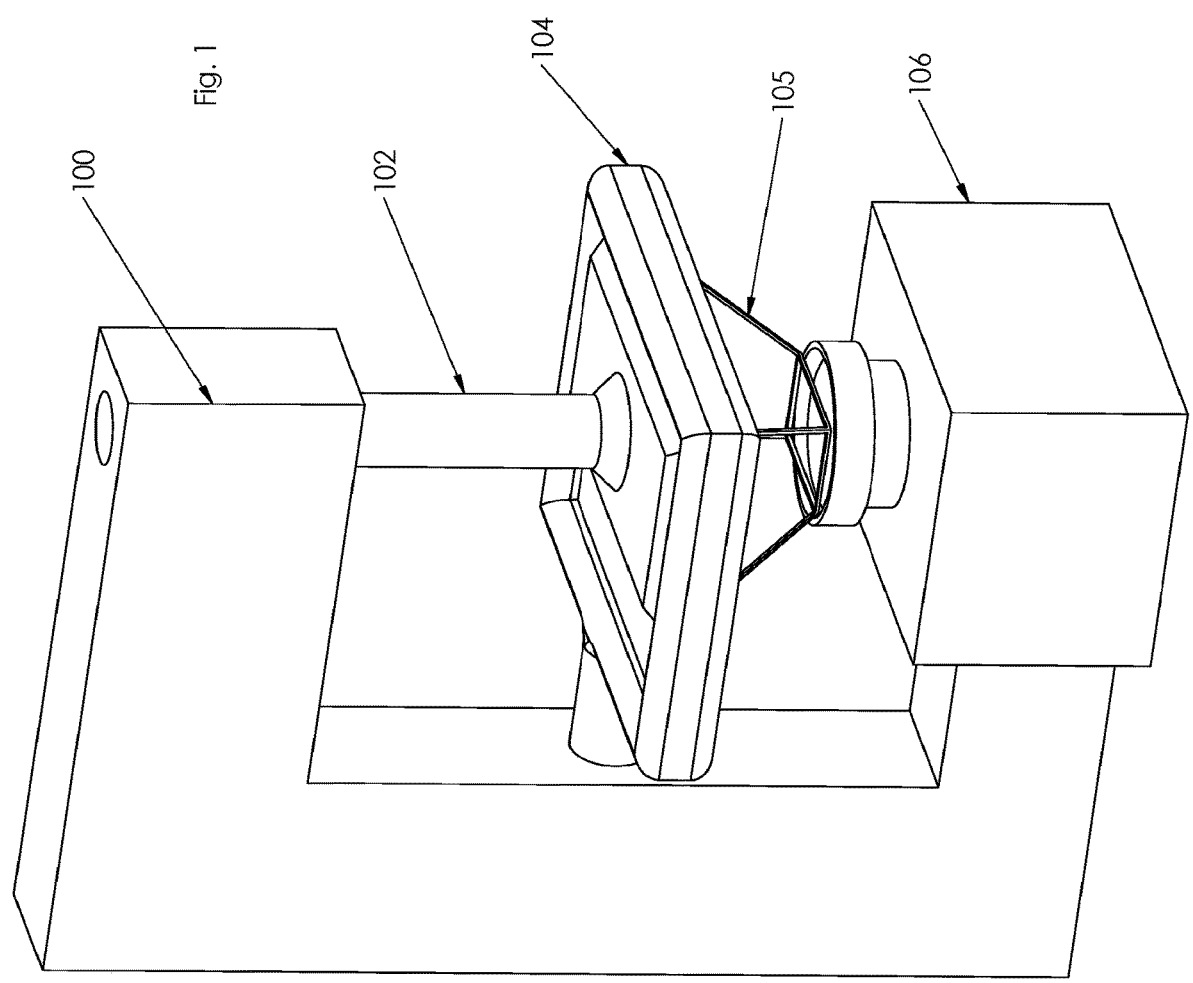
FIG. 1 is an elevated perspective view of a machine for solid freeform fabrication according to an embodiment of the presently disclosed subject matter.
Figure 2:
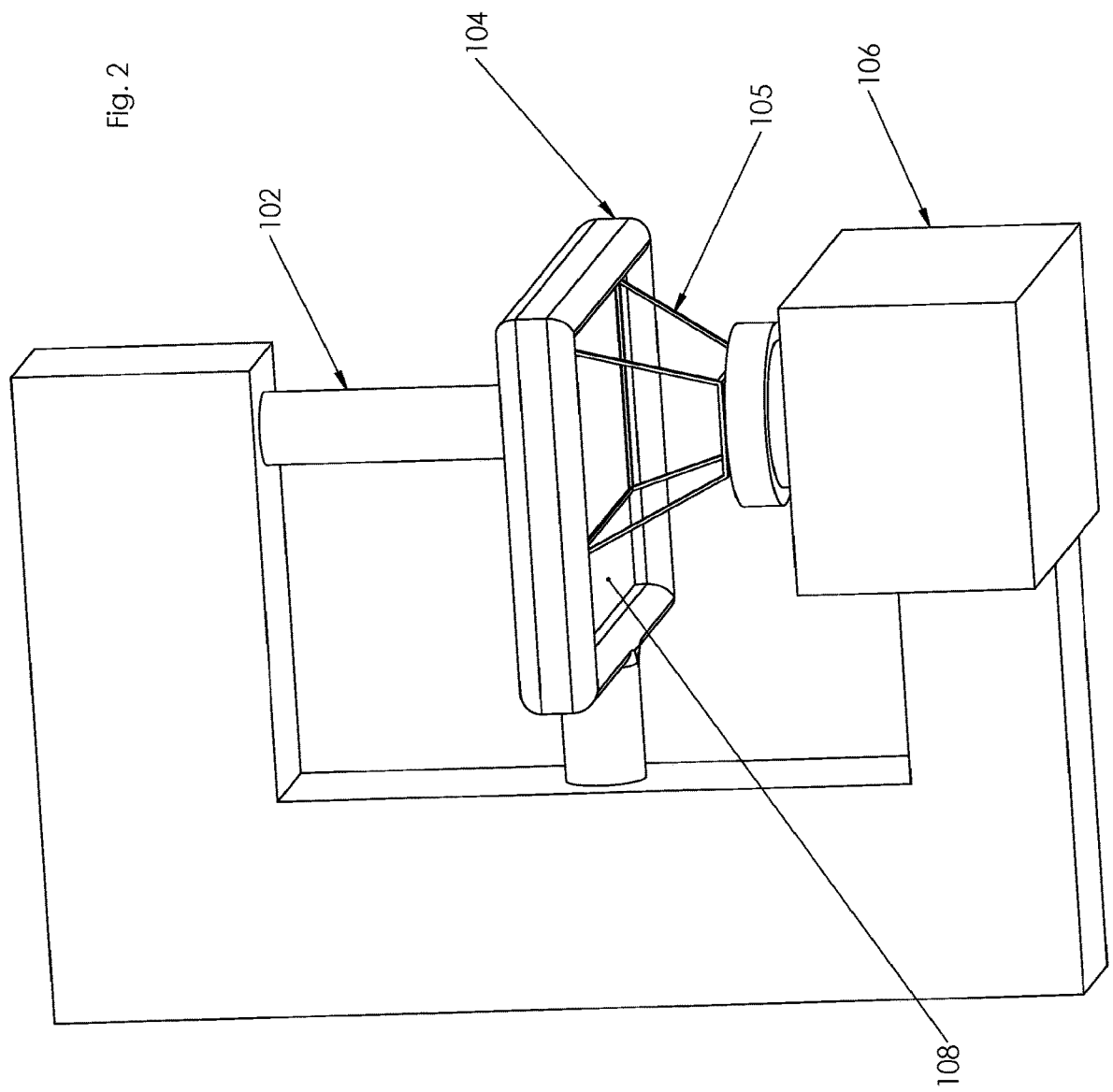
FIG. 2 is a perspective view from below of the machine in FIG. 1.
Figure 3:
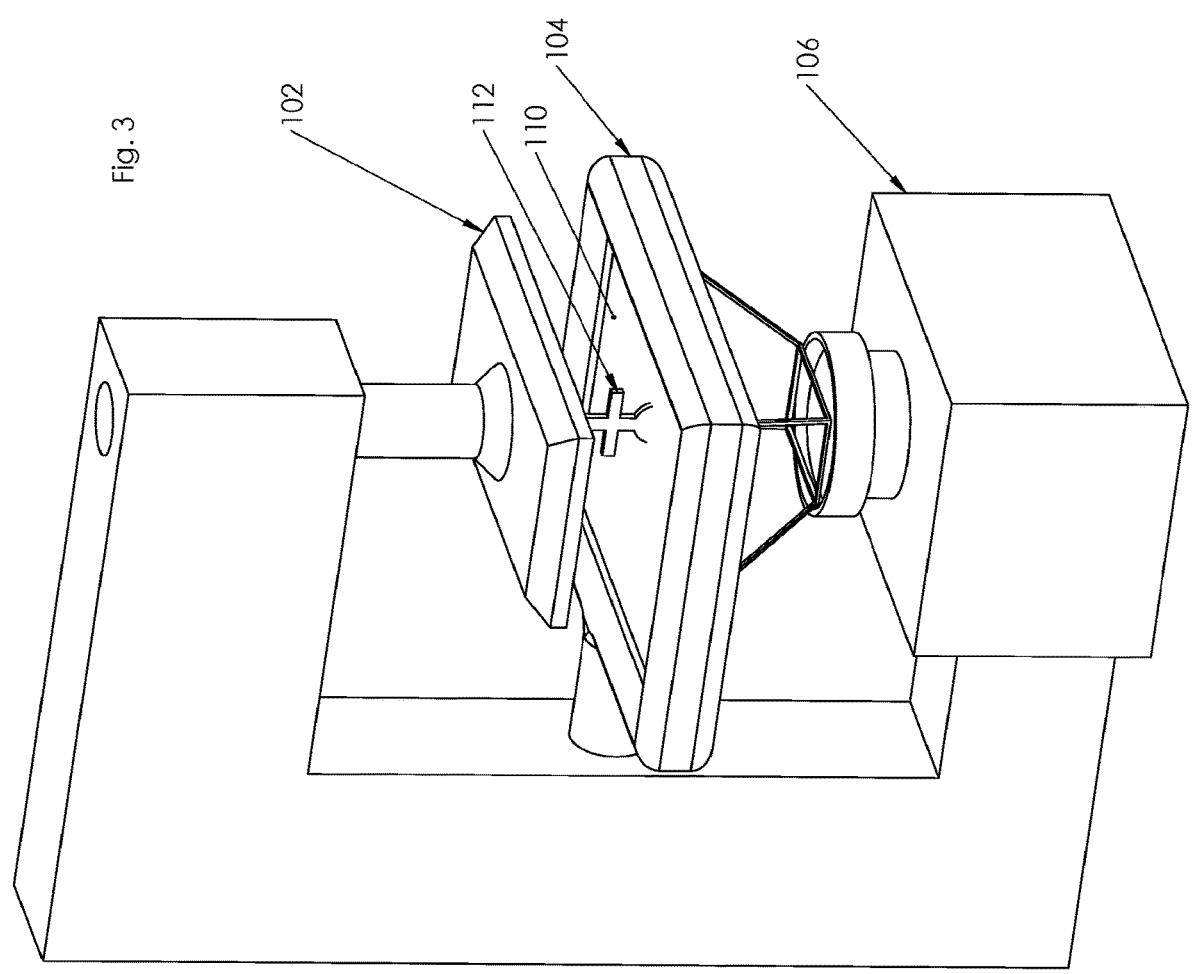
FIG. 3 is a perspective view of the machine in FIG. 1 in a second configuration.
Figure 4:
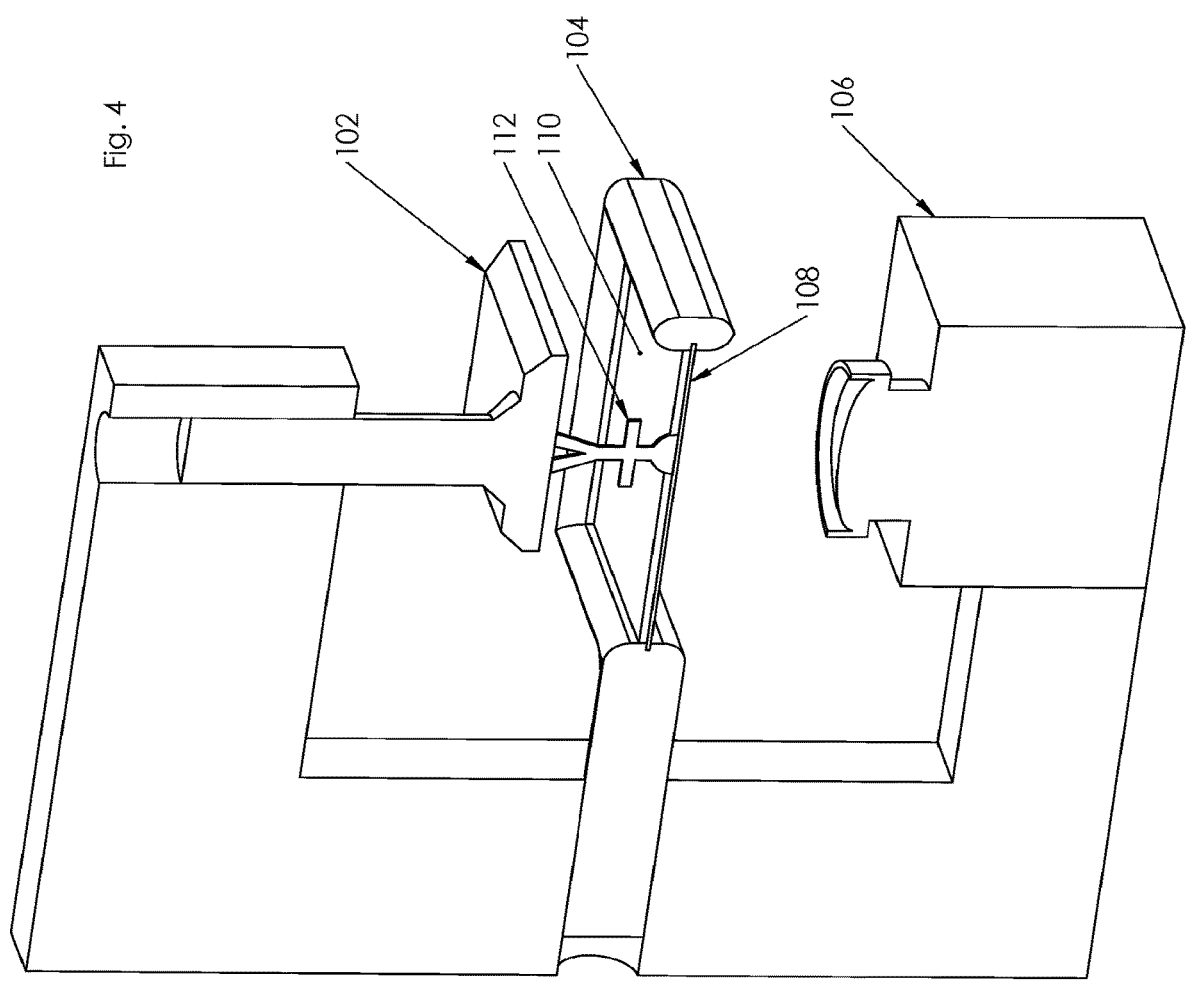
FIG. 4 is a sectional view of the machine in FIG. 3.

Stereolithography (SLA) fabrication utilizes photopolymer resin and a polymerizing source of radiation to produce three dimensional objects. FIGS. 1-5 depict a system (100) which implements this concept. In this implementation, a build platform (102) is lowered into a vat (104) containing resin (110). An image (105) is projected by a projection unit (106) through a window (108) into the resin (110) in order to solidify part of the resin (110) to form a solid component (112) in a layerwise fashion. After a given layer is at least partially cured, the platform (102) moves up to allow resin (110) to flow underneath the part (112) to provide material for the next layer.

This system may in general be used to process any photopolymer resin material or mixture of photopolymer resin and powder. In some cases, a powder composite component may be produced by this method which is then post-processed to remove the polymer binder and to sinter the powder material into a solid component. The powder material in question may in general be metal or ceramic or any combination of sinterable material(s).

Figure 5:
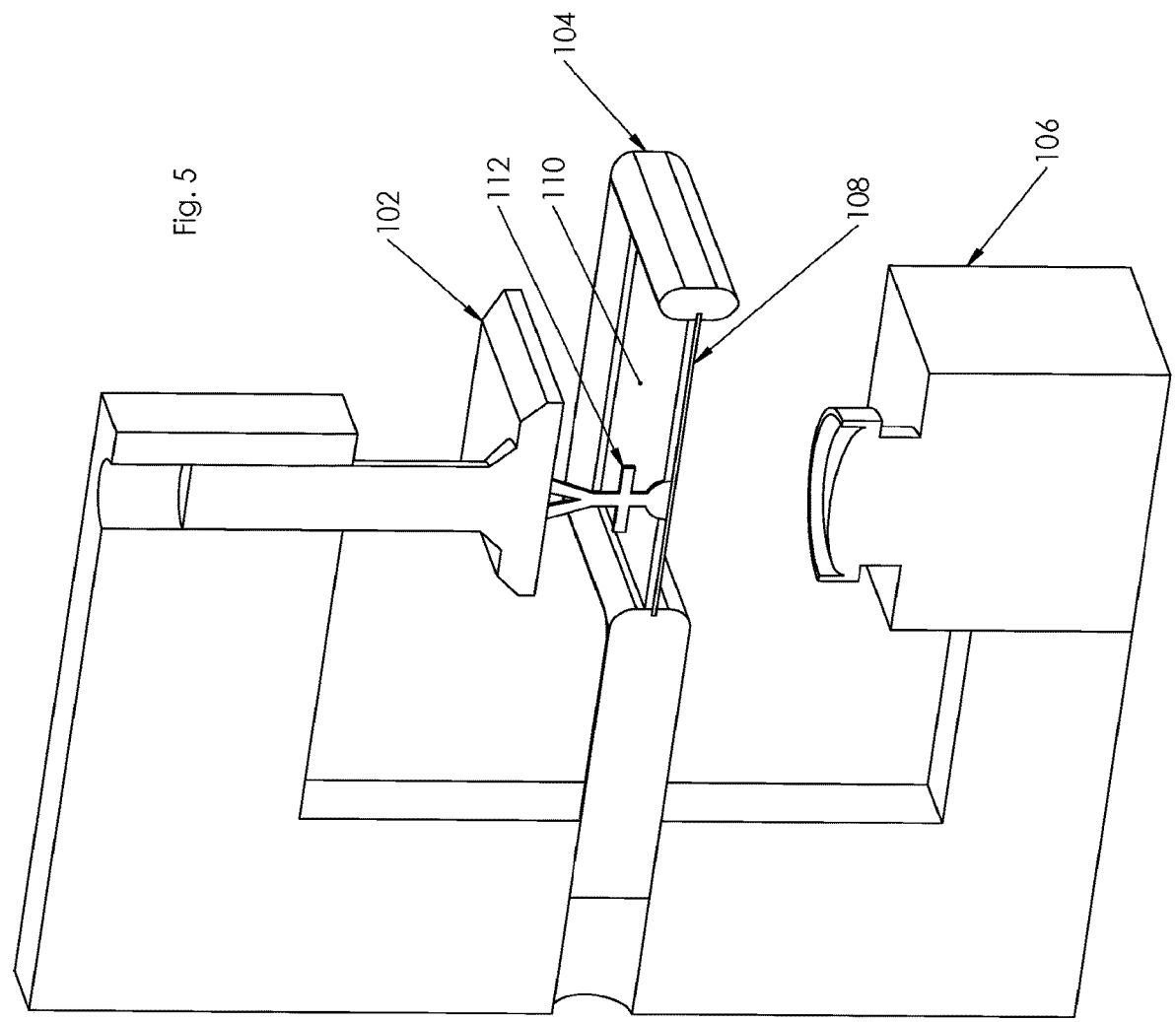
FIG. 5 is a sectional view of the machine in FIG. 3 in a third configuration.

In the case where a powder composite component is being produced, and in many cases where the resin material has a high viscosity, there is a speed limitation to this process that is presented by the flowability of the material. FIG. 5 depicts the build vat (104) being moved to apply a shear force to the part being built (112) and the resin (110) in the vat (104). This shearing action aids in disconnecting the most recently cured layer from the window (108) and also forces additional material to flow underneath the part (112) in order to produce the next layer.

Figure 6:
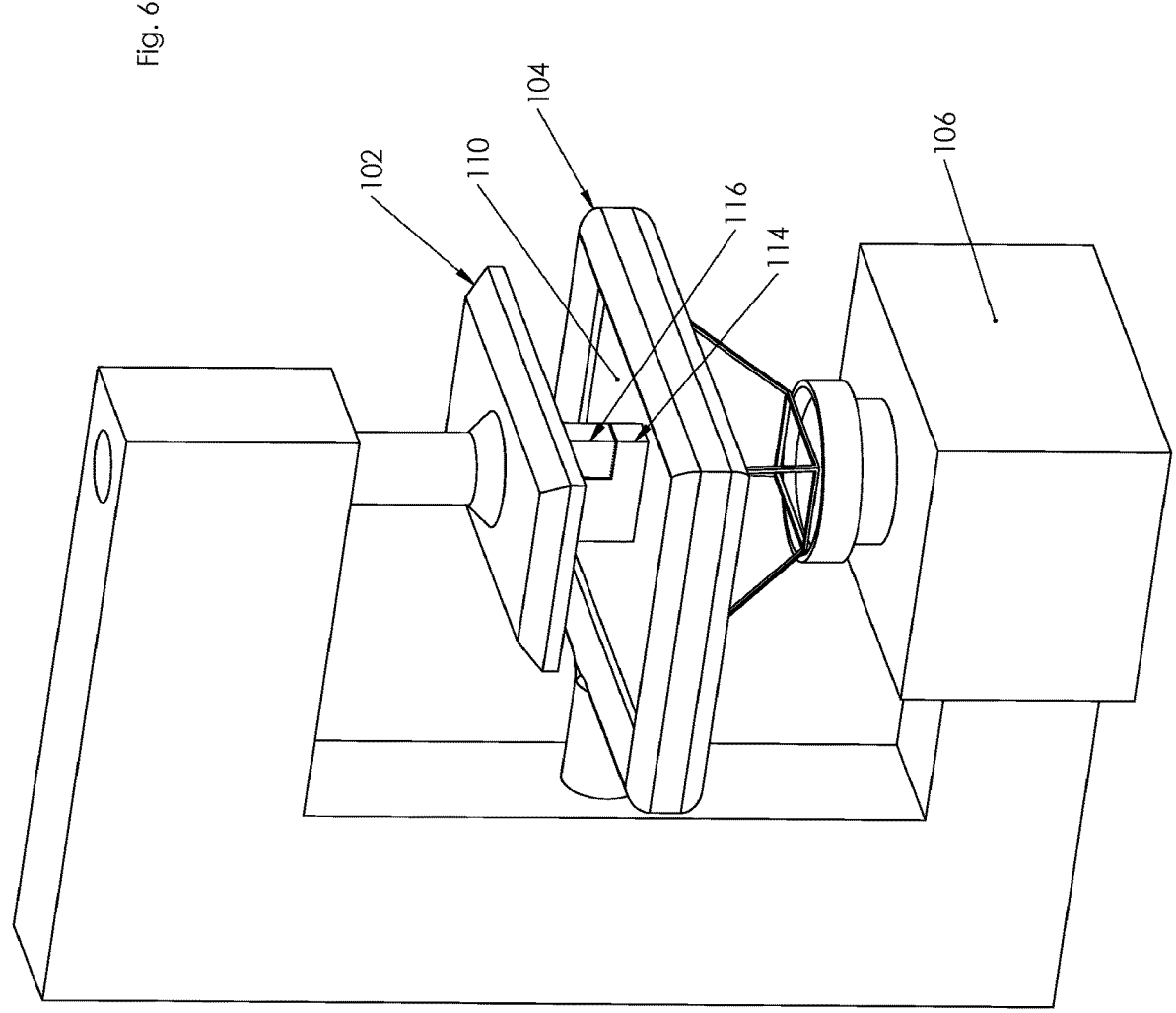
FIG. 6 is an elevated perspective view of an alternate embodiment of the machine in FIG. 1.
Figure 7:
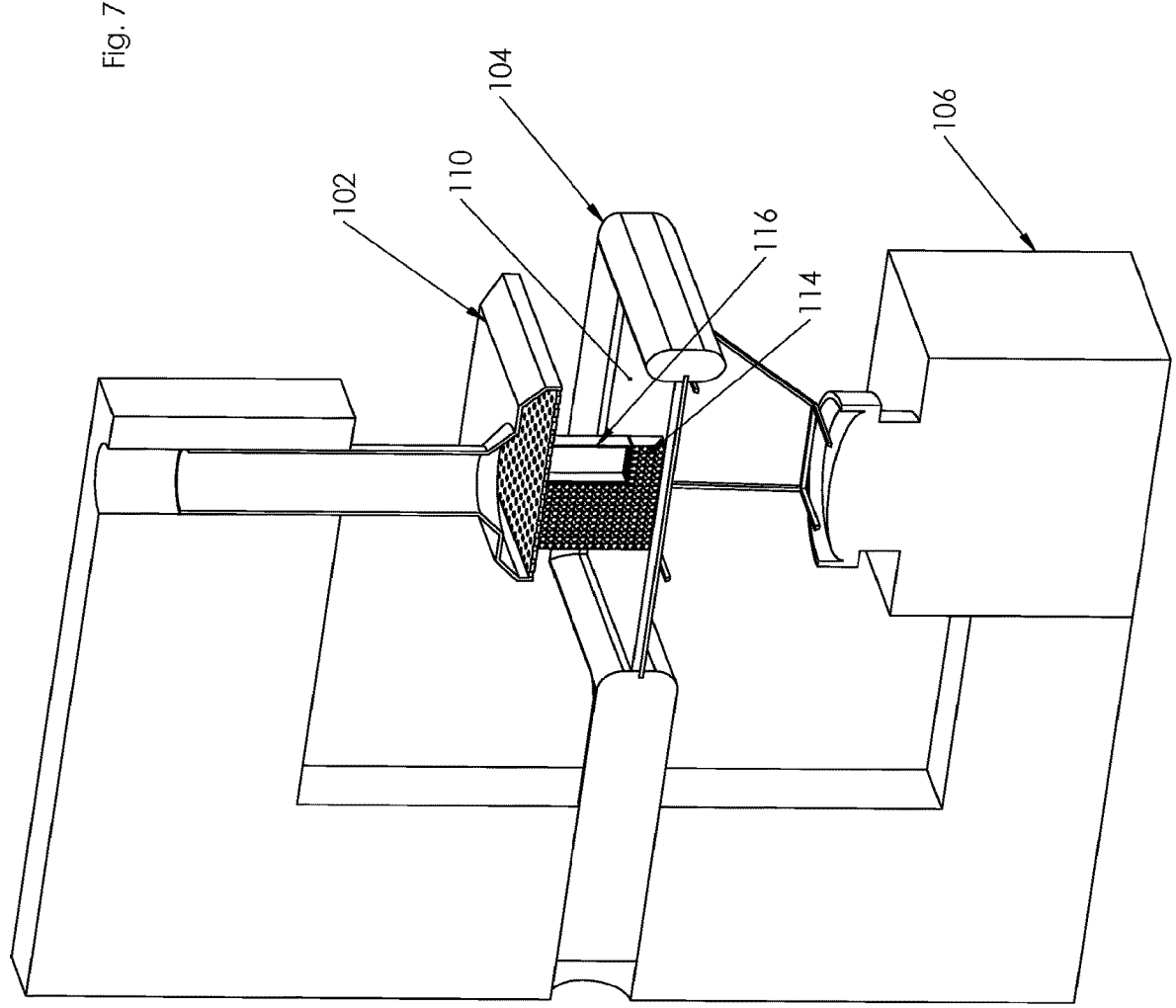
FIG. 7 is a sectional view of the machine in FIG. 6.
Figure 8:
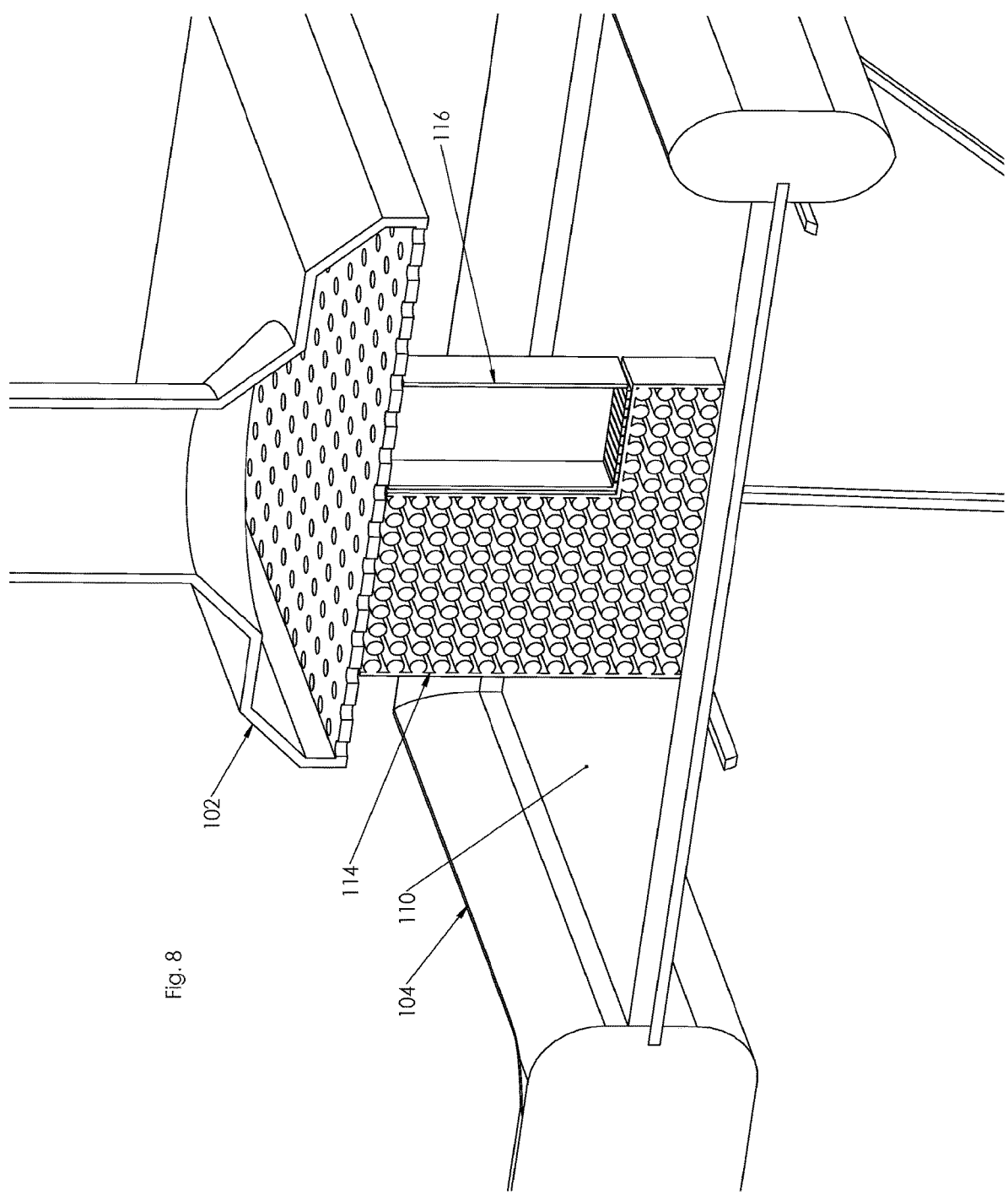
FIG. 8 is a magnified sectional view of the machine in FIG. 6 during a fabrication process.

FIGS. 6-8 depict an alternate implementation of this system, wherein a build platform (102) has a porous build surface and a fluid pathway contained within for fluid to be pumped into the part (114) being built or suctioned away from it. In one embodiment, a part (114) is built in a similar manner as to what has previously been described, with the part (114) having a porous inner structure. Resin (110) may be pumped through the build platform (102) and through the part (114) to collect in the build vat (114). Pressure from this surplus resin supply may assist with separating the part (114) from the build window (108) after a layer has been cured. In order to produce a final solid part, the part (114) may be post-cured to solidify any resin (110) remaining within it after the build process is completed. In order to maintain a fluid connection to overhanging features, a support structure (116) may be built underneath any overhanging features of the part (114) such that the support structure (116) has a hollow overall structure, and a porous face allowing for fluid communication to overhanging features of the part (114) being printed.

Figure 9:
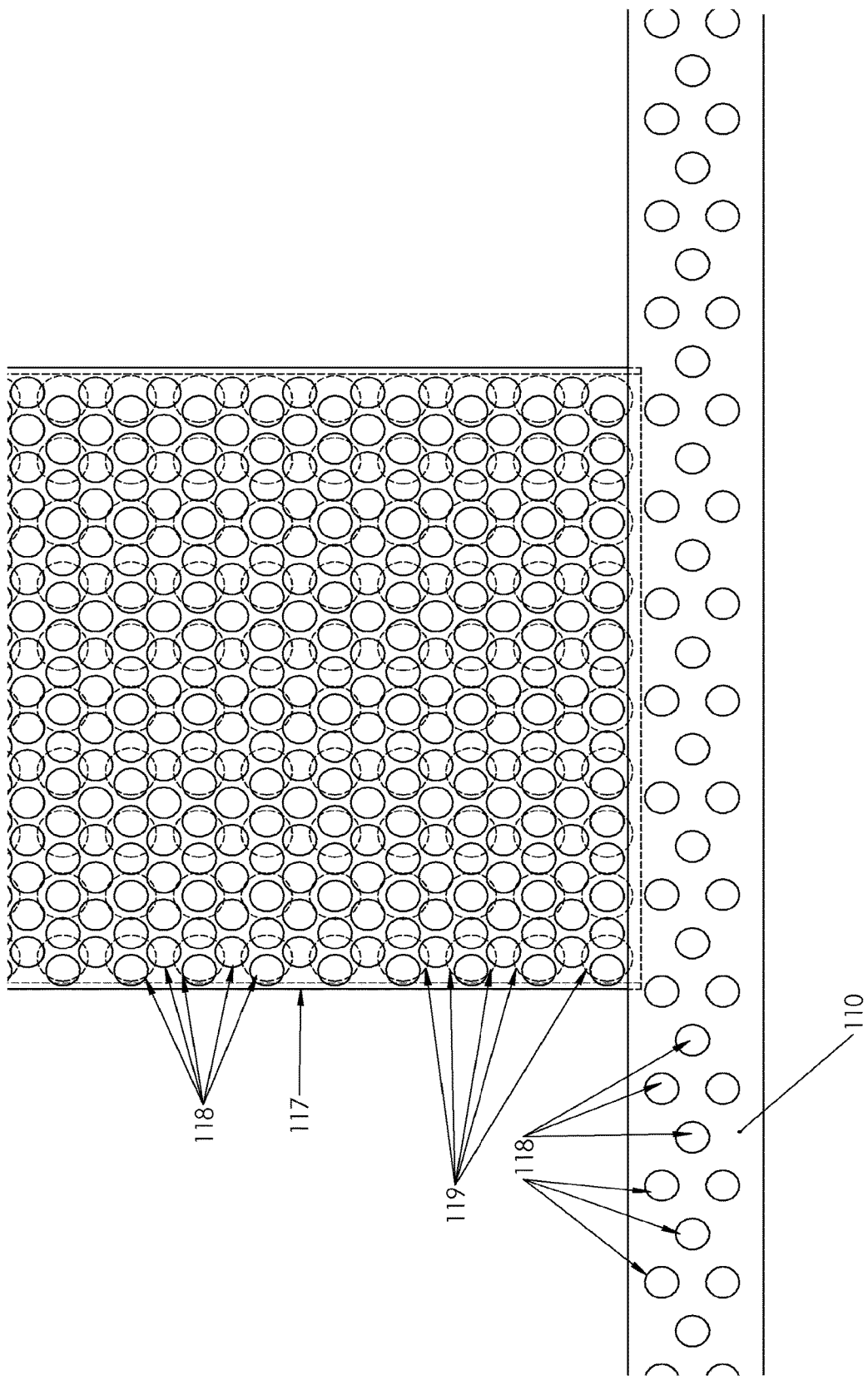
FIG. 9 is a schematic representation of a part being built by the machine in FIG. 6.

FIG. 9 shows a method by which the system in FIGS. 6-8 may be utilized to fabricate high density powder composite components. Typically, in a slurry-based system, density is limited. Higher powder loading increases density, which can increase the quality of a final part that is sintered from a printed powder composite part, but increasing powder loading also increases slurry viscosity and slows down the fabrication process. In the process depicted in FIG. 9, a low viscosity slurry may be used to fabricate a high density part that may be sintered.

Powder (118) is suspended in resin (110) to form a slurry. As a new layer is formed, resin (110) is suctioned through the part being built (117). This causes the powder loading fraction to increase as resin is removed, and the powder (118) packed in the part ends up being more closely packed than the powder (118) suspended in the original slurry. The powder (118) in the part (117) is held in place by cured lattice structures (119) that fix the powder (118) in place while still allowing for resin (110) flow through the part (117). Additional methods for building porous parts that allow for liquid resin to flow through them while binding together powder that will eventually be sintered into a solid final part will be described further.

Figure 10:
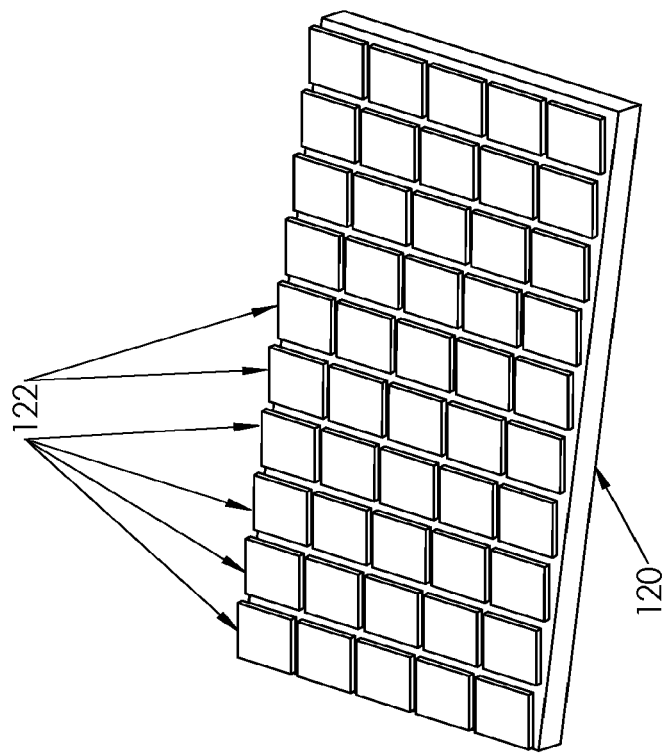
FIG. 10 is an elevated perspective view of a first configuration of a micromirror array as utilized in a potential embodiment of the machine in FIG. 1.
Figure 11:
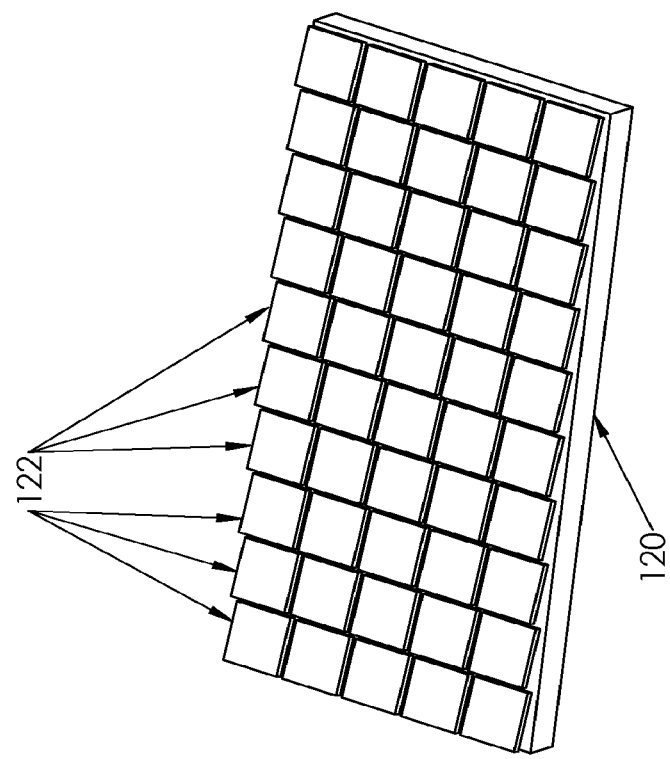
FIG. 11 is an elevated perspective view of the micromirror array in FIG. 10 in a second configuration.

One of the most common imaging systems for curing resin material is a Digital Micromirror Device (DMD) such as the one depicted in FIGS. 10 and 11. By applying a charge to an actuator in the DMD array, individual mirrors (122) may be rotated such that the light reflecting off of these mirrors (122) is either included in the final image or discarded into an absorber. While these systems have a significant advantage over laser-based systems in that they can cure an entire layer of material simultaneously, which greatly increases production speed, there are limits on build area and precision. In general, the image from a DMD system may be focused to make each pixel an arbitrary width, down to even fractional microns. However, the system is limited by the number of pixels available. Most high resolution chips have an array of approximately 1000×2000 pixels. If a pixel size of 10 microns is desired, this produces an imaging area 1 cm×2 cm. While 10 micron resolution may be very desirable for printed parts, as it would translate to a level of surface finish and functionality that is currently unavailable from 3D printers, a 1 cm×2 cm build area is inadequate for many applications. There are a few methods of circumventing this limitation: using multiple projectors and/or or moving the projector around the build area to perform multiple exposures, the sum total of which constitutes a complete imaging of the build area. Moving a projector to produce multiple images requires a very precise mechanical actuation system and slows down the production process.

Using multiple projectors will only increase the effective build area if the image produced by each projector is at least as large as the lateral dimensions of the projection unit itself. Otherwise, there will be significant gaps between the images produced by the projectors. For small numbers of projectors, there are more elaborate options for using mirrors and other optical elements to produce images that align with one another, but in general this will not be scalable for larger production areas. An array of projectors may be used wherein each projector produces a small image, but the array is collectively actuated to produce multiple images to fully image the build area. This method will have a more extreme problem with requiring a precision actuation system, and will still have the problem of reduced production speed.

The ideal configuration would be an array of projection units, each of which produces an image that is at least as large as the physical footprint occupied by the projection unit, wherein the precision achieved by each projection unit matches the target component precision. In general, even a single projection unit with these characteristics would constitute a significant improvement in precision and speed for optical 3D printing systems.

Figure 12:
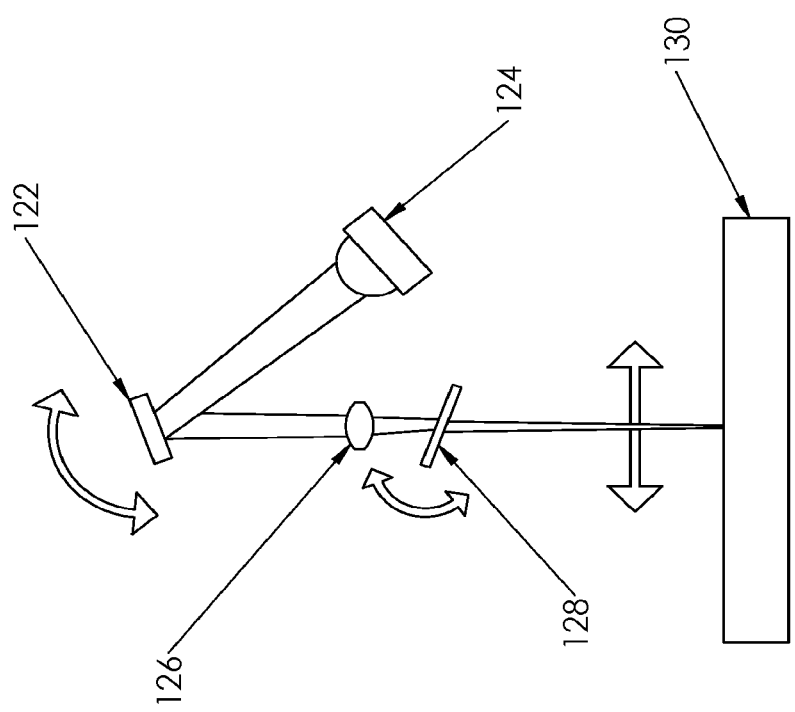
FIG. 12 is a schematic representation of a micropixelation and pixel shifting system, as may be used in a potential embodiment of the machine in FIG. 1.

FIG. 12 depicts the elements of a system which achieves this goal. FIG. 12 is a schematic representation of the optical behavior of a single pixel of this system. A light source (124) illuminates a pixel (122) which may rotate to either an "on" or "off" position. The exigent light from this pixel (122) is imaged to a microlens (126) when the pixel (122) is in the "on" position. This focuses the image of the pixel to a smaller size than its nominal size as it is seen on the imaging surface (130). The amount by which the focused image is smaller than the nominal size can be selected depending on the requirements of the application, such as in situations where the limits of the resolution of the light source are not sufficient to achieve the desired resolution for the object shape to be generated. In some embodiments, for example, an illuminated area covered by the image produced by each illumination source is at least 20% smaller than a total size of the respective pixel area, although those having ordinary skill in the art will recognize that greater or lesser reductions in the image size can be selected to adjust the final resolution of the imaging system.

In this configuration, however, the size of the image of the pixel will be too small to produce a complete image, and as such the pixel must be able to shift by small, precise increments in order to fully cover the imaging surface (130). For this purpose, a refractive pixel shifting element (128) is used. As the refractive pixel shifting element (128) is rotated, the image of the pixel is shifted laterally. A clockwise rotation of the refractive pixel shifting element (128) will produce a lateral shift of the pixel image to the left, whereas a counterclockwise rotation of the refractive pixel shifting element (128) will produce a lateral shift of the pixel image to the right.

In most imaging systems, the size of a pixel nearly matches the pixel pitch in an image, i.e. the center to center distance between adjacent pixels. Ignoring losses from gaps between micromirrors on a DMD chip, a projected pixel array from such a device that has 50 micron pixel spacing will have pixels that are 50 microns wide. For the purpose of clarification, this type of pixel image will be referred to as a "saturated" pixel image. Pixel shifting, also known as subpixelation, is a common method for improving the effective resolution of a pixel-based imaging system. Typically, this is achieved by projecting multiple images in different positions, where the position shift between subsequent images in the series is less than the width of one pixel. In the case of a projection system for viewing images, these overlap to form a smoother, slightly more precise, composite image. In the case of a projection system for curing reactive material, these overlapping images can produce smoother features than would be possible with a static pixel array.

Conventional pixel shifting systems typically use mirrors to shift the image, or microactuators on the DMD itself; these systems have a limited degree to which a pixel may be subdivided, and they do not fundamentally change the size of the pixel, which requires the edge of an image to be defined by many overlapping pixel images. This can produce a gradient of optical intensity at the edge of an image which is undesirable for high precision imaging applications, particularly when curing of a photosensitive material is required. This behavior will be discussed in more detail in the context of FIGS. 23-26.

The system described herein has several significant advantages over traditional pixel shifting systems. First, the pixel size is significantly smaller than the pixel pitch. This means that the cure response of the irradiated material will behave as though a saturated array of smaller pixels was used, even though the pixel pitch is large relative to the pixel size, which enables a larger total imaging area. Second, the pixel shifting system uses a refractive element to shift the pixel images. This arrangement has a much higher degree of inherent precision compared to reflective systems or those requiring microactuators. Since the deflection of an exigent beam from a reflective system is twice the rotation of the reflective element in the system, if an angular precision of 1 degree is required for beam placement, a rotational system with an angular precision of 0.5 degrees is required to control this adequately. Typically, to control beam placement on an imaging surface to a precision of 1 micron or less, angular precision of microdegrees may be required, which can be difficult to achieve.

FIGS. 13 and 14 illustrate this difference in precision. In a reflective beam guidance system, such as that in FIG. 13, an incident beam (142) strikes a reflective object in a particular angular position (148, 150). In a first position (148) a first exigent beam (146) is produced, and in a second position (150) a second exigent beam is produced (144). These exigent beams (144,146) then strike the imaging surface (130). In this system, the angular deflection of the exigent beam (144,146) is double the angular deflection of the reflective element (148,150). As previously mentioned, this puts an increased burden of precision on the actuation system. By comparison, FIG. 14 shows a refractive beam guidance system, where rather than deflecting the beam by a certain angle, it is offset laterally by a particular distance. An incident beam (152) strikes a refractive element (158, 160), is refracted at the incident and exigent surfaces of the refractive element (158,160), producing a displaced exigent beam (154,156) which strikes the imaging surface (130). The refractive system provides a much better ratio of actuator movement to beam movement for precise control. A refractive system may be configured such that rotation of the refractive element by 0.1 degrees or more causes a lateral translation on the order of 1 micron or less. This relationship may be adjusted by using a refractive element of a specified thickness and index of refraction, but in general the level of angular precision required for submicron pixel shifting will be readily achievable by a standard galvanometer or other rotational actuator.

Finally, it is understood that the cure response of many reactive materials is non-linear; doubling the radioactive intensity will reduce the required exposure time by more than a factor of 2. In this way, using higher intensity actually reduces the required dosage to achieve a significant cure response, which both reduces energy consumption and increases the overall speed of the fabrication process. While any pixel shifting system will suffer some degree of time loss to the mechanical actuation and control of the shifting system itself, this system concentrates the incident radiation significantly, which may reduce the cure time enough to compensate for this loss. In some configurations, the speed gained by concentrating the incident radiation may more than compensate for any losses to the control of the motion of refractive shifting elements, producing a net gain in overall speed, along with the aforementioned gains in precision and scalability.

In the previously described refractive pixel shifting system from FIG. 14, a single plate (158,160) was used to shift the incident beam (152). This is adequate for a monochromatic light source, but in general, optical materials will have a varying index of refraction at different wavelengths, which means that this system will shift the incident beam (152) by a different amount depending on its wavelength, for all other factors being held constant. In order to fully characterize the optical refractive response of a material, an index-wavelength curve must be determined. The fact that this curve is not a flat line is what leads to chromatic aberration in conventional optical systems. Typically, this is overcome by using and achromatic doublet, which is a system of lenses with different index-wavelength curves that can be calibrated to have the same refractive effect on two reference wavelengths. An achromatic triplet is a similar system that instead uses three lenses and is calibrated at three reference wavelengths; higher complexity systems may be used but are seldom necessary.

It is also worth noting that, even when using a monochromatic source, there are certain constraints on using a refractive panel as a shifting mechanism. For substantially paraxial rays, the relationship between rotation angle and beam displacement is substantially linear; this relationship becomes non-linear for non-paraxial rays. Given this, an ideal implementation of an imaging system that uses this shifting mechanism would be constrained to collect only paraxial rays from an imaging source. This may in some cases lower collection efficiency and the overall optical output of the system; other alterations may be made to a particular embodiment to mitigate these drawbacks.

Figure 15:
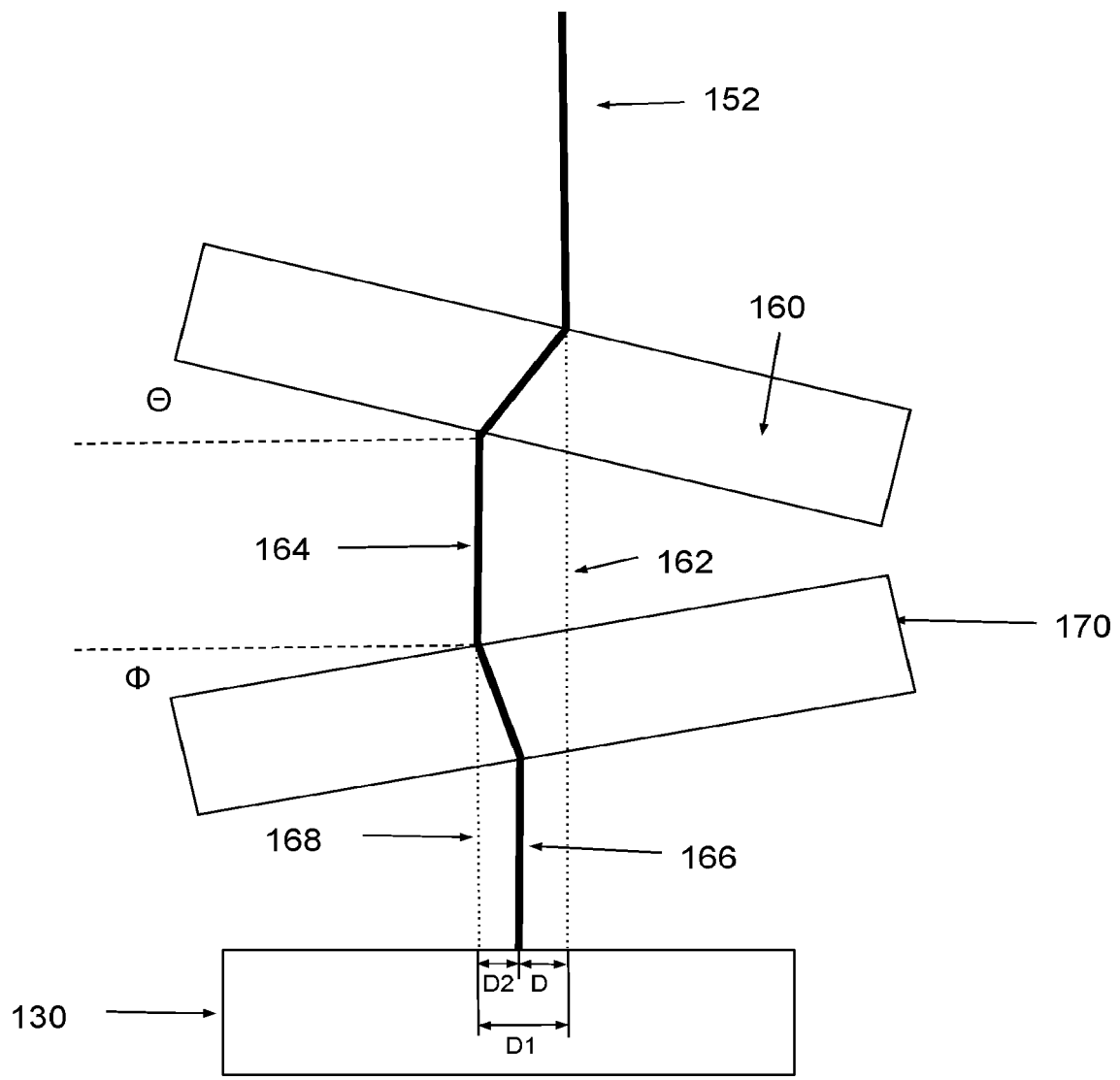
FIG. 15 is a schematic representation of an alternate embodiment of the system in FIG. 14.
Figure 17:
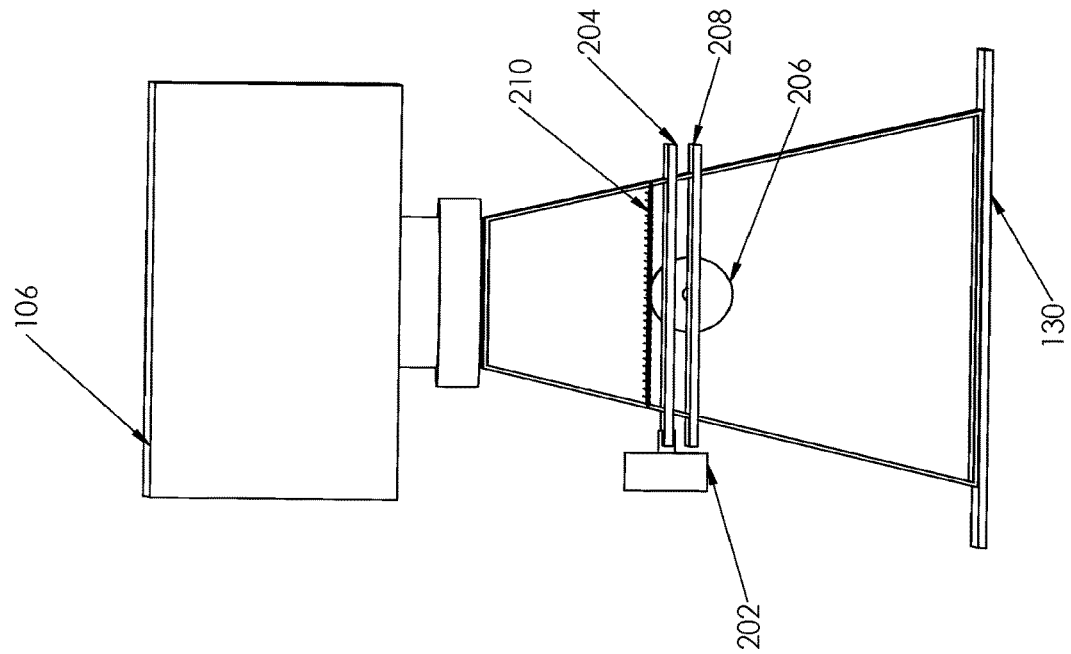
FIG. 17 is a front perspective view of the system in FIG. 16.
Figure 16:
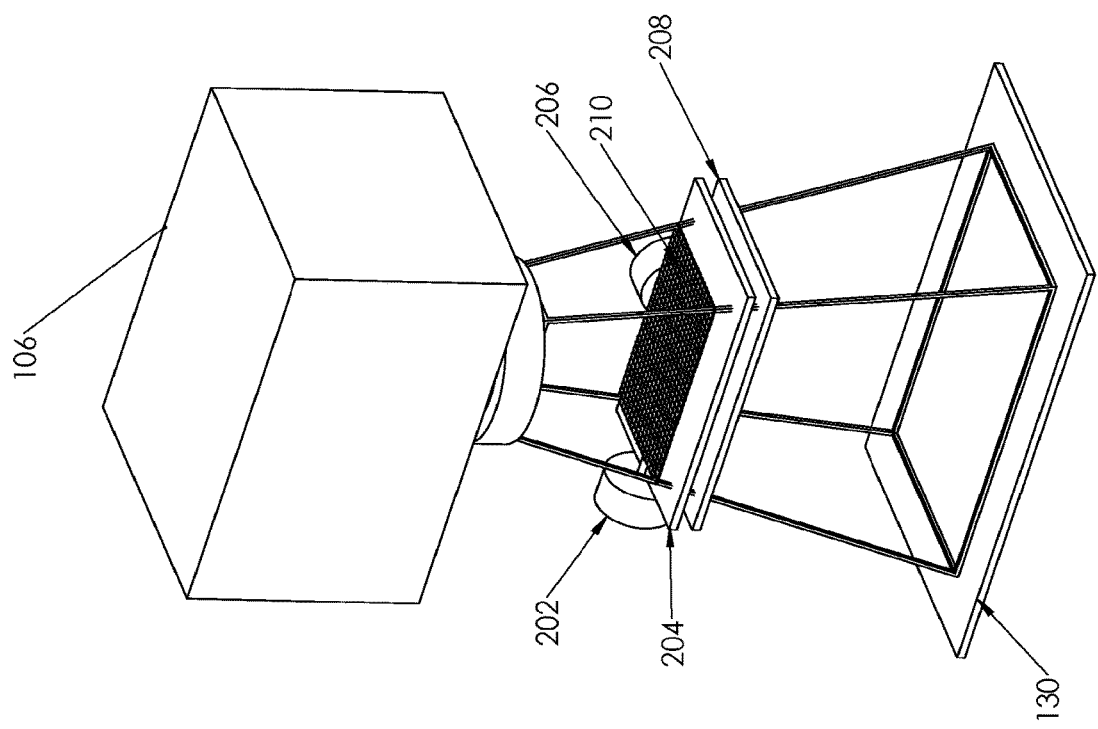
FIG. 16 is an elevated perspective view of one implementation of the system in FIG. 8.
Figure 19:
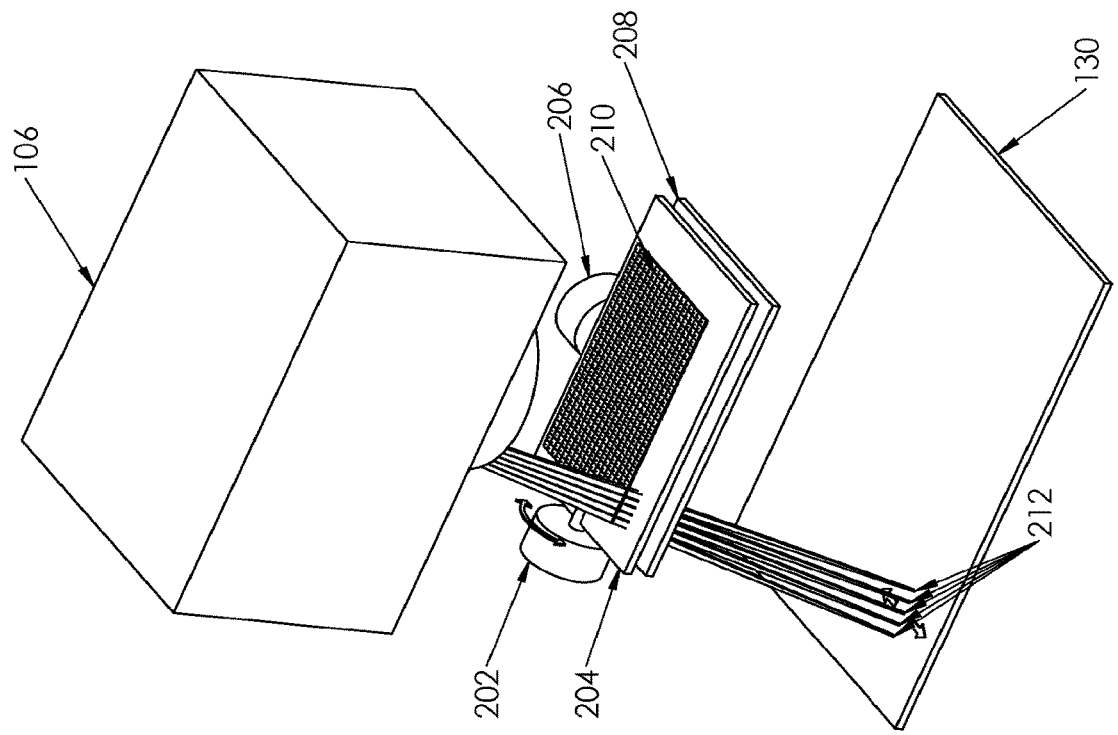
FIG. 19 is an elevated perspective view of the system in FIG. 16 in a third configuration.
Figure 18:
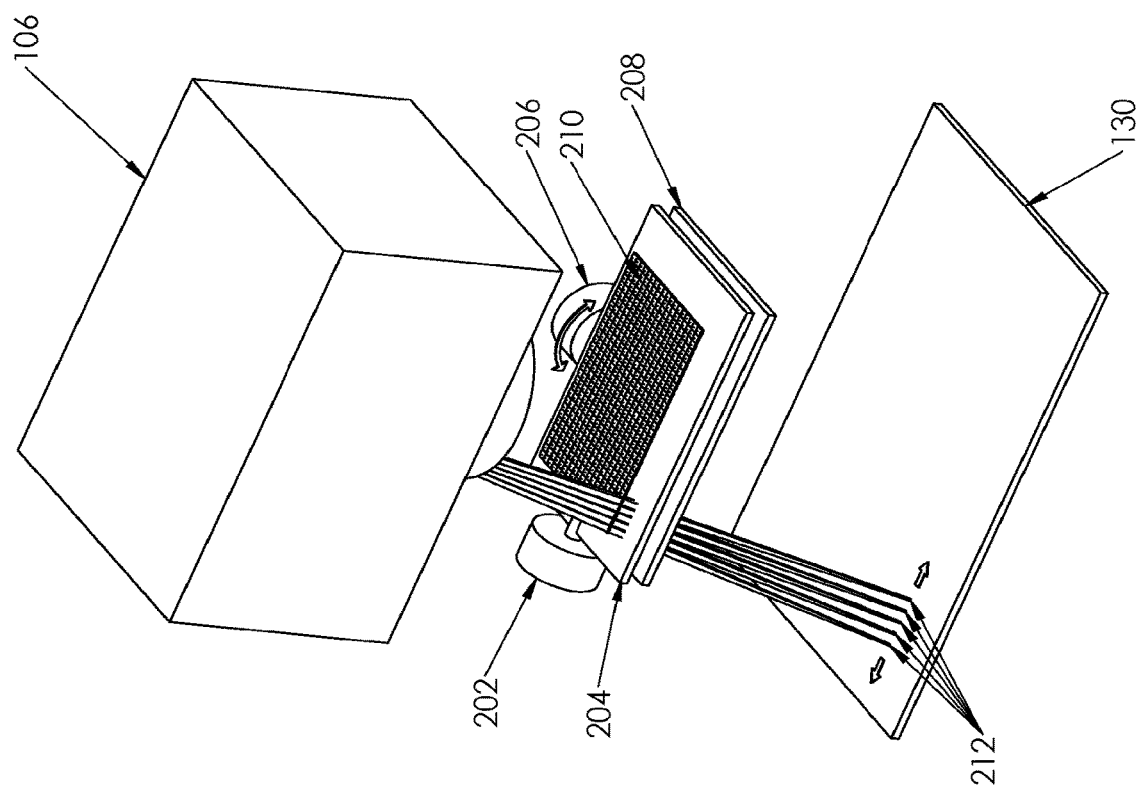
FIG. 18 is an elevated perspective view of the system in FIG. 16 in a second configuration.

A similar approach may be taken here and is depicted in FIG. 15. This example shows an achromatic doublet refractive pixel shifting system. In this system, a primary shifting window (160) shifts the incident beam (152) by an amount D1. A secondary shifting window (170) then shifts the exigent beam (164) from the first window (160) back by an amount D2. The total displacement D is thus the difference between D1 and D2. The system may be calibrated such that at two reference wavelengths, D is identical. In general, for any target displacement D, there will exist appropriate angular rotations for both windows (160,170) that produce this displacement for both reference wavelengths. Chromatic aberration for the region of the spectrum near these wavelengths will thus be minimized. This approach is generalizable to the design of an achromatic triplet or higher complexity system, though that may not be necessary depending on the application.

In general, the previous system for reducing chromatic aberration can be applied to pixel shifting in both X and Y directions on a target build surface, and may be useful if the optical source is dichroic or polychromatic, which may be necessary in order to maximize the optical output of the imaging system.

FIGS. 16-19 depict an implementation of this system which includes two refractive shifting elements (204, 208) driven by two rotational actuators (202, 206) to move focused pixel images (212) in both vertical and horizontal directions on an imaging surface (130). For the sake of simplicity, the paths of only 5 pixels are shown in these figures. This imaging surface (130) may in general be a window (108) in a build vat (104) in a stereolithography system (100), or may be any other surface containing material that will substantively change state in response to irradiation, or may simply be any surface onto which it is useful to produce a high resolution image. While other optical elements may be used to refine this system, those depicted here may substantively comprise a minimal set of elements to produce the desired effect.

In this system, a projection unit (106) projects pixels onto a microlens array (210). The image projected on the microlens array (210) is in general a proximately saturated array of pixels. The microlens array (210) converts this saturated image into an unsaturated image, where the pixel images (212) may be an arbitrary amount smaller than the pixel pitch in the image projected on the imaging surface (130). For example, in many SFF systems, a pixel size of 50 microns or larger is used, as this produces an image that approximately matches the size of the projection unit producing the image. Multiple images of this size may be produced by an array of projection units which fully image a large build area without gaps between adjacent images. However, if a precision of 10 microns is required for a particular build process, this conventional imaging system will not suffice. A microlens array (210) may be utilized that produces a 5:1 reduction in pixel size relative to pixel pitch. As such, pixels 10 microns across may be produced with 50 micron center to center spacing of adjacent pixels.

Rotational actuation of the horizontal shift actuator (206) will produce a rotation of the horizontal refractive pixel shifting element (208) which will result in a horizontal shift of the pixel images (212). Rotational actuation of the vertical shift actuator (202) will produce a rotation of the vertical refractive pixel shifting element (204) which will result in a vertical shift of the pixel images (212). Essentially, this system behaves similarly to a laser imaging system, where the spot produced by a laser beam may be moved around an imaging surface to trace out an image, and the spot size may be focused such that it is very small in order to produce a high resolution image; the key difference is that this system effectively has millions of focused beams moving in tandem to image a large area very quickly. Additionally, using the specifications in the previous example, luminous intensity at the imaging surface may be increased 25× or more relative to a system with a saturated pixel array. While 25 separate exposures may then be required to fully image the target area, this increase in luminous intensity may provide a net increase in imaging speed. Additionally, the fact that peak luminous intensity is achieved at the imaging plane may also make this system advantageous for holography applications.

Figure 21:
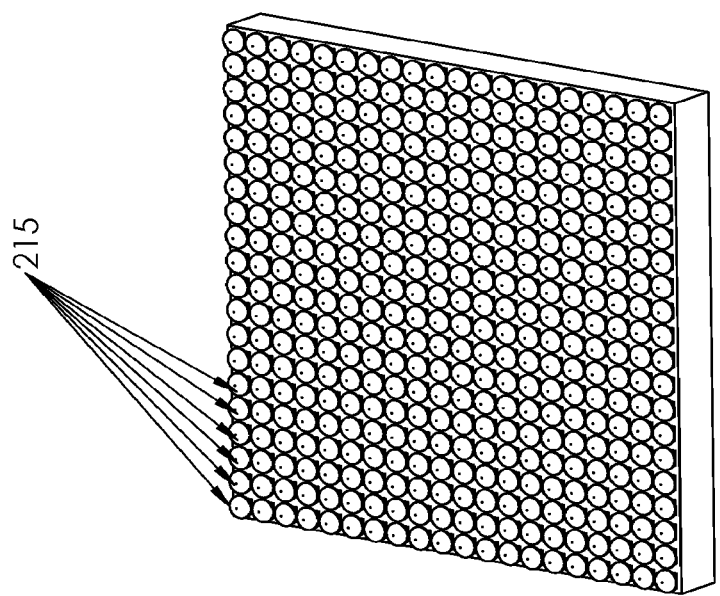
FIG. 21 is an elevated perspective view of a second configuration of the microLED array in FIG. 20.
Figure 20:
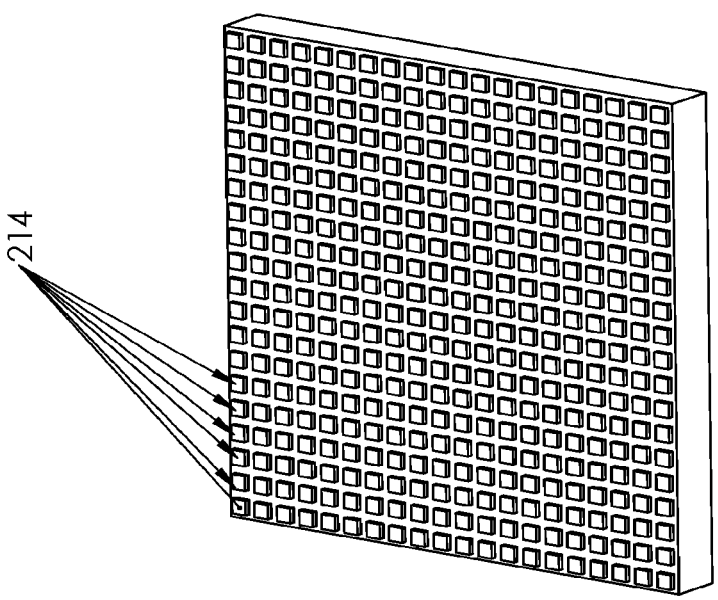
FIG. 20 is an elevated perspective view of a first configuration of a microLED array as used in a potential embodiment of the imaging system in FIG. 16.
Figure 22:
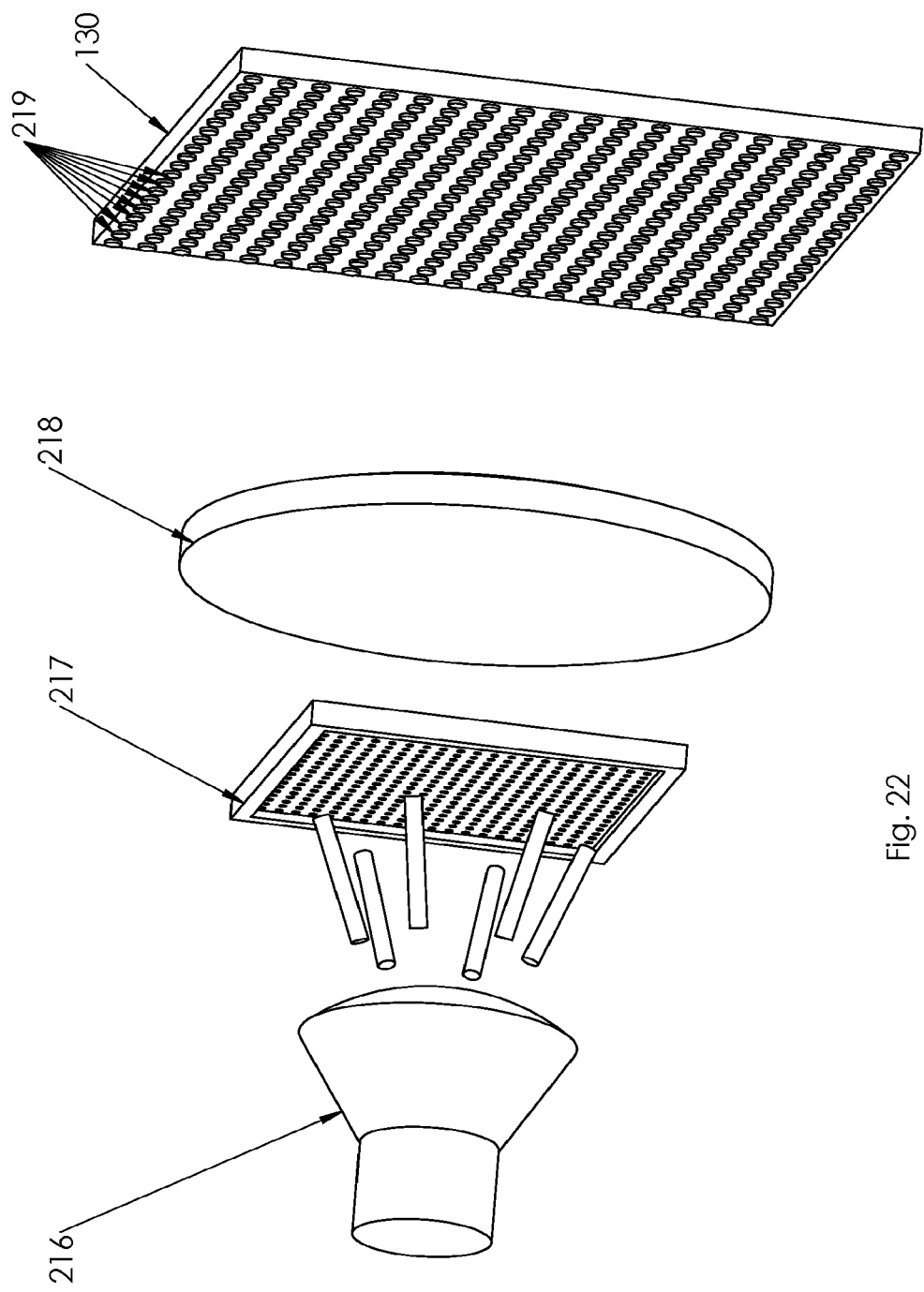
FIG. 22 is an elevated perspective view of an LCD mask imaging system as used in a potential embodiment of the imaging system in FIG. 16.

In general, any of the previously described systems may utilize an array of illumination sources wherein the pitch of the array is larger than the size of each source. Alternative embodiments for potential sources are shown in FIGS. 20-22. FIG. 20 depicts an array of microLEDs (214) while FIG. 21 depicts such an array with a corresponding array of microlenses (215) in order to optimize the optical efficiency of the system. FIG. 22 depicts a light source (216) shining through a LCD mask (217) with individual apertures spaced in a grid. The image of these apertures may be transferred by projection optics (218) to produce pixel images (219) on a display surface. As with previously described systems, refractive pixel shifting may be utilized to produce high resolution complete imaging of a display area.

Figure 23:
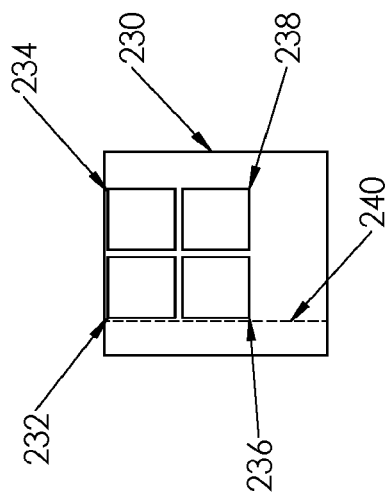
FIG. 23 is a top view of pixels projected using a pixel shifting imaging system.
Figure 24:
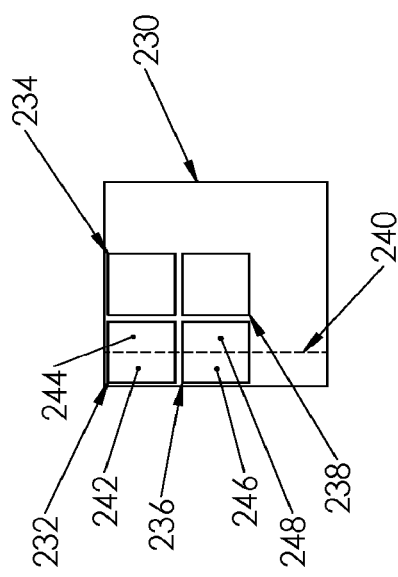
FIG. 24 is a top view of the pixels in FIG. 23 in a second configuration.
Figure 25:
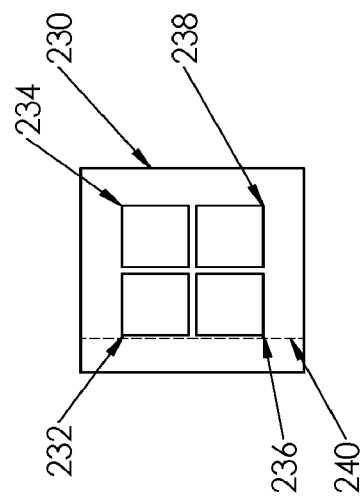
FIG. 25 is a top view of the pixels in FIG. 23 in a third configuration.
Figure 26:
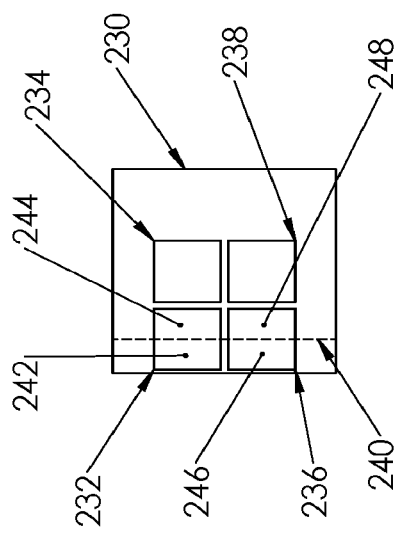
FIG. 26 is a top view of the pixels in FIG. 23 in a fourth configuration.

A more detailed analysis of the drawbacks of conventional pixel shifting is demonstrated by FIGS. 23-26. For the sake of simplicity, these images depict a system in which a saturated array of pixels is shifted by one half of a pixel width, both vertically and horizontally. The behavior of more complex subpixelations may be extrapolated from this analysis. FIG. 23 shows a set of four pixels (232,234,236, 238) projected on an imaging surface (230). A line (240) indicates the ideal boundary of a cured region, with the cured portion to the right of the line (240). It is understood that this analysis pertains primarily to an imaging application used to cure reactive material, and that other pixels are also used in this array which are not depicted for the sake of simplifying the analysis. In these figures, four different pixel positions are shown, corresponding to four different projected images. Each image delivers 25% of the required energy dose to cure the target material, such that only areas exposed in all four images will have fully cured material. Knowing that there are other pixels above and below the four pixels (232, 234, 236, 238) that are shown, one can surmise that all material to the right of the target line (240) will in fact receive the appropriate dosage of irradiation. However, some pixels (232, 236) are split in FIGS. 23 and 25, and as such they are irradiating areas within the target region (244, 248) and areas outside the target region (242, 246). The effect of this is the irradiation of a region to the left of the target boundary (240) that is half as wide as a pixel and extends along the entire boundary (240). The dosage is 50% of the required curing dosage, but this may still partially cure material, depending on the properties of the material in question. In this case, the pixel shifting distance was one half of a pixel width. For the sake of generality, we will refer to this as a situation with a subpixelation ratio of 2:1. For higher subpixelation ratios, the energy dosage gradient will be smoother than in this case, as it will involve more steps from 100% energy dose to 0% energy dose. In general, there will always be an energy dosage gradient for any subpixelation system that uses a saturated pixel array.

Figure 28:
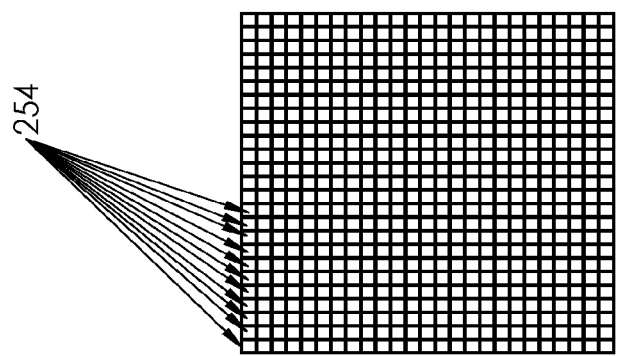
FIG. 28 is an alternate top view of pixels projected by the system in FIG. 16.
Figure 27:
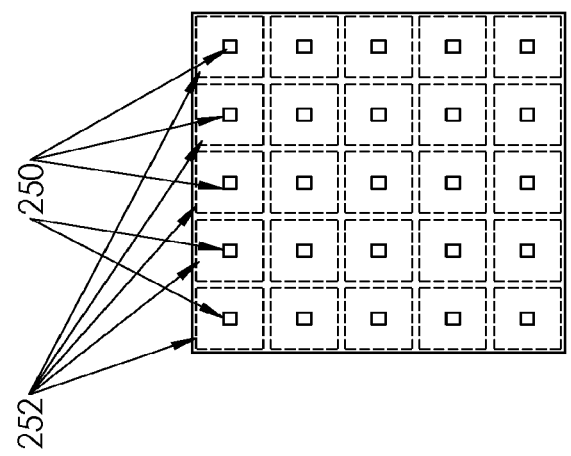
FIG. 27 is a top view of pixels projected by the system in FIG. 16.

By contrast, FIGS. 27 and 28 show the effect of introducing a microlens array into an imaging system that uses pixel shifting. As previously mentioned, this takes a saturated pixel array (252) and converts it to an unsaturated pixel array (252). These figures depict a system with a 5:1 reduction in pixel size, where pixel shifting can allow these micropixels to reach all required positions (254) to fully image the target area. In essence, this system behaves like a projection unit with 25 times as many pixels as are nominally available. In general, this amplification of precision may be much higher, improving precision by many orders of magnitude. This technique will be hereinbelow referred to as micropixelation.

As shown in FIG. 28, multiple exposures at different shifted positions may produce an image that is similar to that produced by a saturated array of pixels. This may require actuating the shifting system and settling to a new position before exposing each image, which may slow down the imaging process. Alternative techniques for imaging with this system will be discussed further.

Figure 30:
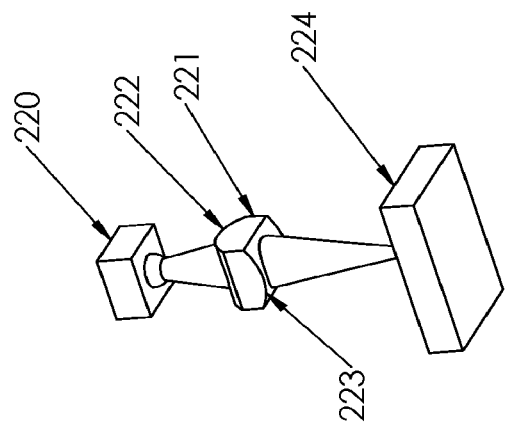
FIG. 30 is a perspective view from below of the system in FIG. 29.
Figure 29:
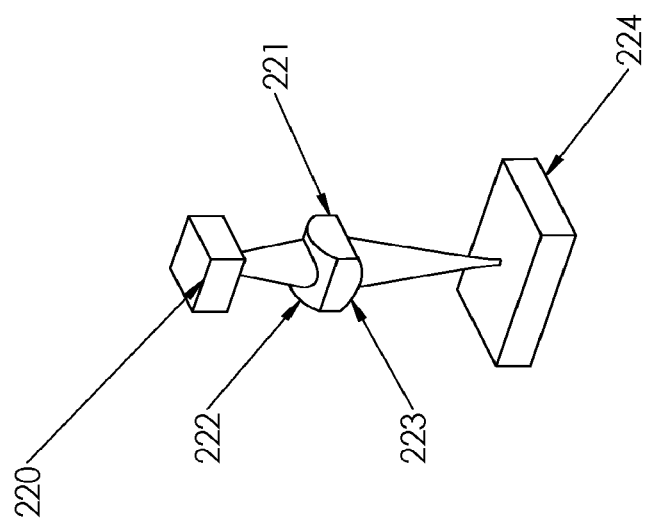
FIG. 29 is an elevated perspective view of an alternate embodiment of the micropixelation system in FIG. 12.

The key elements of the projection unit (106) in the previous implementations have been a light source (124) and an array of micromirrors (122). This may in general be replaced with an array of microLEDs, as depicted schematically in FIGS. 29 and 30 and previously discussed in FIGS. 20-21. Additionally, if a rastering pattern is used during the imaging process, it may be beneficial to have pixel images which do not have equal height and width. If the primary motion during rastering is horizontal, then it may be useful to have a pixel that has a reduced width relative to its height, in order to reduce any blurriness introduced to the image by turning the pixel on or off while in motion. In order to achieve this, a microlens (221) with astigmatic characteristics may be used. In this schematic representation, a microLED (220) illuminates the primary face (222) of a microlens (221). The radiation from the microLED (220) then exits the secondary face (223) of the microlens (221) and arrives at the imaging surface (224). In this case, the curvature of the secondary lens face (223) is greater than the curvature of the primary lens face (222), producing a pixel image with an aspect ratio other than unity. An array of astigmatic micropixels may be used along with a refractive pixel shifting mechanism or other pixel actuation mechanism to image an arbitrarily large surface.

Figure 33:
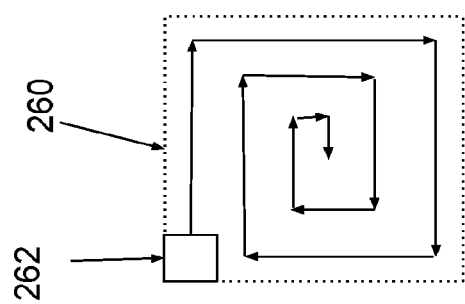
FIG. 33 is a top view of a third micropixel rastering path.
Figure 32:
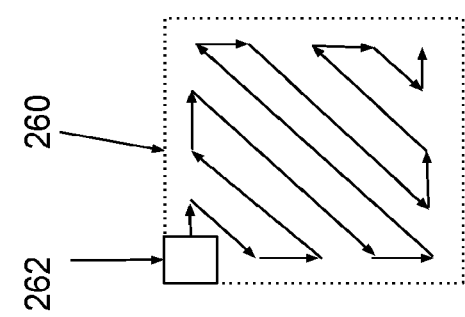
FIG. 32 is a top view of a second micropixel rastering path.
Figure 31:
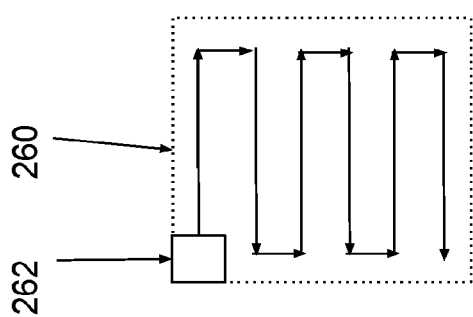
FIG. 31 is a top view of a micropixel rastering path.

Using a system such as any of those previously described also provides opportunities for determining optimal paths for shifting the pixel images (212) on the imaging surface (130). Following the previous example, a 10 micron pixel may be used to image an area 50 microns wide. FIGS. 31-33 describe several options to implement this, wherein a micropixel (262) traverses a pixel region (260). The pixel region (260) is understood to mean the region that the pixel (262) would occupy if there were no micropixelation implemented. The simplest option may be to have the micropixel (262) start in the top left corner of its pixel domain (260), move across to the top right corner, move down by 10 microns, then shift back to the left side of its domain (260), tracing out a back and forth rastering pattern in the process, as shown in FIG. 31. Other possibilities, shown by FIGS. 32 and 33, include rastering diagonally, moving in a spiral pattern, or any other pattern which substantively provides adequate irradiation to be useful for a particular application. Micropixels may be turned on or off while in motion to increase the speed of the imaging process.

In general, standard pixel shifting and micropixelation may also be used in combination. It may be advantageous to have a system wherein an array of illumination sources in a grid pattern that has a pitch dimension that is larger than the size of each illumination source (a source that would produce an unsaturated image, as previously defined) that also utilizes a pixel shifting system that subdivides the image into regions smaller than the nominal pixel size projected by each illumination source. The smaller each illumination source is, the higher the resolution of the resulting image will be, but achieving high resolution directly from an imaging source creates a problem in that it requires a driver system capable of rendering an extremely high number of pixels simultaneously. By using a micropixelation system, fewer pixels need to be rendered simultaneously, and high resolution is achieved by sequential imaging. The degree to which pixel shifting is used to increase resolution may in general be finer than the resolution natively achieved by the micropixelation itself, depending on the application. For example, if a microLED chip were fabricated with 10 um pixels spaced at a 30 um pitch, and the projection optics provide for a 4:1 increase in linear image size from the chip to the projection surface, this would result in 40 um pixels on a 120 um pitch at the imaging surface. If 10 um resolution is desired, then multiple exposures shifted by 10 um would be utilized, which would produce an energy dose gradient at the edges of the image as previously described. However, the energy gradient would be less severe, and the image would overall be sharper than if 120 um pixels had been shifted in 10 um increments. Additionally, this resolution could have been achieved natively if the pixels in the microLED array were 2.5 um wide, but this would result in a net output of optical power approximately $\frac{1}{16}$ of the system that used 10 um pixels, since power output from an LED is roughly proportional to chip area. Thus, for a specific application, it is possible to use a combination of micropixelation and conventional subpixelation to balance image sharpness with overall illumination intensity.

An alternate SFF system for digital production of parts is described in FIGS. 34 and 35. There are three key steps involved in the process implemented in this system: powder deposition, powder infusion, and irradiation. A powder metering module (302) may be used for the first step, an infusion platform (304) may be used for the second step, and a projection unit (106) may be used for the third step. The powder metering module (302) may in general be any system that can deposit a controlled quantity of powder to produce a flat layer. The infusion platform (304) contains a porous top surface (306) and a resin flow path (308) for providing resin to the powder deposited by the powder deposition module (302). In this system, a combination of capillary action and applied pumping pressure provides resin to subsequent layers of powder. The resin may be cured by the projection unit (106) to bind the powder together to produce a powder composite component which may be post-processed by debinding and sintering to produce a proximately solid object made of the powder material.

FIGS. 36-39 describe this process in more detail. After a first layer of powder (310) is deposited on the infusion platform (304), resin is provided (312) to infuse the powder (310). Typically, this resin (312) will be only allowed to infuse enough to bind the powder layer (310) together, without interfering with further layers of powder. A second layer of powder (314) may be deposited on the first layer (310) and the resin level (312) may be raised through additional infusion. This process may be repeated until the build process is complete.

Figure 40:
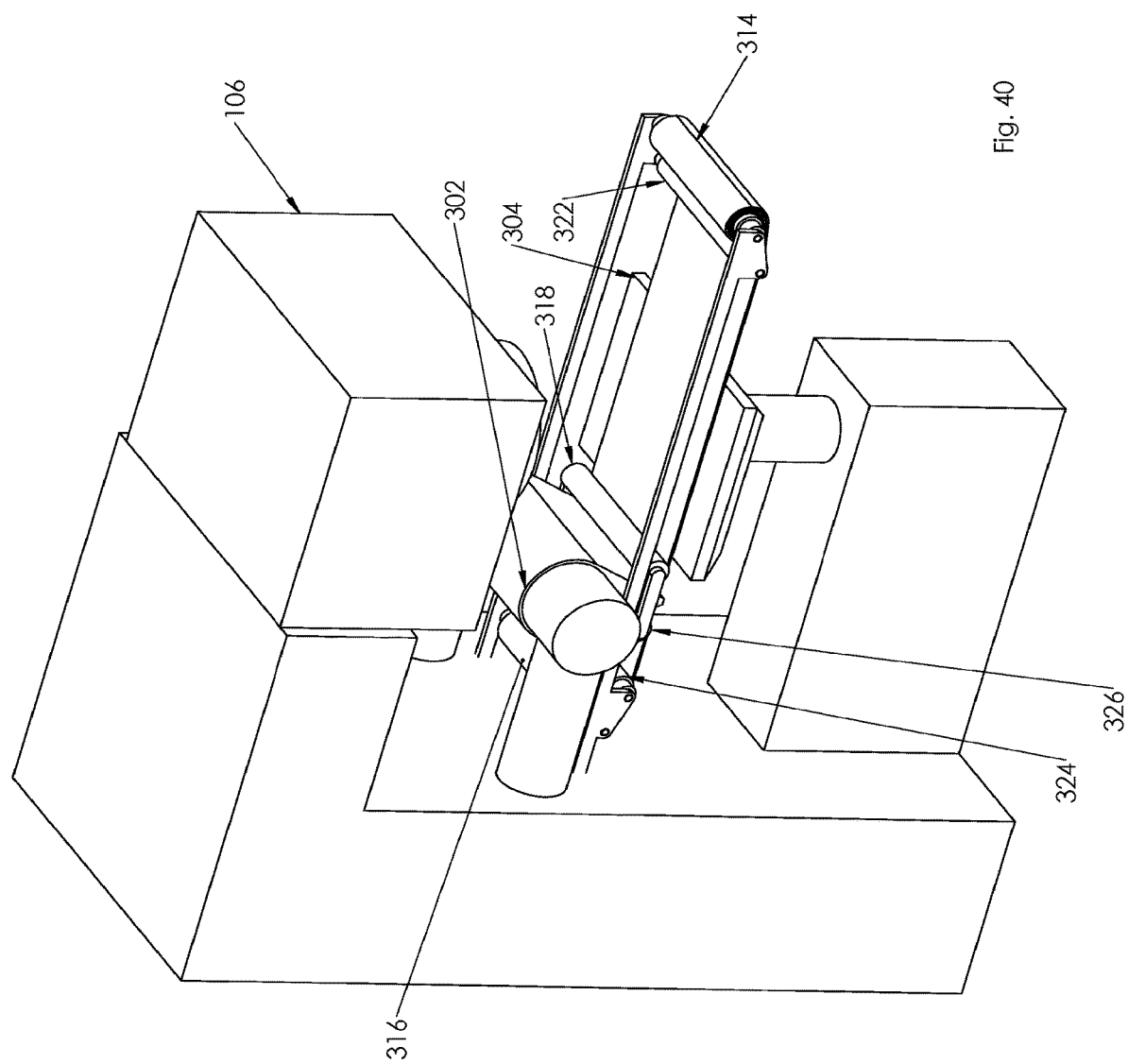
FIG. 40 is an elevated perspective view of a third embodiment of a machine for solid freeform fabrication according to an embodiment of the presently disclosed subject matter.
Figure 41:
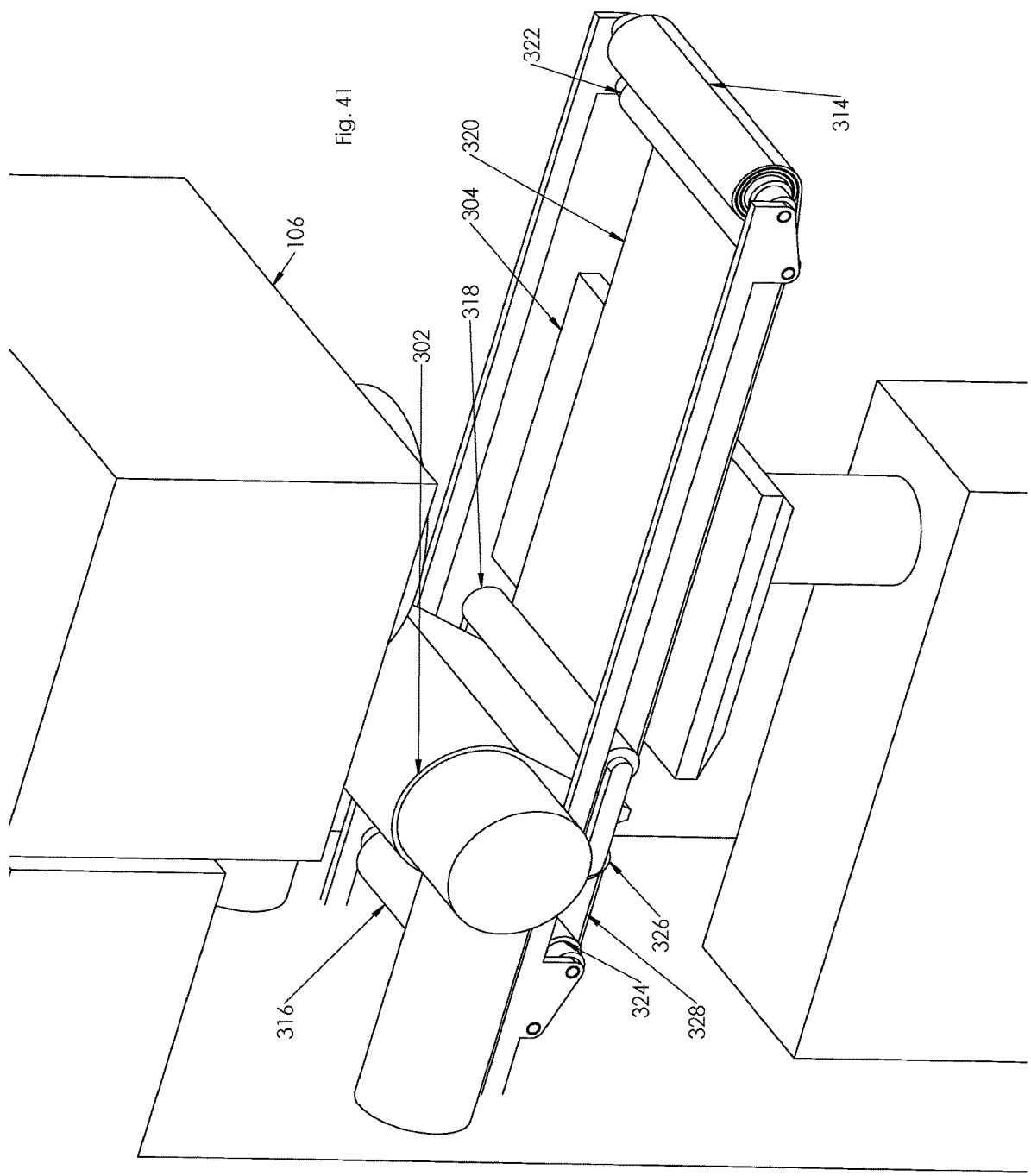
FIG. 41 is a magnified view of the machine in FIG. 40.

FIGS. 40-43 depict several systems which use an alternate approach to achieve the goal of fabricating a high density powder composite part at high speed. Rather than depositing dry powder, which is then infused with resin, a low density slurry is deposited onto a build platform, and the density of that slurry is increased before it is exposed to an image to cure a portion of the slurry and bind together the powder within it. FIG. 40 depicts one system for implementing this process.

In this system, a material deposition module (302) is mounted such that it can traverse a build platform (304). Fixed rollers (318, 326) are mounted on either side of the material deposition module (302) with a film (320,328) connected to each fixed roller (318,326). Each of these films (320,328) passes around a leveling roller (322,324) and is wound onto an automatically retracting reel (314,316). Thus, as the material deposition module (302) traverses the platform, one reel dispenses film while the other retracts it. Slurry material may be deposited by the material deposition module (302) onto the platform (304) after which it the slurry is flattened by a film into a flat layer, that is maintained flat by the tension in the film. An alternate embodiment (not depicted) would simply use a recoating blade on either side of the material deposition system (302) to level the layer of slurry. In this instance, the curing process may be initiated by an image from the imaging unit (106) projecting through the film, which transmits an adequate amount of light at the relevant wavelength(s) to allow the curing process to occur.

Figure 42:
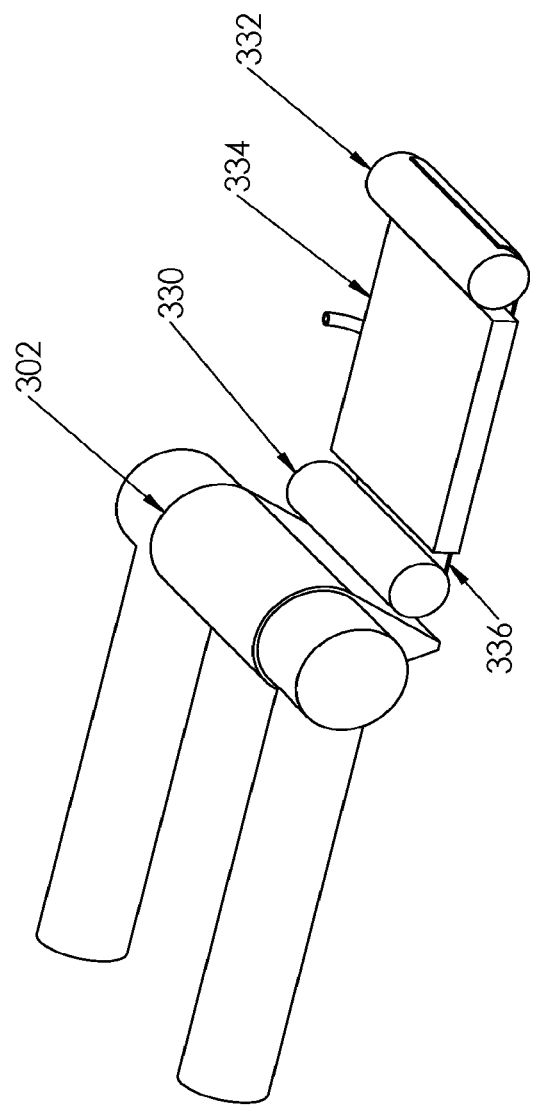
FIG. 42 is an elevated perspective view of a material deposition system as it may be used in the machine in FIG. 40.
Figure 43:
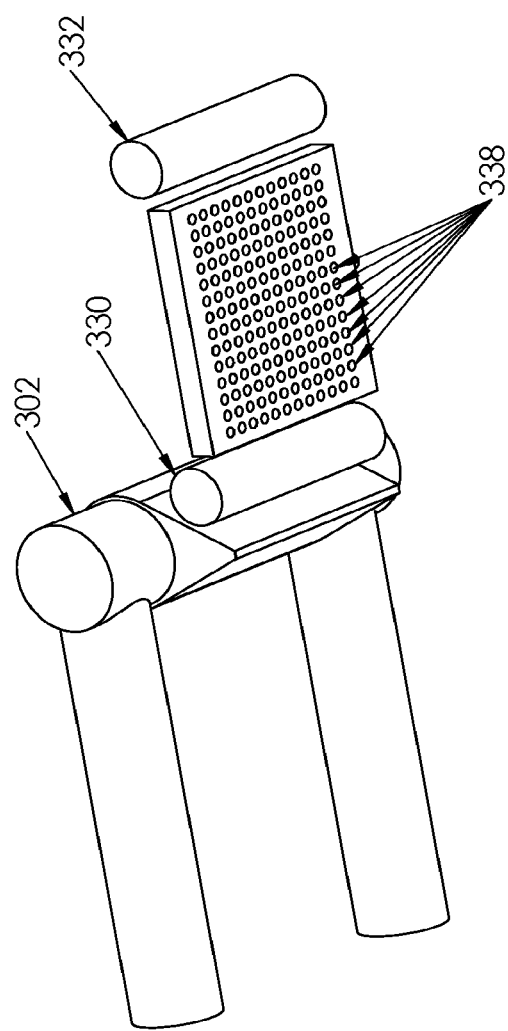
FIG. 43 is a perspective view from below of the material deposition system in FIG. 42.

An alternate layer production system is depicted in FIGS. 42-43. Depending on layer thickness, it may be difficult to use the aforementioned tensioned film system to create a flat layer; the film tension may be inadequate to control variations in the layer over a large area if the layer in question is particularly thin. In the system shown in FIGS. 42-43, a film (336) is held on a rigid block (334) by vacuum pressure applied through pores (338) in the rigid block (334) during the layer distribution and flattening process. In FIG. 43, this film (336) has been removed to show details of the rigid block (334). The film (336) is held in place at either end by round film mounts (330,332). This assembly may collectively flatten and distribute slurry material deposited by the material deposition module (302). Once the layer has been created, the vacuum source may be turned off and the rigid block (334) may be retracted to allow imaging of the slurry material through the film (336).

FIGS. 44-48 show schematic representations of the material handling methods described in the previous systems. As in previous systems, a porous build platform would be used to build a porous part that allows fluid flow through both the platform and the part being built. In these systems, a low density blend of powder (310) and resin (312) is deposited on a build surface (304). Vacuum pressure is applied to the slurry through the porous build surface (304) to remove excess resin (312) and increase the effective powder loading density of the slurry, thus densifying the powder (310). While applying a vacuum pressure to the fluid output of the build platform (304) is one option, in general, any means of producing a pressure differential between the regions above the build area and below/within the build platform (304) will be sufficient to produce the desired effect. A positive pressure may be applied to an enclosed build area, for example. In an extreme case, as shown in FIG. 46, all excess resin (312) may be removed such that resin (312) is only found at tangent points between powder particles (310). In this instance, it would be unnecessary to use the lattice imaging techniques that will be described below; fluid paths within the part would remain available even when using solid curing images, since this fluid evacuation process leaves an inherently porous structure. As has been done with previous systems, multiple layers of material may be produced and densified in a similar manner in order to produce a complete object, which may then be sintered to remove the binder and produce a proximately solid object made of a metal or ceramic material. Further, this type of deposition process may be augmented by ultrasonic agitation. The source of ultrasonic agitation may be a recoater blade, a film, a reinforcing mechanism for a film, or the build surface (304) or another source.

In FIGS. 44-46, the slurry is exposed to an open atmosphere, whereas in many of the previously described systems, a film is used to level the slurry and imaging is conducted through this film. In order to implement the process described in FIGS. 44-46, a material deposition system and recoating blade would be used, as has been previously discussed. In the case where the slurry is deposited in an open atmosphere, it may be possible to densify the slurry without applying vacuum pressure. If the slurry includes a Viscosity Reducing Agent (VRA), the build area may be heated to facilitate the evaporation of such a component. In this case, the VRA would likely be an organic solvent that reduces the viscosity of the slurry to increase deposition speed, which may then evaporate to facilitate in situ densification of the deposited layer of material.

FIGS. 47 and 48 show an approach wherein a film (340) is used to level and distribute a layer of slurry material. The densification of the layer is essentially the same as previously described, with the primary difference being that the film can create a restriction to the evacuation of resin after the powder is consolidated. This resistance may be detected by a printing system and used to determine that powder consolidation has occurred. This feedback mechanism may be useful depending on the particular implementation of this process, though the film would have to be peeled off of the cured material before another layer could be produced, which may reduce print speed. The advantages of each of these processes will largely depend on the specific implementation for a particular application.

FIG. 49 depicts a system which utilizes an alternate approach to producing powder composite components. An infeed reel (344), guide rollers (348,350), and an outfeed reel (342) are positioned to supply film (346) to a build surface (304). The film (346) is in general a blend of at least one monomer and at least one photoinitiator, with the possible addition of one or more plasticizers, as well as powder material, that is solid at room temperature but can melt on exposure to a heated build platform (304). At least a portion of the film (346) that is in contact with the build platform (304) may melt, while the rest of the film (346) remains solid, such that the outfeed reel (342) may pick up unused film (346) and pull additional film (346) into the build area to allow for the construction of additional layers. Part fabrication with this system is similar to what has previously been described, particularly in FIGS. 44-48. When at least a portion of the film is melted, the process proceeds according to FIGS. 44-46. While densification may be advantageous, the advent of solid feedstock that at least partially undergoes a phase change for the purpose of creating photodefinable three dimensional objects is in and of itself a novel system. Parts produced in this manner would have excess material removed while at an elevated temperature in order to keep uncured material in a liquid state, or would be exposed to a solvent that is capable of dissolving the unaltered (e.g., unpolymerized) material but which does not affect the polymerized material. An exemplary monomer for this purpose would be norbornene, which is solid at room temperature and has a viscosity of approximately 0.75 mPa*s at 50 C and can have a glass transition temperature of approximately 300 C when polymerized. Additionally, acrylates or epoxides or other polymerizable monomers could be used in combination with a non-reactive component which is solid at the normal storage conditions for the material but which becomes fluid when the temperature is elevated somewhat, ideally within the range of 60-100 C. For example, paraffin wax is solid at 25 C but is a liquid with very low viscosity at 100 C. High molecular weight polyethylene glycol and polypropylene glycol are also viable options for this type of material blend. In general, any material that is solid at a storage temperature, liquid at a higher operating temperature, and contains photopolymerizable monomeric component(s) is considered to be an embodiment of the present subject matter. In a system such as the one described here, a binder formulation may be generally understood to contain less than 70% by weight non-reactive diluent, at least 2% by weight one or more components used as a PI system, and the remainder of the composition may be one or more monomers or oligomers that may be polymerized by the PI system, wherein the formulation is solid at a first storage temperature that is lower than 35 C and has a viscosity less than 2000 cps at a second operational temperature that is above 35 C. Feedstocks formulated from such a binder for the purpose of fabricating metal or ceramic components are generally understood to have a volumetric powder loading less than 45% of metal or ceramic powder in the case that in situ densification is used as previously described, wherein a volumetric loading of greater than 45% is achievable after in situ densification, or volumetric powder loading in excess of 40% in the event that in situ densification is not utilized.

It may also be possible to use a 2-ply film for the system depicted in FIG. 49. One layer would be a transparent polymer film that may be oxygen permeable, while the other layer would be made of the previously described photopolymerizable material. In this instance, the process would be similar to the system depicted in FIGS. 47-48, wherein a transparent film is used as an imaging window through which the build material is cured by incident irradiation.

Figure 51:
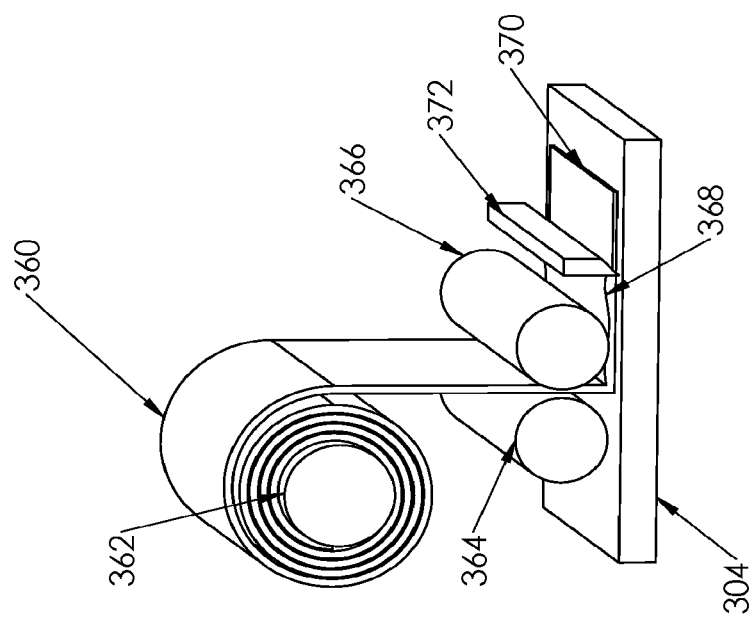
FIG. 51 is an elevated perspective view of the material deposition system in FIG. 50.
Figure 50:
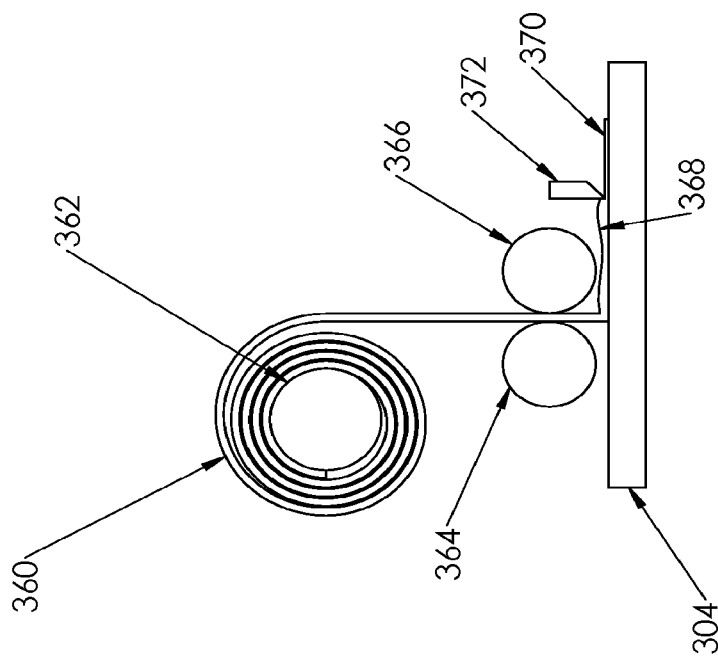
FIG. 50 is a front view of a material deposition system that may be used by the machine in FIG. 49.

FIGS. 50-51 depict an alternate embodiment of the system in FIG. 49. Rather than using an infeed and outfeed reel, this system utilizes a single feed reel (362) loaded with a thicker film (360) fed to a heated build surface (304) by two feed rollers (364,366). A melt pool (368) is created when the film (360) contacts the build surface (304). A blade (372) is used to level the melt pool (368) to produce a uniform layer of slurry (370). The use of a solid feedstock may in general provide for build material that is easily switched out for other material, and that can keep the powder media in suspension more effectively than a liquid slurry during storage. While film is depicted as the solid feedstock here, in general it may be advantageous to use pellets or other form factor, but the principle of operation remains the same.

Further, it is possible to implement a system that has similar advantages to that described in FIGS. 50-51 by using a powder feedstock that consists of metal powder with a solid coating of binder material. The binder material may in general be of the type previously described, wherein it undergoes a phase change prior to being irradiated to initiate a polymerization process, such that excess unpolymerized material may be removed by a solvent, possibly while at an elevated temperature. The use of coated powder has the advantage of enabling the use of electrostatic powder deposition, which is generally restricted to powder materials that are electrically non-conductive in nature or that at least have a coating that is electrically non-conductive in nature. Additionally, the thickness of the coating may be such that when the powder is deposited on a heated build surface and the binder material melts, the layer consolidates under the weight of the powder, and no further densification is required. In an alternate configuration, a thicker coating may be used, wherein densification is also implemented; by increasing the size of the particles in the feedstock in this manner, agglomeration may be reduced, and the rheological properties of the feedstock may be improved.

Figure 52:
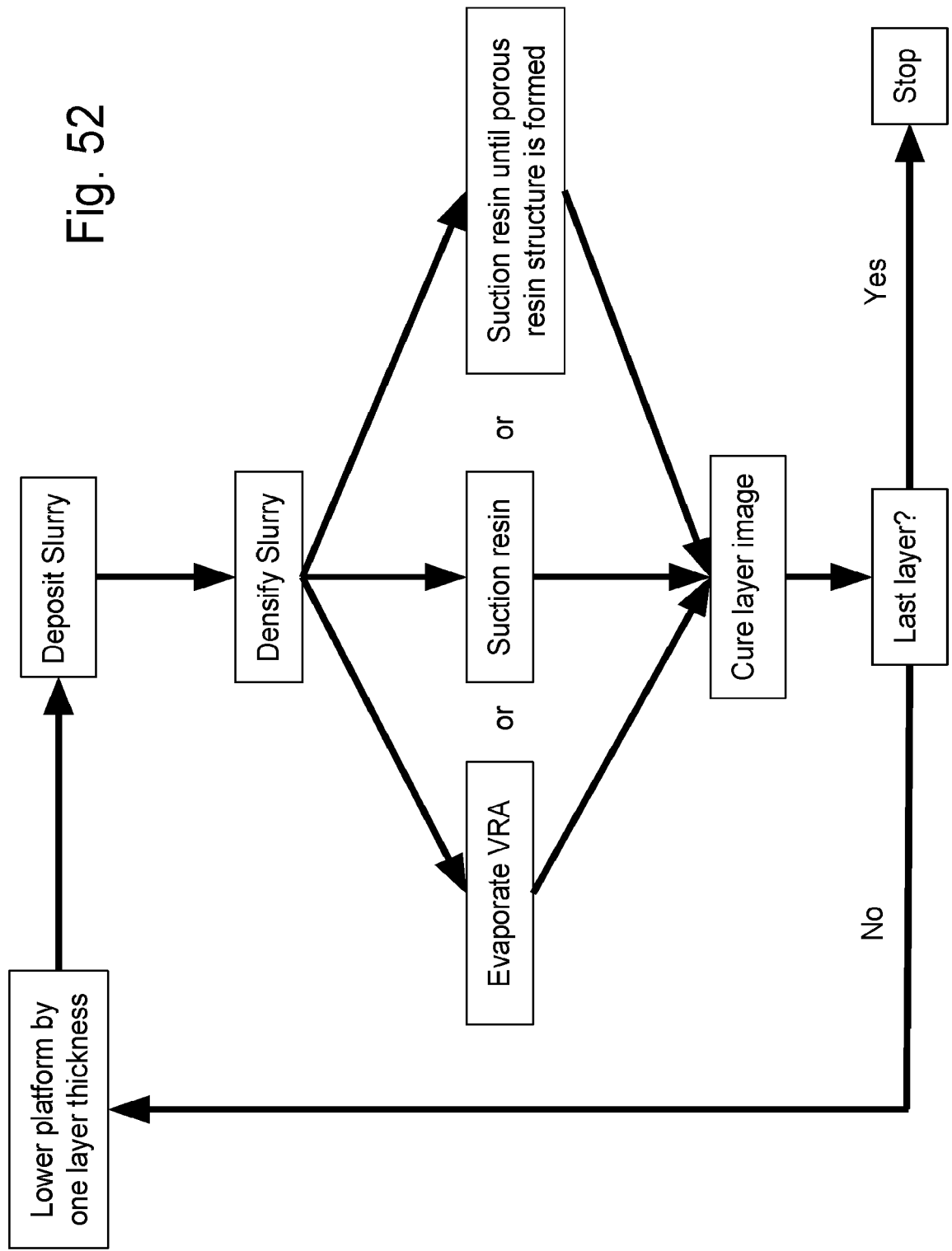
FIG. 52 is a schematic flow chart depicting materials handling processes that may be used in one or more of the previous embodiments of the presently disclosed subject matter.

FIG. 52 describes a generalized version of the manufacturing process that has been shown in various embodiments in many of the previous figures. In order to overcome the inherent viscosity/speed limitations of traditional slurry-based SLA fabrication, a slurry is deposited to produce a layer of material, after which the density of this deposited material is altered by any of several methods, including but not limited to the evaporation of one or more components of the slurry, the removal of some of the liquid component of the slurry via suction, or the removal of a significant majority of the liquid component of the slurry via suction. Following density modification, an image is projected onto the build area to selectively modify at least a portion of the slurry to solidify the liquid component of the slurry, and the process is repeated to fabricate a part in a layerwise manner.

Figure 53:
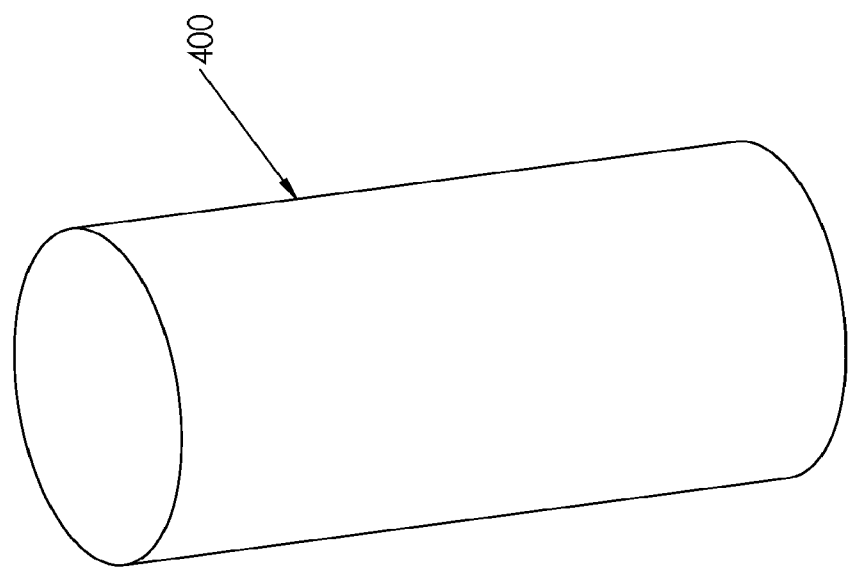
FIG. 53 is an elevated perspective view of an object which may be fabricated with the machine in FIG. 34.
Figure 54:
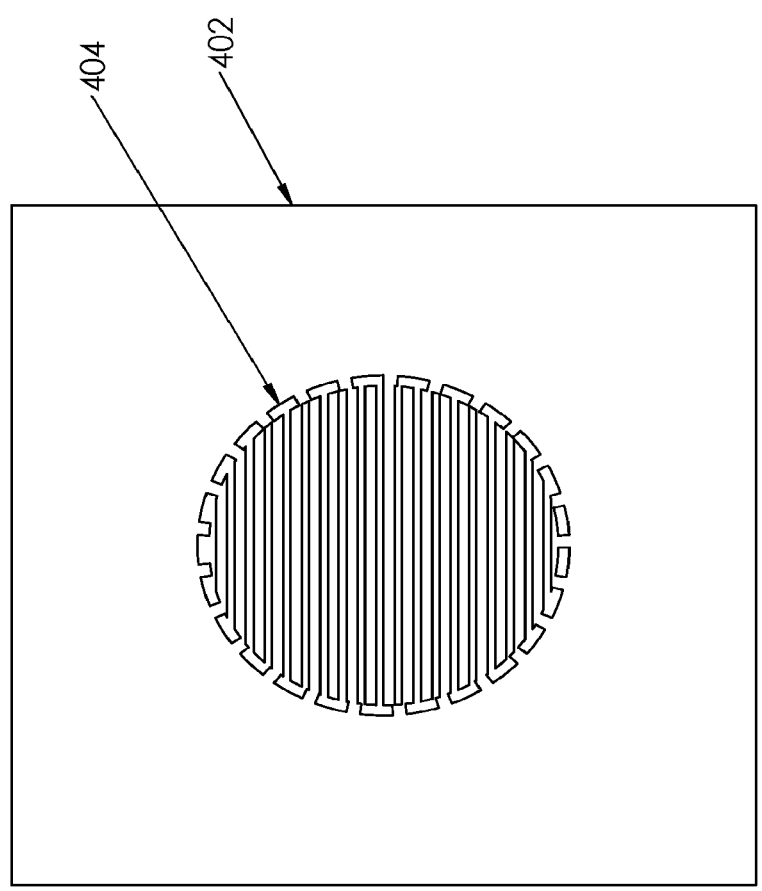
FIG. 54 is a top view of an image which may be used to fabricate a first layer of the object in FIG. 53.
Figure 58:
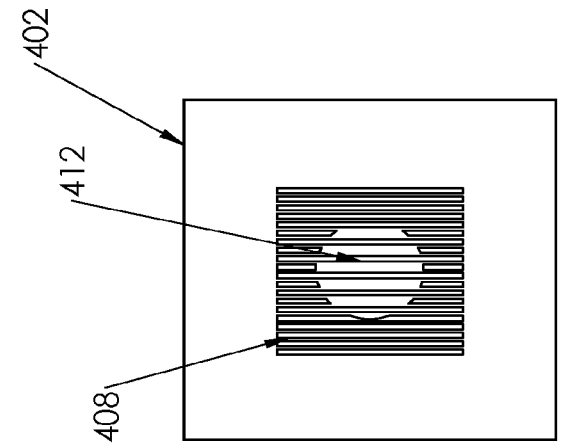
FIG. 58 is a top view of a third step in a method for modulating resin flow in an object fabricated by the machine in FIG. 34.
Figure 57:
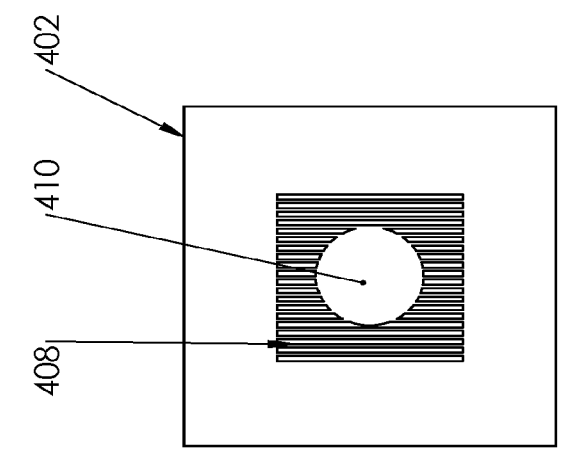
FIG. 57 is a top view of a second step in a method for modulating resin flow in an object fabricated by the machine in FIG. 34.
Figure 56:
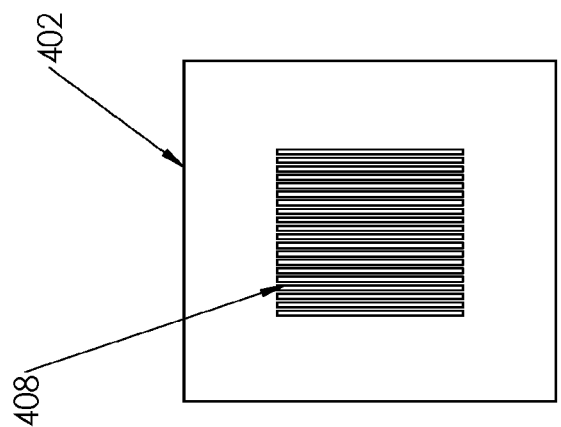
FIG. 56 is a top view of a first step in a method for modulating resin flow in an object fabricated by the machine in FIG. 34.

FIG. 53 depicts a component (400) which may be fabricated using one or more of the previously described systems. FIGS. 54 and 55 depict cure patterns (404, 406) which may be used to form a lattice structure that both binds together powder to form the component (400) and also allows resin to flow to subsequent layers of powder. In some cases, it may be desirable to change the lattice structure of a fabricated object during the build process, in order to allow more or less resin to flow to subsequent layers. FIGS. 56-58 depict one method of implementing this. FIG. 56 depicts a lattice structure (408) projected onto a build surface (402). FIG. 57 shows a resin acceleration zone (410) within which it is desirable to increase resin flow to subsequent layers. FIG. 58 shows an altered lattice pattern (412) within this zone (410) that will allow for increased resin flow. In general, local alterations to the lattice pattern in a given layer may be done before a build process begins, during the build process but before the layer in question is fabricated, or during the process of fabricating the layer in question.

Figure 59:
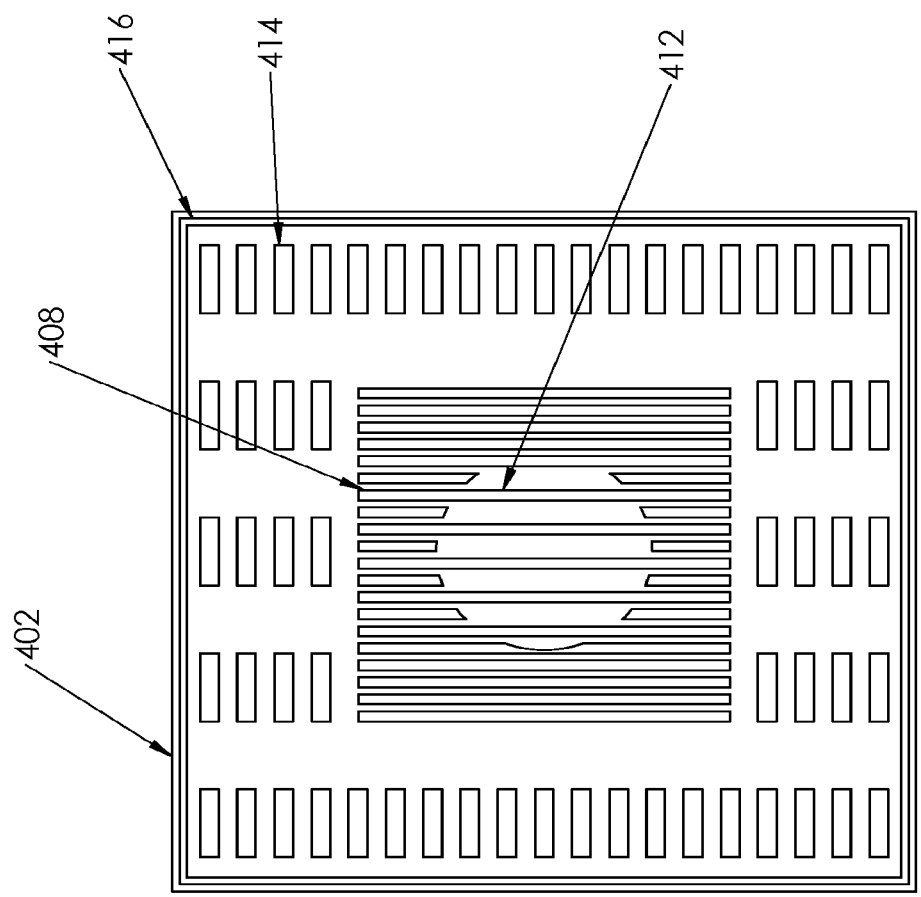
FIG. 59 is a top view of a method for modulating resin flow around an object fabricated by the machine in FIG. 34.

FIG. 59 depicts additional imaging methods by which fluid flow may be controlled in a build process. The addition of flow restriction features (414) in an area exterior to the part being built can serve to regulate fluid flow across a build area such that fluid flow rates are more uniform across this area. In any of the previously described systems where fluid flows through a porous powder composite part, regulation of fluid flow rate to optimize uniformity may be desirable, and the addition of flow restriction features (414) is one method to achieve this end. In general, flow restriction features (414) will reduce the effective area through which fluid may flow, without being connected to one another such that an additional object would be produced which would then need to be removed during the cleaning process following the completion of the build process. Any geometry of flow restrictors is possible for this method of flow regulation, as long as the flow restrictors are strictly disjoint within a given layer and from one layer to the next. In this manner, they will be washed away with relative ease during the cleaning process, since they effectively behave as unbound material because they have not been given enough structure to produce a bound volume of material with any significant structural integrity.

Additionally, FIG. 59 includes a border feature (416) which may generally be used to contain fluid flow within the print area as a whole. This border feature (416) may restrict fluid flow from infusing into excess powder in the case of dry powder deposition followed by infusion, it may serve to provide a distinct flow path during layer densification as in the case where a low density slurry is deposited and then densified by a pressure gradient, or in general may be used to restrict flow to a target build area or subregion of that area. Since this border is built as the part or parts are built, there are no edge effects to disturb powder deposition within the relevant build area, as there would be in a system where the build platform is a contained piston, as is common in existing powder bed fusion systems.

Figure 60:
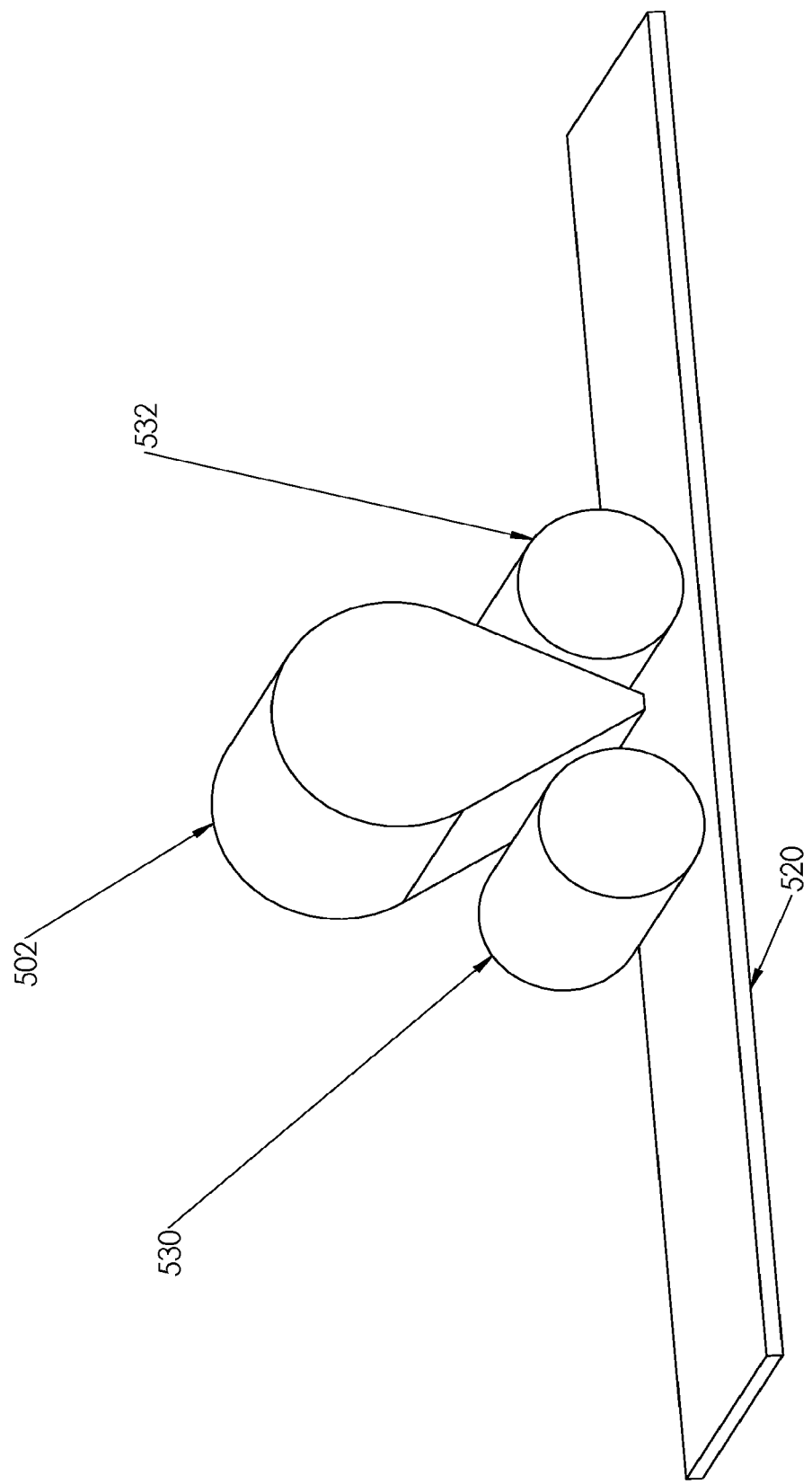
FIG. 60 is an elevated perspective view of a first embodiment of a material deposition system for use in the machine in FIG. 34.

FIGS. 60-78 depict multiple systems for materials handling and components associated therewith which may improve on the previously described system. In general, metering powder to produce a flat layer that meets the requirements of a SFF system may or may not be feasible in a single module; FIG. 60 shows a system that uses a powder metering system (502) and a pair of rollers (530,532) which may be used to condition the powder deposited by the powder metering system (502) in order to produce a flat layer. Having two rollers (530,532) allows powder to be conditioned regardless of which direction the assembly is traveling with respect to the build surface (520), allowing the material handling process to be expedited.

Figure 61:
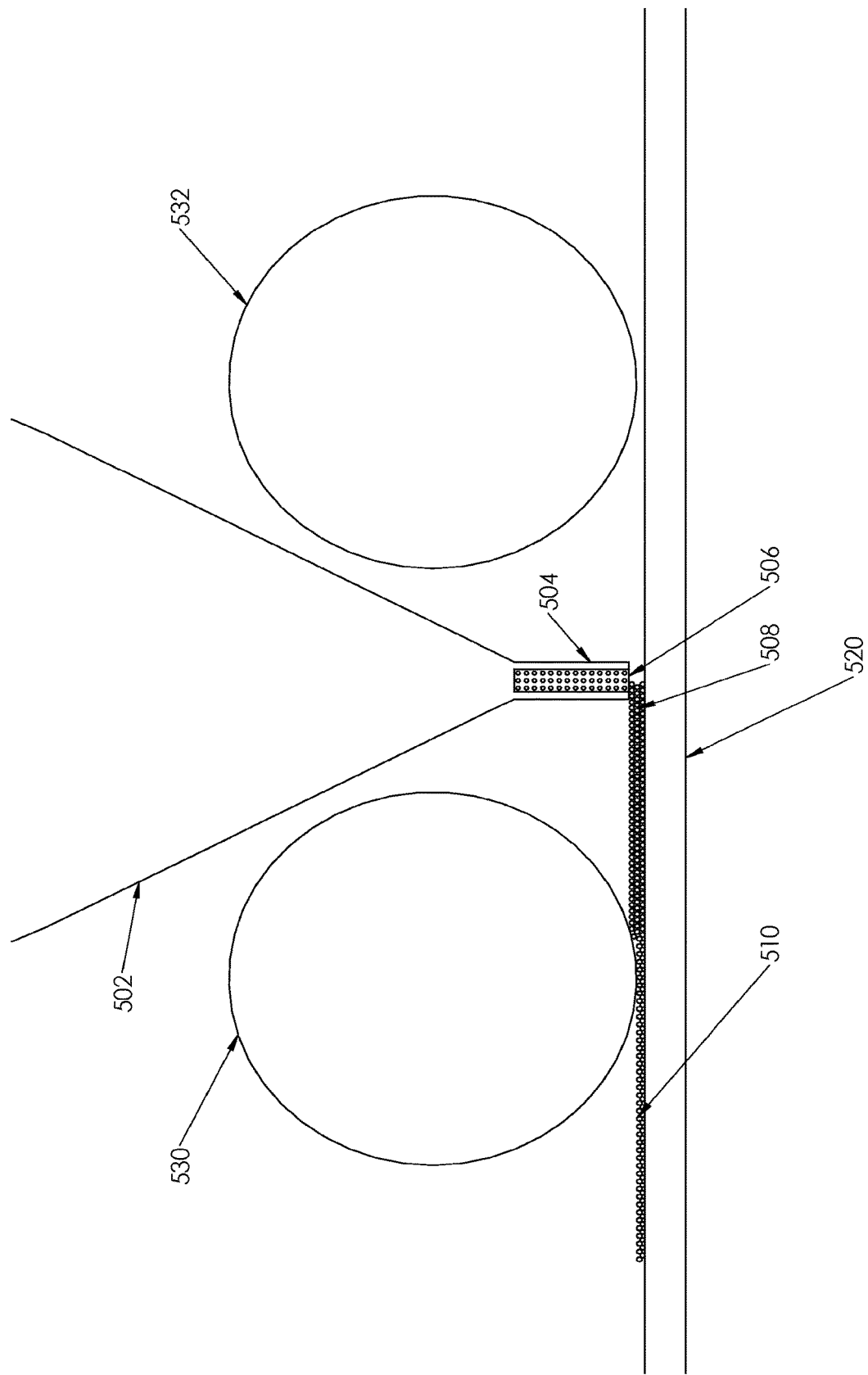
FIG. 61 is a magnified sectional view of a second embodiment of the material deposition system in FIG. 60.

FIG. 61 depicts a system for powder deposition that may be used in any of the previously described systems that require the deposition of a layer of powder. In general, there are several design constraints to consider with a powder deposition system, related to speed, reliability, quality, and potential adverse effects on the part being built and the machine itself. In previously described systems, a powder metering system has been used in combination with a roller to produce layers of powder. However, if powder is metered out too quickly, it can aerosolize when it is gravity fed onto a build surface. FIG. 61 depicts a powder metering system (502) which has an exit shroud (504) that restricts the flow of aerosolized powder as it is being deposited (506) onto the build surface (520) and produces a flat layer of powder (508) that is already partially conditioned, which can then be further compacted by the roller (530) to produce a uniform layer of powder with high density (510). The use of such a shroud (504) may increase the permissible speed with which the system operates, while preventing powder (506) from escaping the build area and interfering with other mechanical and/or electrical systems. The advantage of this shroud (504) is derived from two aspects; the presence of an edge for pre-conditioning the layer of powder (508), and the fact that the powder (506) being deposited is fully enclosed by the shroud. This is distinct from a normal doctoring blade, which provides containment on one side, but leaves powder generally exposed to the build environment, permitting a greater degree of aerosolization. Full enclosure combines the function of pre-conditioning with a greater degree of containment of potentially aerosolized powder.

Figure 62:
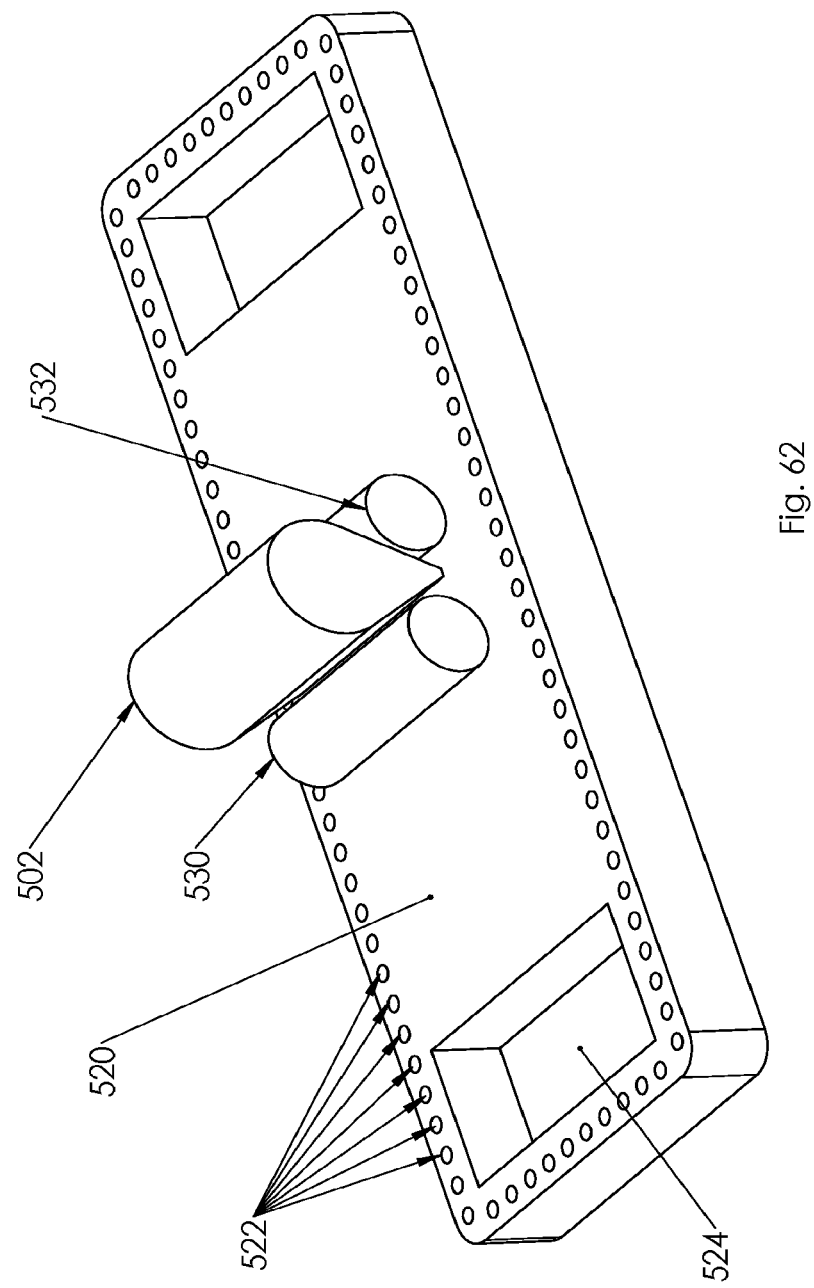
FIG. 62 is an elevated perspective view of an alternate embodiment of a build surface for use in the machine in FIG. 34.

FIG. 62 depicts another improvement to previously described systems that allows for better powder containment. A modified build platform (520) has vents (522) that may suction the surrounding environment to prevent aerosolized powder from escaping the platform, as well as powder collection pockets (524) to collect any extra powder that is deposited for a given layer. These further improvements manage where powder is allowed in the overall fabrication system, thus preventing any damage that could occur from powder intrusion into the actuation/control elements of the system.

Figure 63:
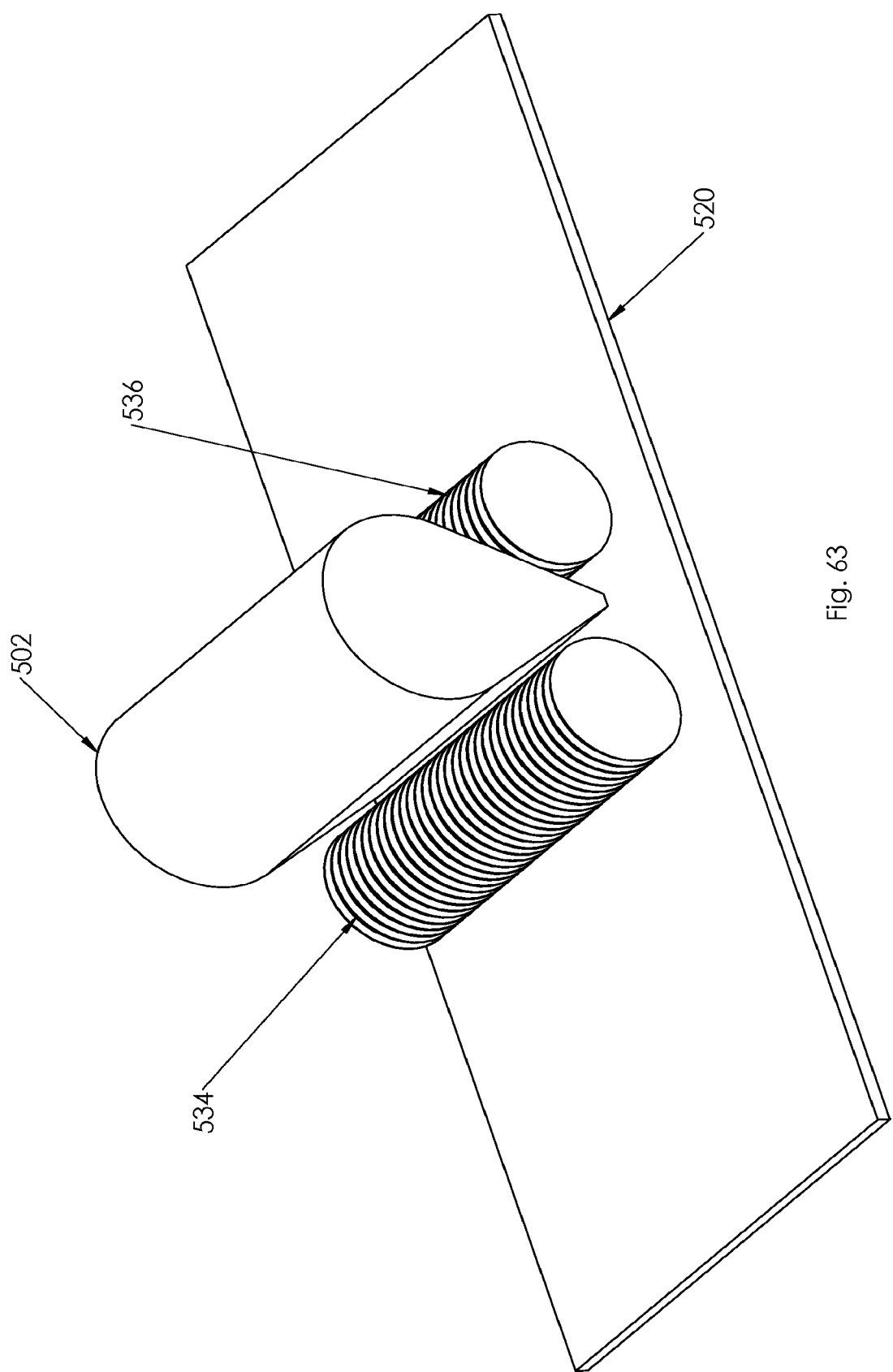
FIG. 63 is an elevated perspective view of a second embodiment of a material deposition system for use in the machine in FIG. 34.

In some cases, material may be used which is fibrous in nature, or which contains non-spherical particles. Some ceramics, for example, may be produced with elongate particles, wherein alignment of those particles in a fabricated component may be desirable to produce certain anisotropic mechanical properties. FIG. 63 shows a system that is more adapted to this class of material, wherein ridged rollers (534,536) are used to condition layers of material and align elongate particles. In general, any roller that is configured with ridges, comb-like prongs, or other mechanism designed to interact with and align elongate particles may be used here.

Figure 64:
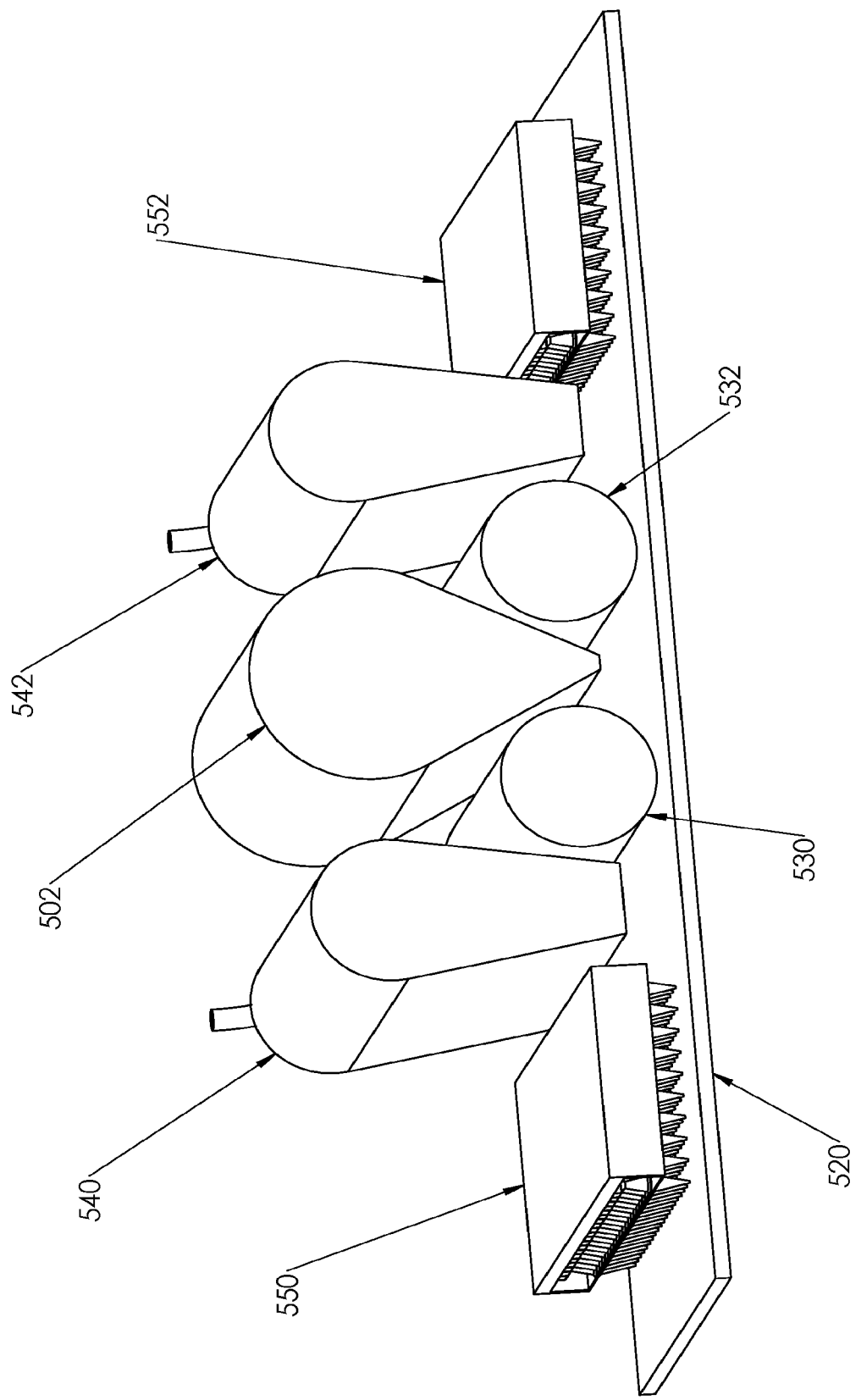
FIG. 64 is an elevated perspective view of a third embodiment of a material deposition system for use in the machine in FIG. 34.

FIG. 64 depicts a much more elaborate material handling system that obviates the need for the imaging unit (106) and/or infusion platform (504) shown in previous figures. In this system, a powder metering system (502) deposits powder, rollers (530,532) condition the powder layer, vapor resin modules (540,542) infuse the powder with resin, and microLED arrays (550,552) cure the resin to bind the powder material. This system is symmetric, just as the previous systems, in order to expedite the production process. When the material deposition moves to the right relative to the build surface (520), the primary roller (530), primary vapor resin module (540), and primary microLED array (550) are used. When the material deposition system moves to the left relative to the build surface (520), the secondary roller (532), secondary vapor resin module (542), and secondary microLED array (552) are used. In this way, the material deposition module may traverse the build surface (520) back and forth, with no delay between the production of consecutive layers.

Figure 66:
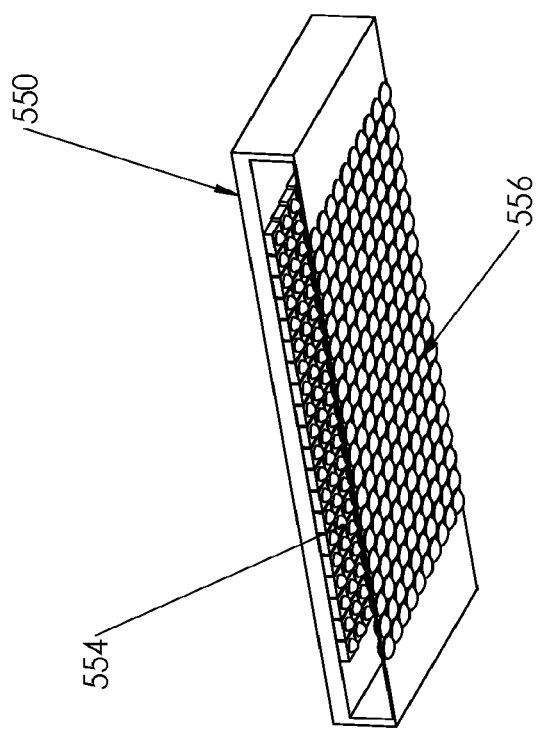
FIG. 66 is a perspective view from below of the imaging array in FIG. 65.
Figure 65:
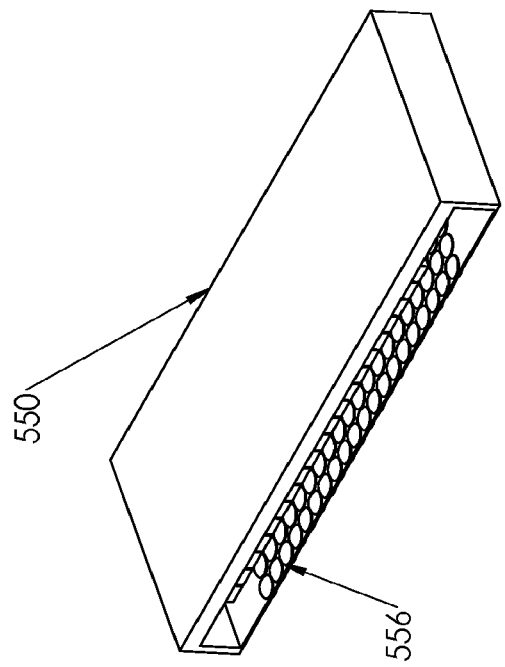
FIG. 65 is an elevated perspective view of an imaging array as depicted in the system in FIG. 64.
Figure 67:
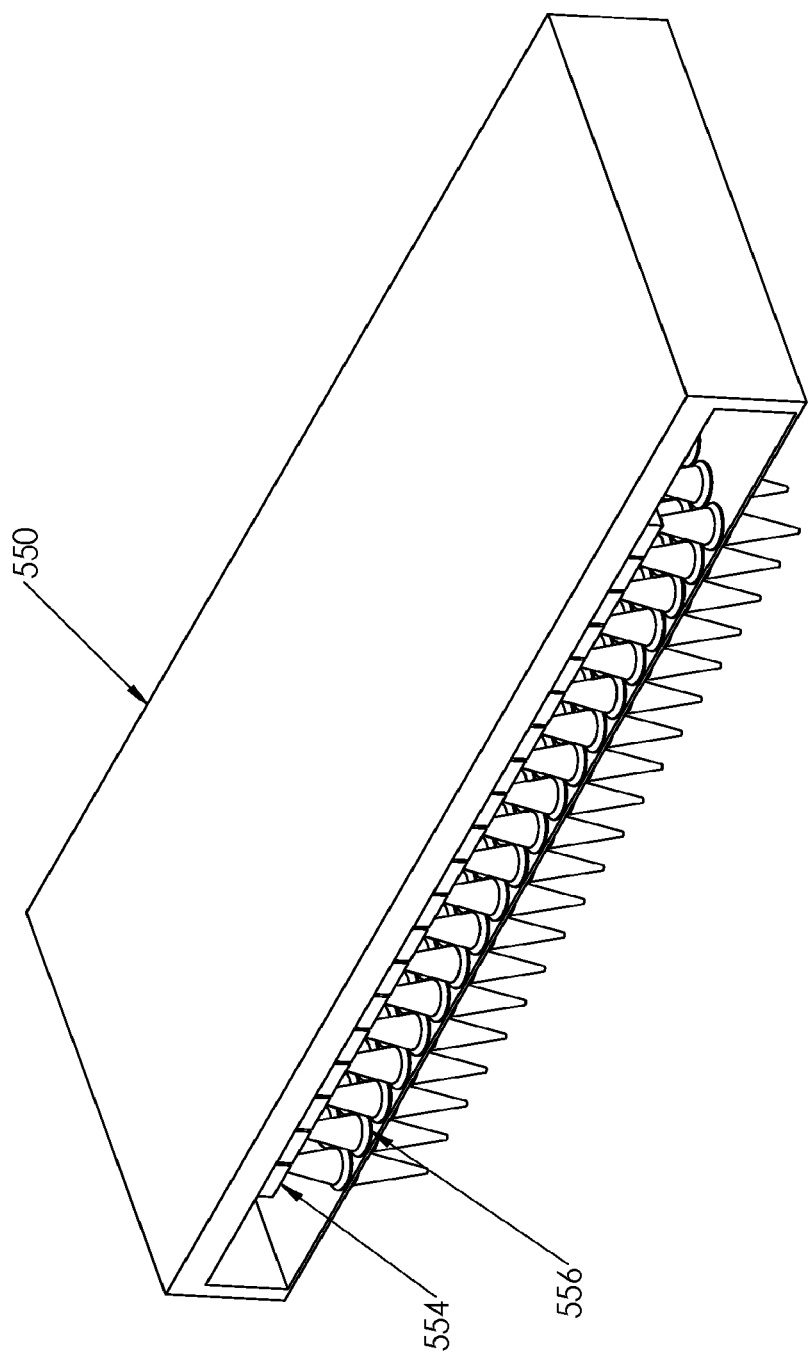
FIG. 67 is a perspective view of the imaging array in FIG. 65 in a second configuration.
Figure 68:
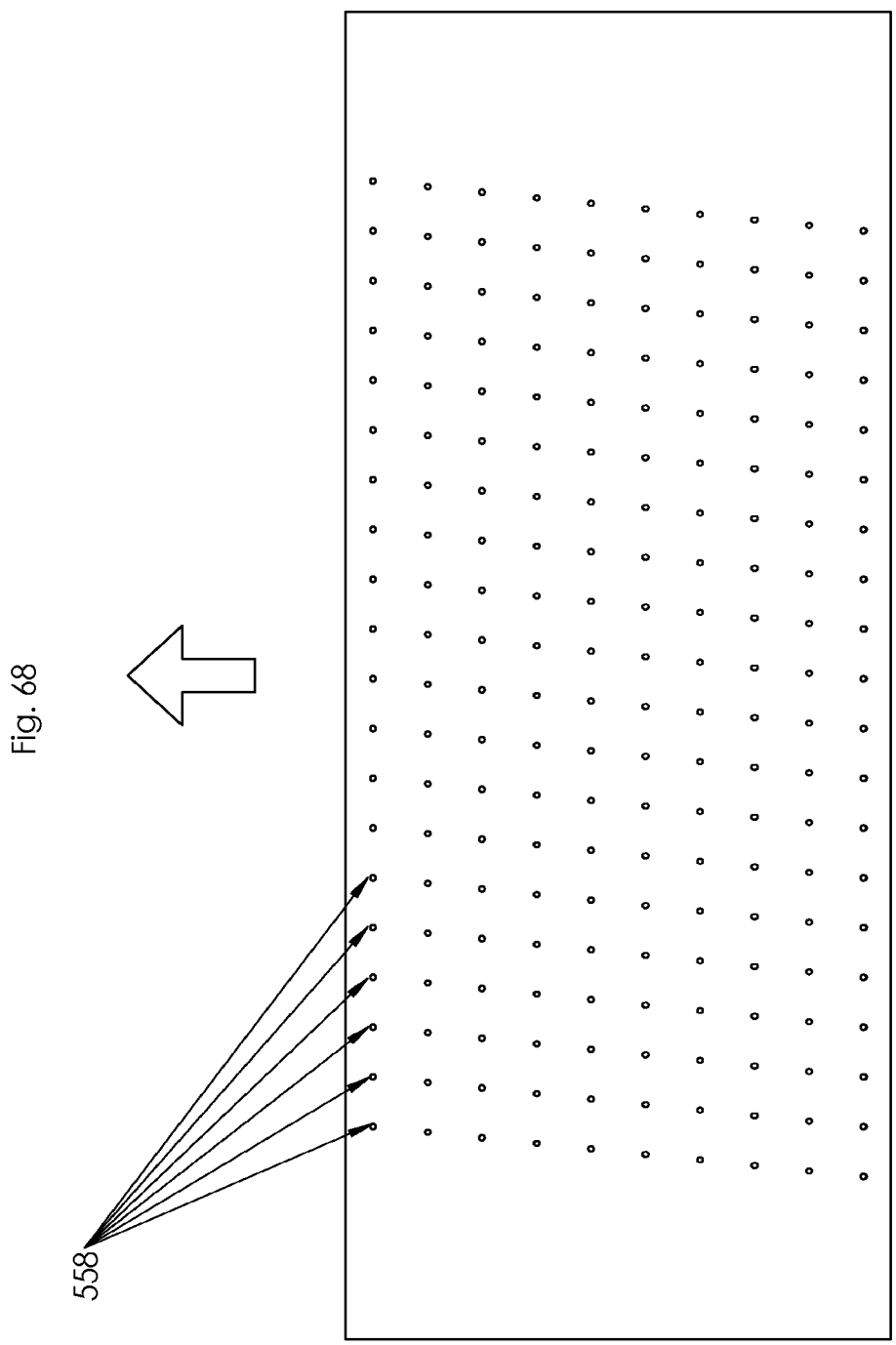
FIG. 68 is a top view of pixels projected by the imaging array in FIG. 65.
Figure 69:
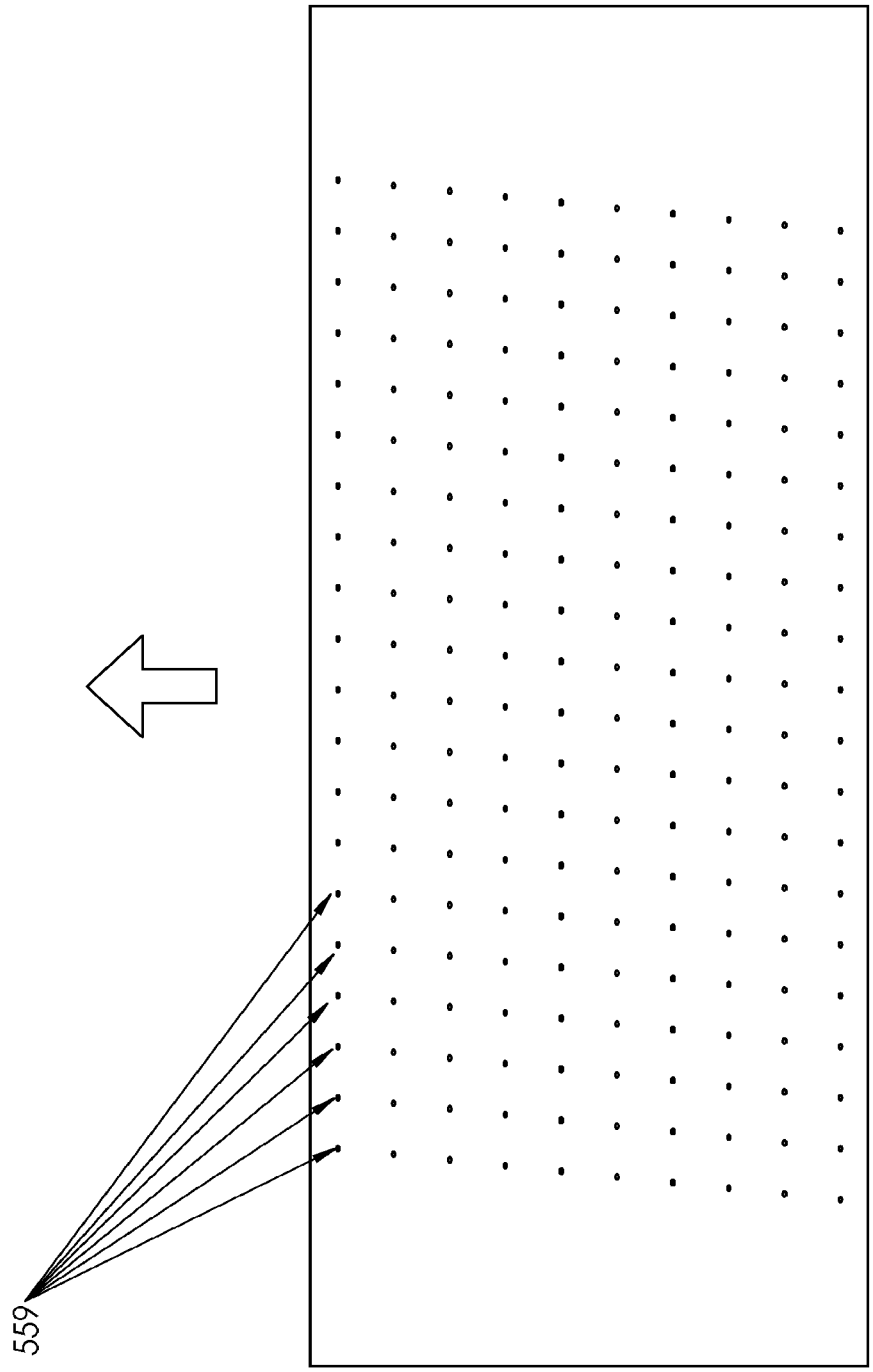
FIG. 69 is a top view of pixels projected by a second configuration of the imaging array in FIG. 65.

FIGS. 65-67 depict the primary microLED array (550) in more detail. The microLED array (550) consists of an array of microLEDs (554) and an array of microlenses (556). As such, each LED may produce a spot that is substantially smaller than the LED itself. Each row of microLEDs is shifted laterally relative to the previous row by one at most one spot width, and the number of rows is such that the entire build area may be imaged. The image projected by this system is shown in FIG. 68. The lateral shift of each row, coupled with the movement of the entire array across the platform, replaces the shifting effect of the refractive pixel shifting system described previously. Additionally, this system may use the previously described astigmatic optics in order to optimize resolution and cure response; FIG. 69 shows the image produced by an array of astigmatic microLED systems according to this implementation.

Figure 70:
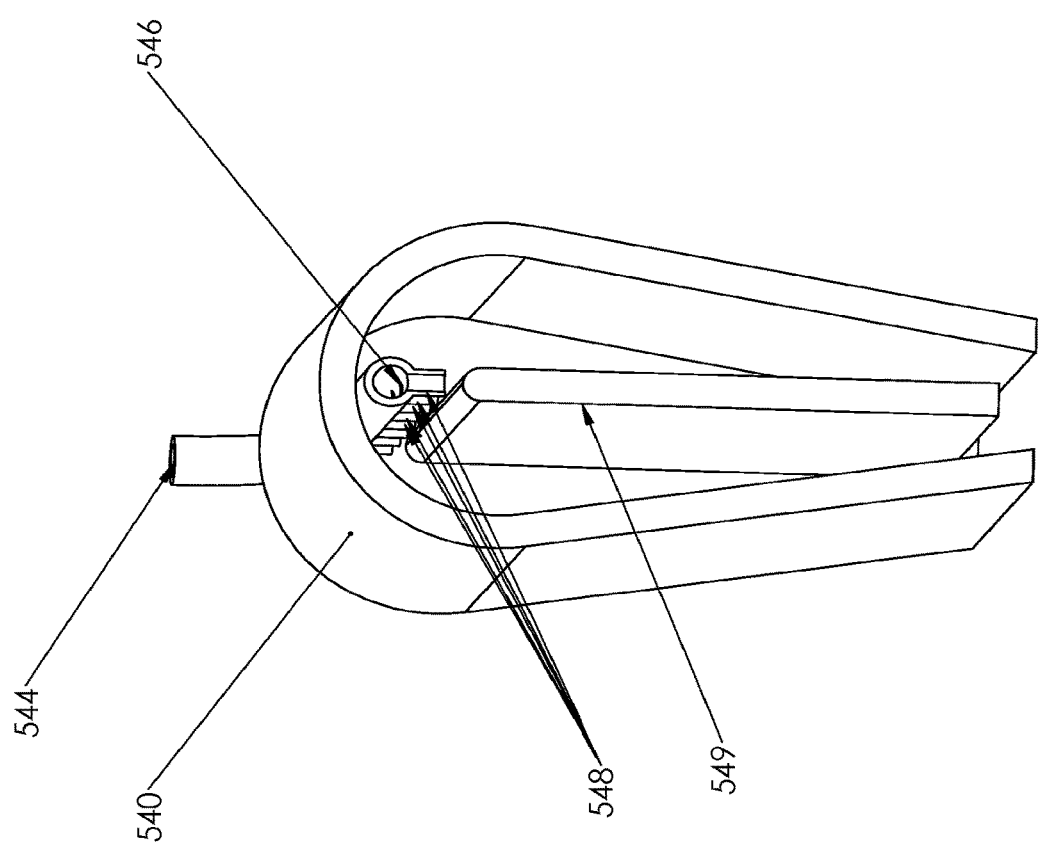
FIG. 70 is a sectional view of a vapor module as depicted in the system in FIG. 64.

FIG. 70 depicts the primary vapor resin module (540). This module converts liquid resin into a vapor which may be then absorbed by a layer of powder wherein the resin condenses back into a liquid form and it irradiated to bind together powder material. By using a vapor delivery system, it may be possible to reduce the amount of resin required by the process and expedite the materials handling process overall. In this embodiment, a resin supply line (544) brings resin into the module (540). Resin is distributed to multiple channels (548) from a central resin channel (546) in order to evenly apply resin to a vaporizing element (549). The vaporizing element may in general be actuated by ultrasonic vibrations, thermal energy, or other means which causes resin in contact with the vaporizing element (549) to be converted from a proximately liquid state to a proximately vaporized state. In addition, the vapor may be electrostatically charged by a voltage applied to the vaporizing element (549), a voltage applied to a secondary charging element that the vapor is exposed to, exposure to an electron gun or other charge source, or by any other available means to cause the vapor droplets to become electrostatically attracted to the build area, which may in general be electrically grounded or otherwise electrically manipulated to create the desired behavior.

Figure 71:
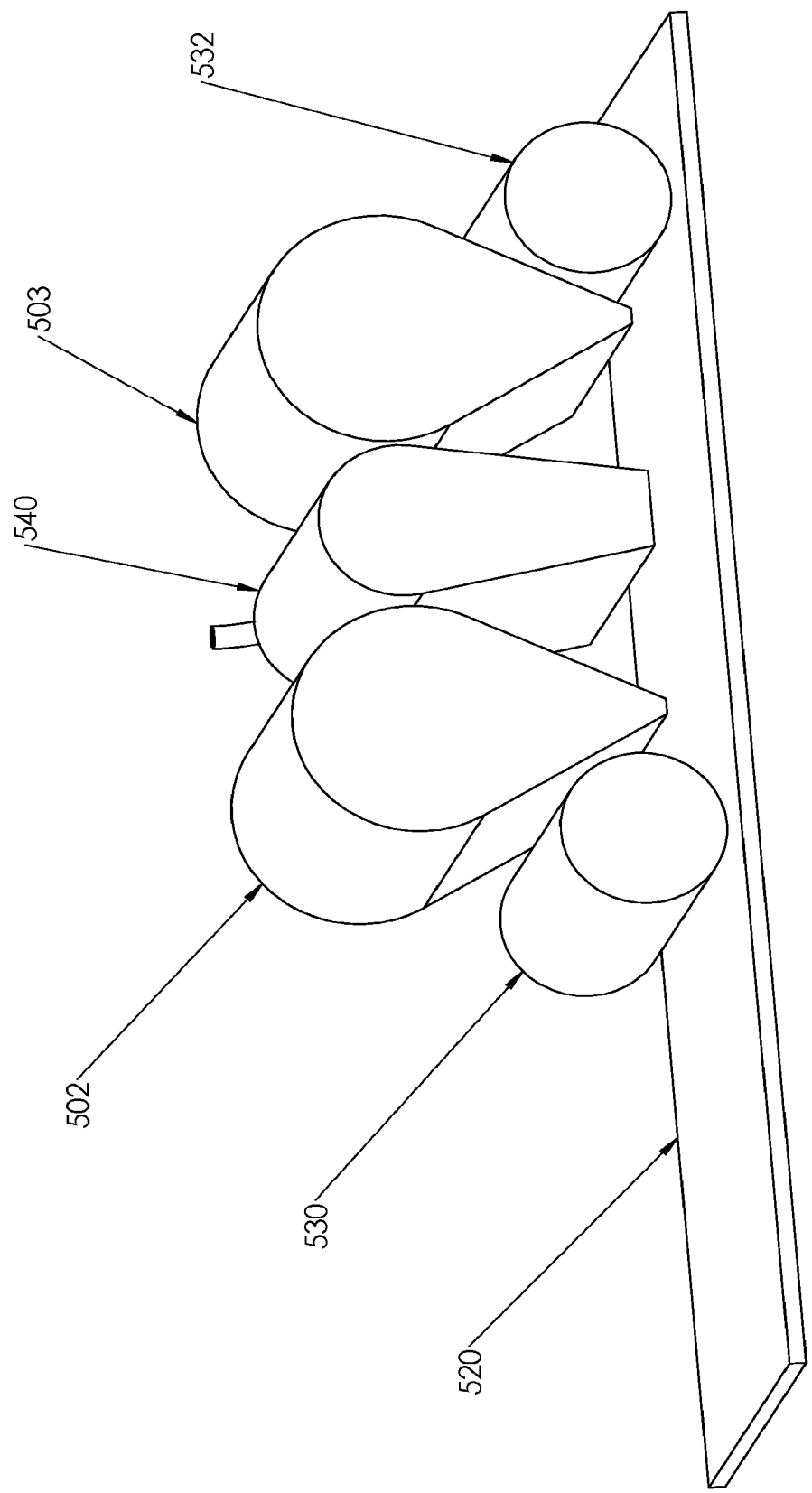
FIG. 71 is an elevated perspective view of a fourth embodiment of a material deposition system for use in the machine in FIG. 34.

FIG. 71 depicts an alternate configuration of a material deposition system in which a vapor resin module (540) deposits resin prior to the deposition of powder from either the primary powder metering system (502) or the secondary powder metering system (503). Powder layers may be conditioned by either the primary roller (330) or secondary roller (532) depending on the direction of travel of the material deposition system. In this configuration, resin vapor is deposited onto the build surface (520) before powder, allowing the resin vapor to coalesce into a liquid film prior to the application of a powder layer. The resin is then allowed to permeate the powder in a bottom-up fashion, using the weight of the powder and the force of the rollers (530,532) to expedite the infusion process.

FIGS. 72-75 depict the process implemented with the system in FIG. 71 in more detail. A film of resin (590) is deposited on a build surface (520) followed by a first layer of powder (592) which becomes infused with resin (590) as it is deposited. In general, the thickness of the film of resin (590) will be substantially less than the thickness of the layer of powder (592) such that only enough resin (590) as is necessary to substantially bind together the powder layer (592) is provided. After a portion of the layer is cured, additional resin (594) is deposited, raising the resin level such that a second layer of powder (596) may be deposited and infused. This may be repeated with additional depositions of resin and powder until the build process is complete.

Figure 76:
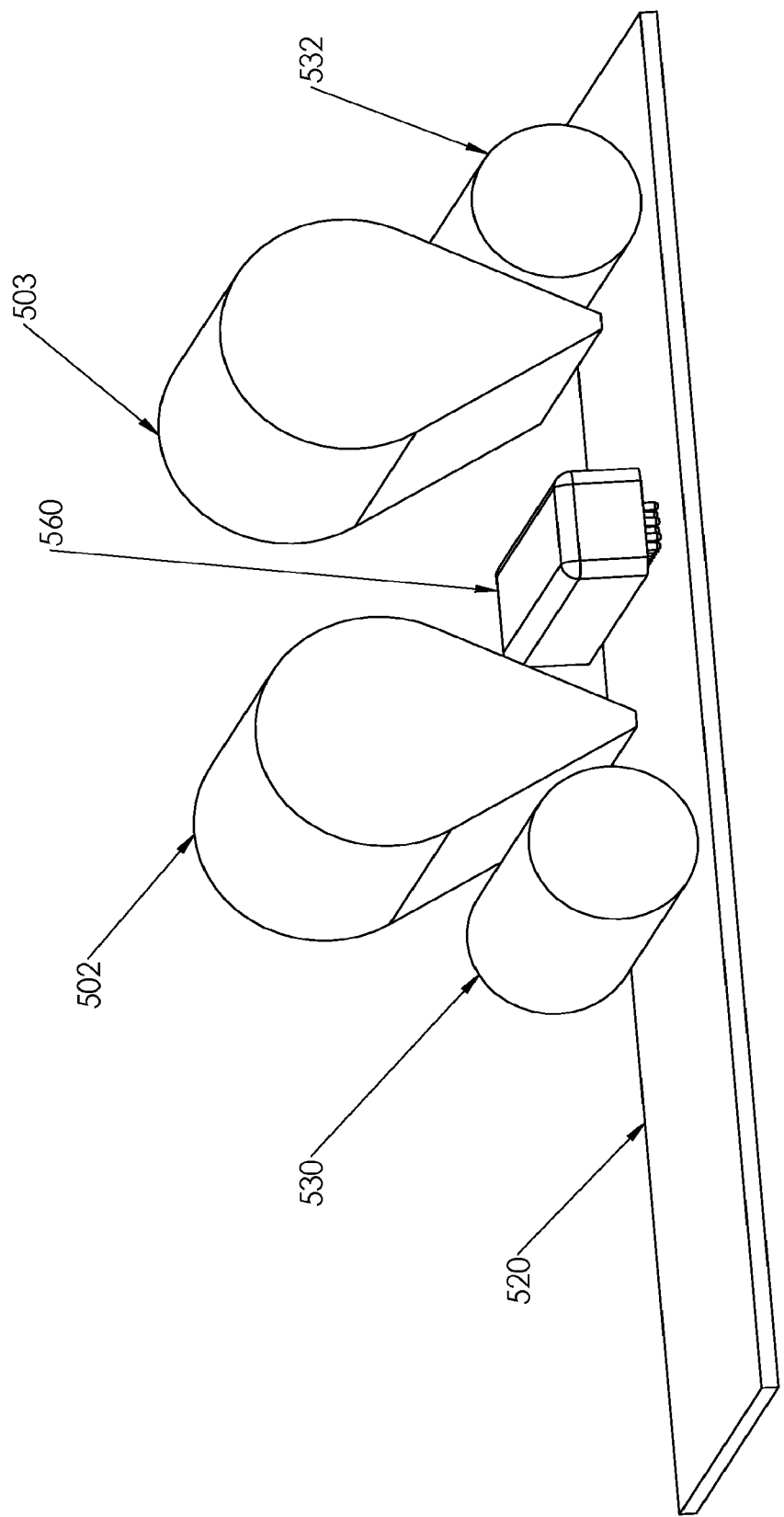
FIG. 76 is an elevated perspective view of a fifth embodiment of a material deposition system for use in the machine in FIG. 34.
Figure 77:
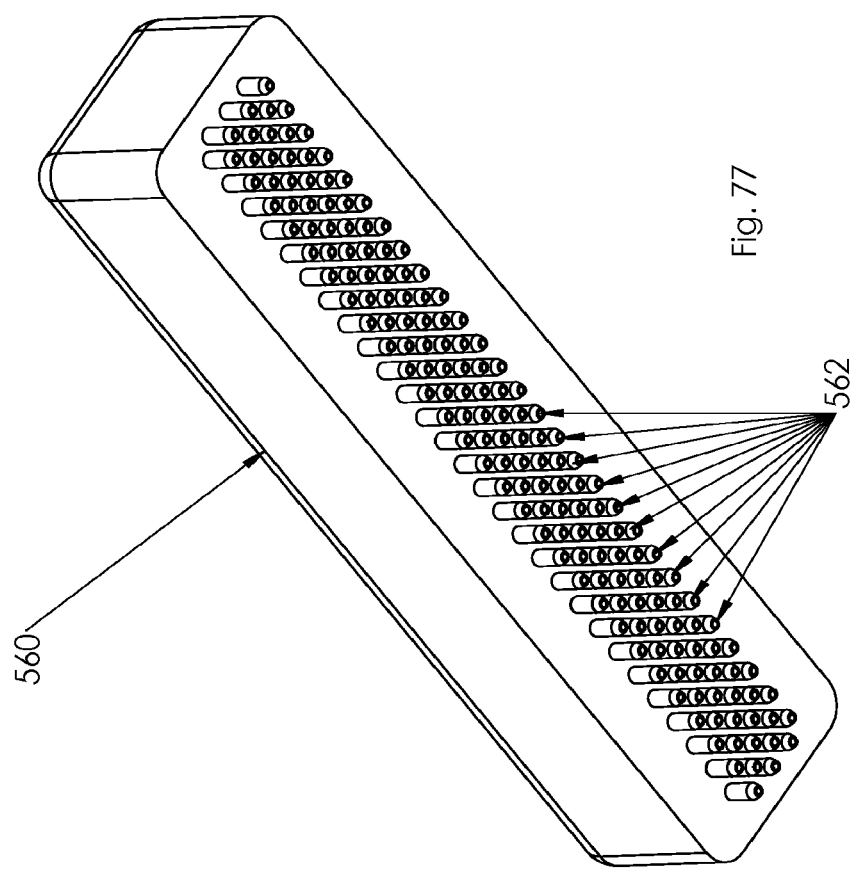
FIG. 77 is a perspective view from below of a microdroplet deposition system as depicted in the system in FIG. 76.
Figure 78:
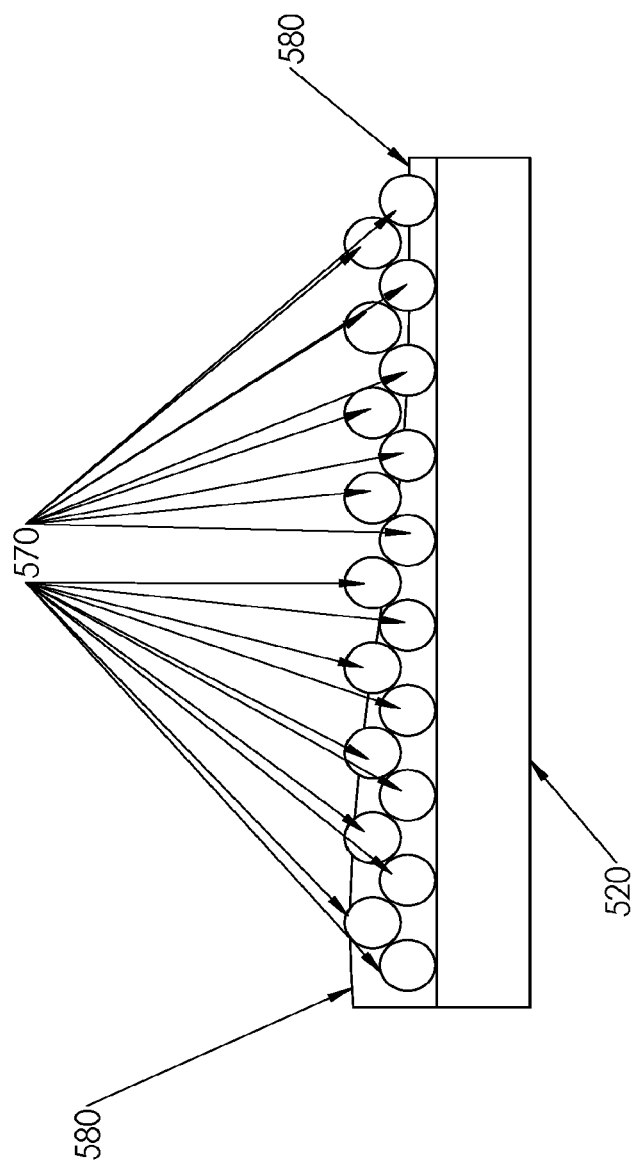
FIG. 78 is a sectional view of material deposited by the system in FIG. 76.

FIG. 76 depicts a similar configuration to that of FIG. 71, in that resin deposition occurs prior to powder deposition. The key difference is that a resin microdroplet deposition array (560) is utilized rather than a vapor resin module (540). The resin microdroplet deposition array (560) is shown in more detail in FIG. 77. An array of microdroplet dispensers (562) is used to deposit droplets of resin as the system traverses the build surface (520). Since this provides a degree of control over the quantity of resin deposited in a given area, the depth of resin in a particular region of the build area may be controlled, producing unequal amounts of infusion in a given powder layer. This may be useful for improving print resolution in the vertical direction, by effectively enabling the printing of fractional layers. While it is relatively simple to print a fractional layer that is at the top of a normal layer by limiting the irradiation of that area, and thus limiting the cure depth of the resin binder, it is typically not possible to print a fractional layer that is at the bottom of a normal layer. This system makes it possible to achieve this type of curing behavior. FIG. 78 shows the results of such a process; the resin boundary (580) varies across the build surface (520) and binds the powder particles (570) at different levels. Recognizing that this depiction is a schematic representation of the process, as well as the fact that most powder used in a build process will have a distribution of different particle sizes wherein the maximum particle size will in general be lower than the thickness of a layer of powder, this varying resin boundary (580) will in general translate to a similarly varying boundary of a printed part.

Given that there are constraints on the size of droplets achievable in conventional microdroplet deposition systems, it may be advantageous to deposit microdroplets that consist of a suspension of resin droplets within a carrier medium that may evaporate upon deposition, allowing the resin droplets to coalesce into a film. For example, droplet jetting systems may typically be restricted to droplets on the order of picoliters, whereas it may be possible to produce droplets in a suspension that are on the order of femtoliters. In this manner, thinner films of resin may be generated than would otherwise be possible with direct deposition from a microdroplet deposition system.

In the previous figures, methods for fabricating fractional layers have been described. This may be achieved by other means as well, by controlling the binder composition, cure atmosphere, and wavelength(s) of light used to cure the binder material. In general, shorter wavelength light is more effective at curing at the surface of a photosensitive material, due to its superior ability to overcome oxygen inhibition. As such, the top section of a layer may be cured by a short exposure to high intensity short wavelength UV light. The deeper sections of a layer may be cured without curing the top portion of the layer by a longer exposure to lower intensity long wavelength UV light. Additionally, fluorescent catalysts may be added to a binder formulation to increase the depth of cure and to allow for selective curing of various depths of a layer of material.

The family of coumarin dyes is particularly effective in the UV and blue portion of the spectrum, having fairly high quantum yields and both absorption and emission peaks below 500 nm. A number of configurations are possible, each with beneficial effects, utilizing photoinitiator(s) that are sensitive below 500 nm, fluorescent dye(s), and mono- or polychromatic imaging systems. The simplest case is a formulation with a photoinitiator (PI) system, fluorescent dye, and monomer system, wherein the PI system is sensitive at both the absorption and emission regions of the spectrum of the fluorescent dye. Using such a system, particularly when this is used as a binder for powder materials with a very high volumetric loading fraction, is that direct line of sight to all regions that need to be cured in a given layer is impossible, and the fluorescent dye acts as a means to access additional regions of binder that would be inaccessible otherwise. The use of a fluorescent dye in this manner, as an optical catalyst, can increase the effective optical penetration depth during the curing process, which may also decrease the required exposure time to bind together a layer of material. In a system such as the one described here, a formulation may be generally understood to contain less than 0.25% by weight fluorescent dye, at least 2% by weight one or more components used as a PI system, and the remainder of the composition may be one or more monomers or oligomers that may be polymerized by the PI system.

Another configuration is a binder containing a PI system with at least two wavelength regions wherein polymerization can occur, a fluorescent dye with an absorption peak between these two regions, and an emission peak within the longer wavelength region of the PI system. Shorter wavelength PIs are generally less affected by the oxygen inhibition effects that are common in free radical systems at the surface of a binder material. In this system, exposure to a short wavelength that is below the absorption region of the fluorescent dye but within the first of the at least two wavelength regions of the PI system will cause polymerization at the surface of a layer of material, and the timing of this exposure may be controlled such that only the top section of the layer is cured. Additionally, exposure to a wavelength within the absorption band of the fluorescent dye may be utilized to cure material in the bottom section of the layer, while oxygen inhibition prevents polymerization at the top section of the layer. In this manner, polymerization of fractional layers may be achieved. In a system such as the one described here, a formulation may be generally understood to contain less than 0.25% by weight fluorescent dye that may be excited at a first wavelength, at least 0.1% by weight of a first photoinitiator that is substantially insensitive at the first wavelength and sensitive at a second wavelength that is shorter than the first wavelength, at least 0.1% by weight of a second photoinitiator that is sensitive at a third wavelength which is longer than either of the first and second wavelengths, and which is substantially contained within the emission band of the fluorescent dye, and at least one monomer or oligomer which may be polymerized by the PI system.

Another method for achieving fractional layer control involves the use of a PI system and monomer system with multiple types of functional groups. For example, a blend of acrylate monomers, or other monomers that are polymerizable through a free radical system, along with epoxide, oxetane, or other monomers that may be polymerized by a cationic system through ring opening polymerization or other means may be used in combination with a PI system containing PIs of both free radical and cationic types. In this system, if the cationic PI is sensitive at a short wavelength and the free radical PI is sensitive at a longer wavelength, a similar behavior to what has been previously described can be achieved. Exposure to a short wavelength may be used to initiate polymerization at the surface of a layer, whereas exposure to a long wavelength may be utilized to cure below the surface of a layer. A fluorescent dye with an absorption band at a longer wavelength than the absorption region of the cationic PI and an emission band within the absorption region of the free radical PI may be used to facilitate curing of the bottom region of the layer as well. Hybrid monomers with both acrylate and epoxide functionality (or other similar groups) may also be used in this context.

Figure 79:
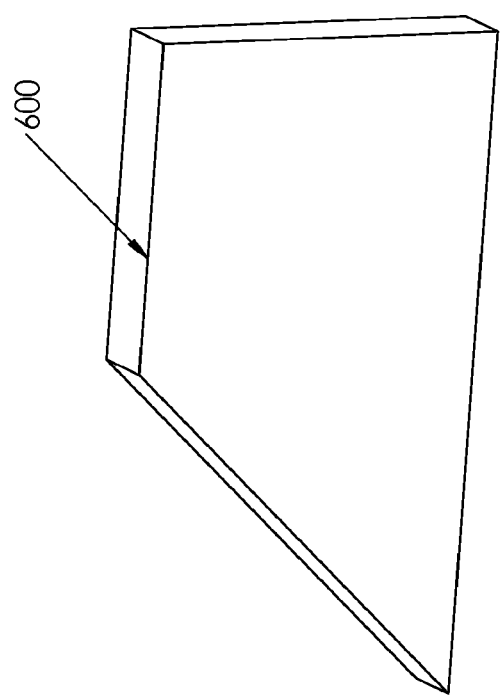
FIG. 79 is an elevated perspective view of a part that may be fabricated by any of the previously described systems.
Figure 80:
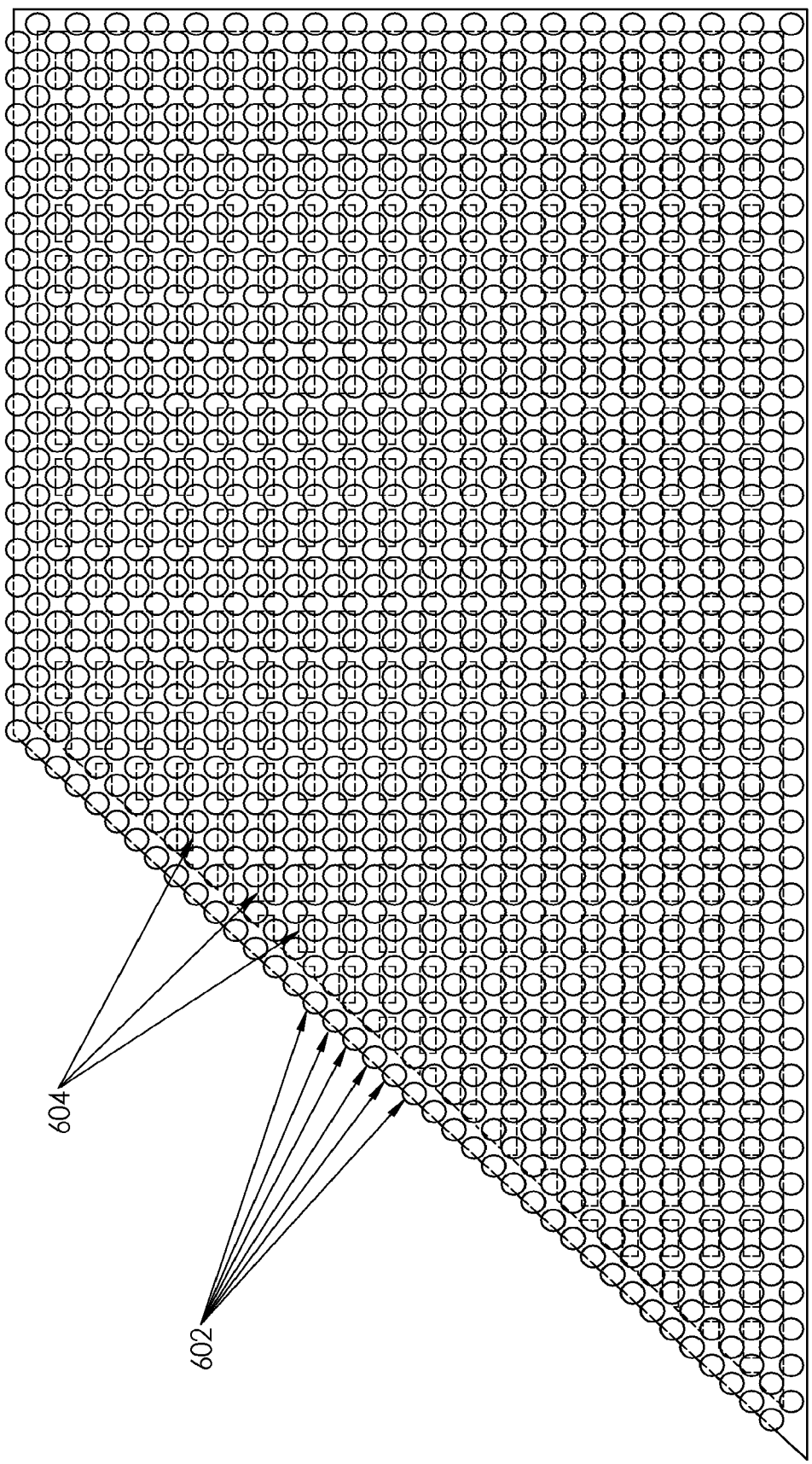
FIG. 80 is a sectional schematic view of powder particle distribution and possible cure patterns in a first step of the fabrication of the part in FIG. 79.
Figure 81:
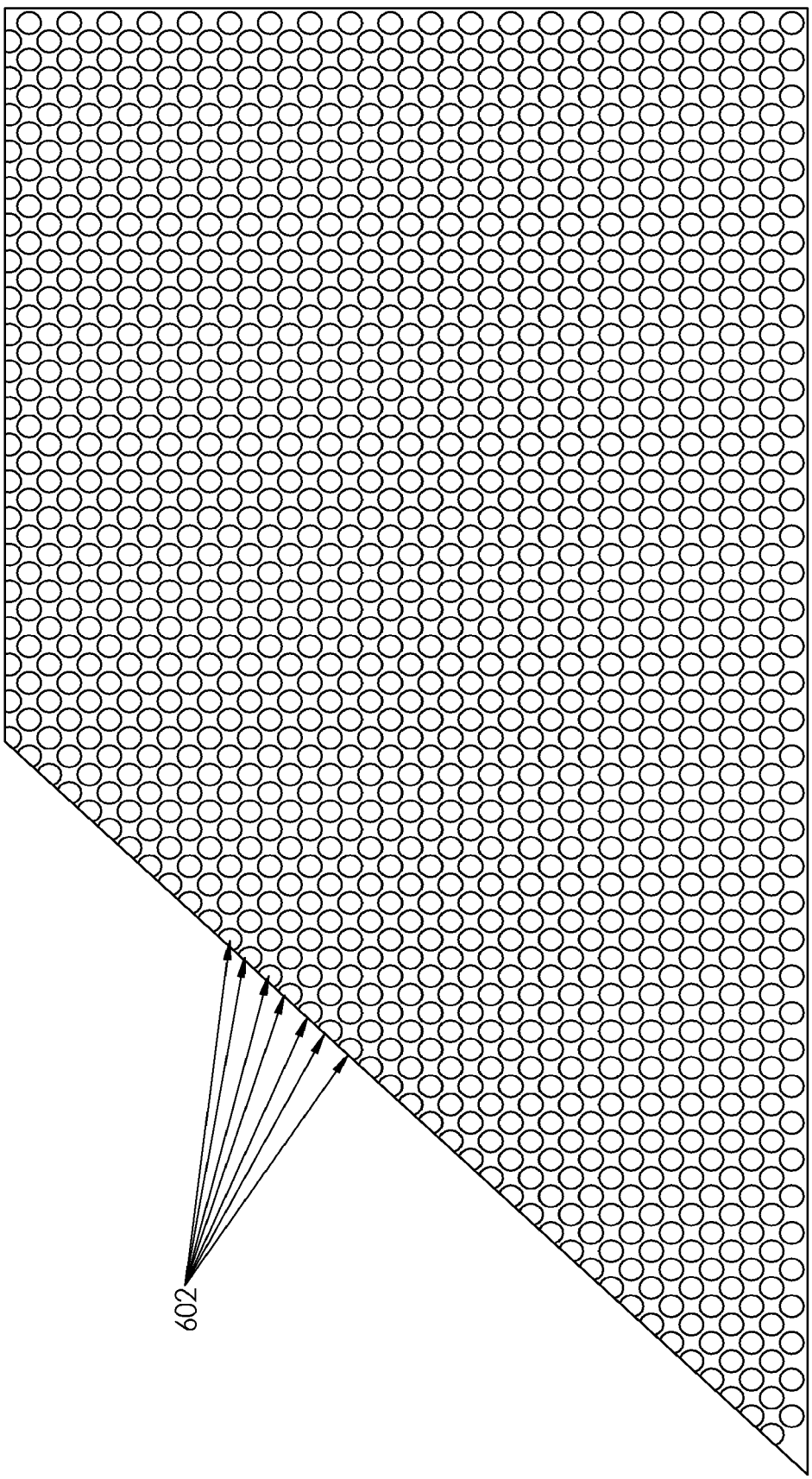
FIG. 81 is a sectional schematic view of powder particle distribution in a second step of the fabrication of the part in FIG. 79.

FIGS. 79-87 describe a number of methods to process printed parts that may improve such parts in a variety of ways. FIGS. 79-81 depict a method by which surface finish may be improved. In general, in many of the previous methods for producing powder composite parts that may be sintered after printing, it is possible for imaging resolution to provide for finer control over geometry than would nominally be allowed based on the size of powder grains in the printed object. FIG. 79 shows one object (600) where this behavior may be observed. FIG. 80 depicts a cross section of this object (600) along with cure patterns (604) that may be used to bind together powder (602) in order to print this object (600). As can be seen in this figure, some powder grains (602) protrude beyond the surface of the object that has been defined by the cure patterns (604). In this instance, the border of the cure patterns (604) may act as a mask and the part may be electropolished to remove the portion of the powder grains (602) that protrude beyond the surface of the part (600). The result of this process is shown in FIG. 81. In some instances, the optically defined surface of the part (600) may itself be porous, and as such an electrolyte with appropriate viscosity and surface tension characteristics must be chosen to prevent infiltration into the part (600). Since the material being removed is minimal, and is well masked, this process may be performed rapidly and with minimal additional production cost.

Figure 82:
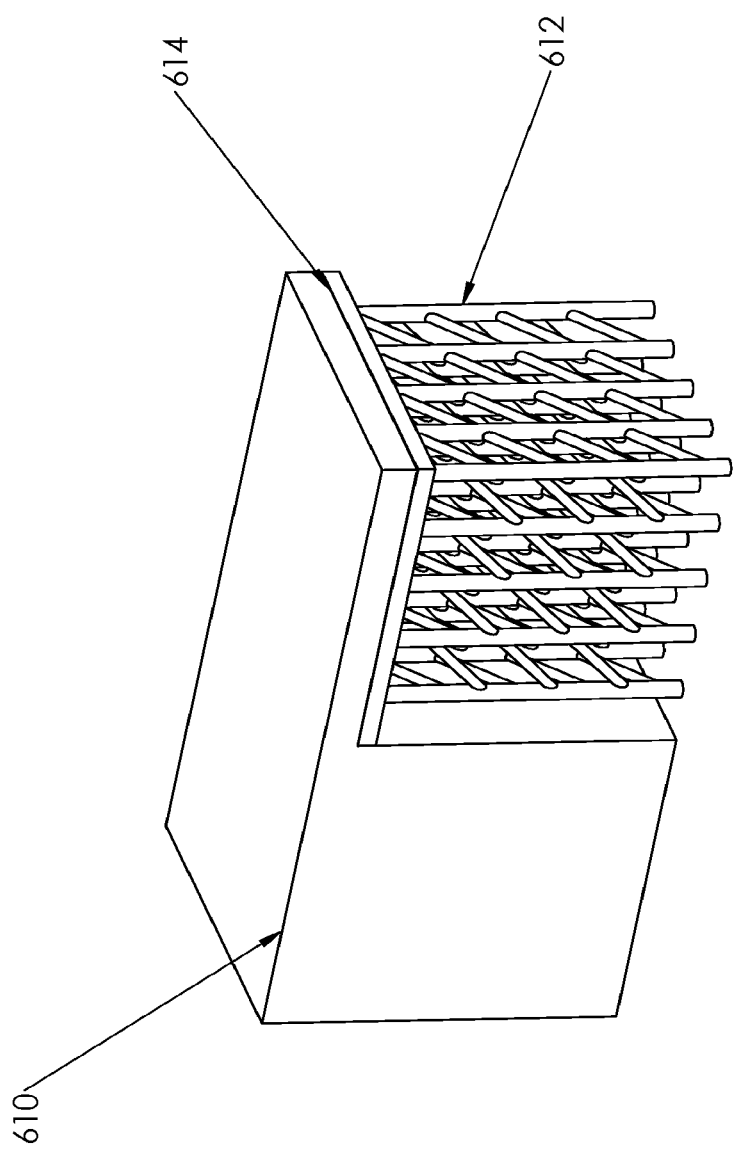
FIG. 82 is an elevated perspective view of a part and support structure that may be built by one or more of the previously described systems.

FIG. 82 depicts a part (610) that may be produced by any of the previously described systems, as well as a support structure (612) that may be produced separately or in conjunction with the part (610). This part (610) contains an overhang that, if unsupported during sintering, would be deformed significantly. By coating the top surface (614) of the support structure (612) with a sintering inhibiting solution and positioning it under the overhang of the part (610), the support structure (612) may assist in supporting the overhang of the part (610) during sintering. An oxidizing agent may be used on the top surface (614) of the support structure (612) to oxidize this surface (614) which will prevent adhesion to the part (610) during sintering, while also preventing deformation of the part (610).

Figure 84:
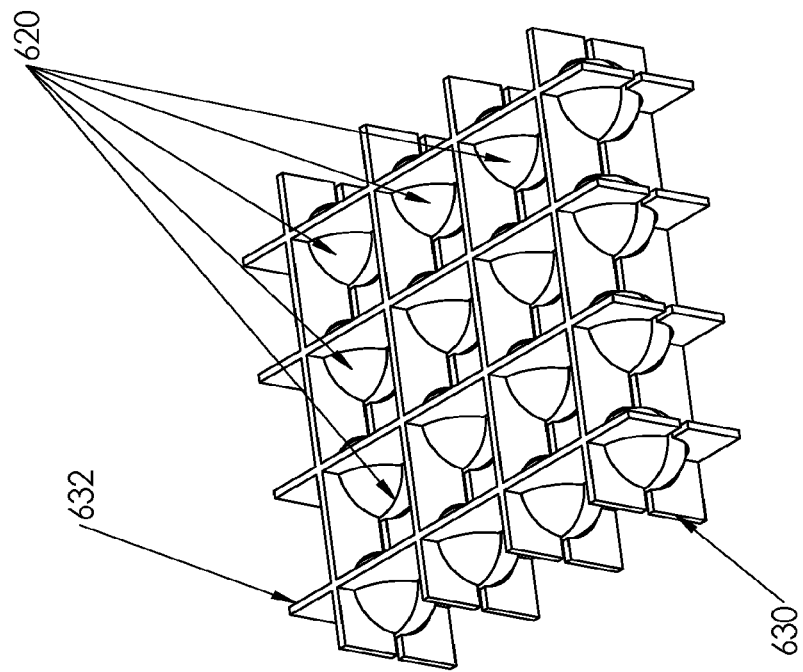
FIG. 84 is an elevated perspective view of the array of parts and support structure in FIG. 83 in a second configuration.
Figure 83:
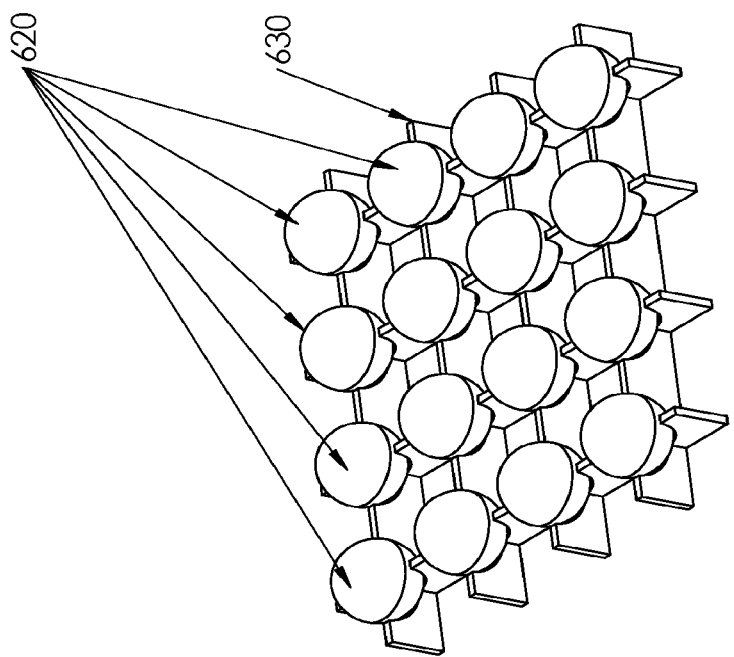
FIG. 83 is an elevated perspective view of an array of parts and support structure that may be built by one or more of the previously described systems.

FIGS. 83-84 depict a method for improving the automation of cleaning and sintering parts that have been printed through any of the previously described methods. FIG. 83 shows an array of parts (620) printed in a batch in combination with a support structure (630). FIG. 84 shows an additional support structure (632) that may assist during the process of removing excess build material from the parts after printing. In many of the previously described systems, there is uncured material surrounding printed parts after the print process has finished. This can be removed via washing in a solvent bath. In the system depicted in FIG. 84, the two support structures (630,632) do not adhere to the parts (620) but act as a rack that can hold the parts (620) in place during cleaning, as well as maintain their positions such that a simple pick and place automation system can move them to another rack for sintering. Additionally, the lower support structure (630) may be used as support during sintering if treated in the manner described in FIG. 82. In general, any non-adhering support structure may be printed in conjunction with arrays of components in order to facilitate the post-processing of many parts simultaneously, thus increasing production efficiency.

Figure 85:
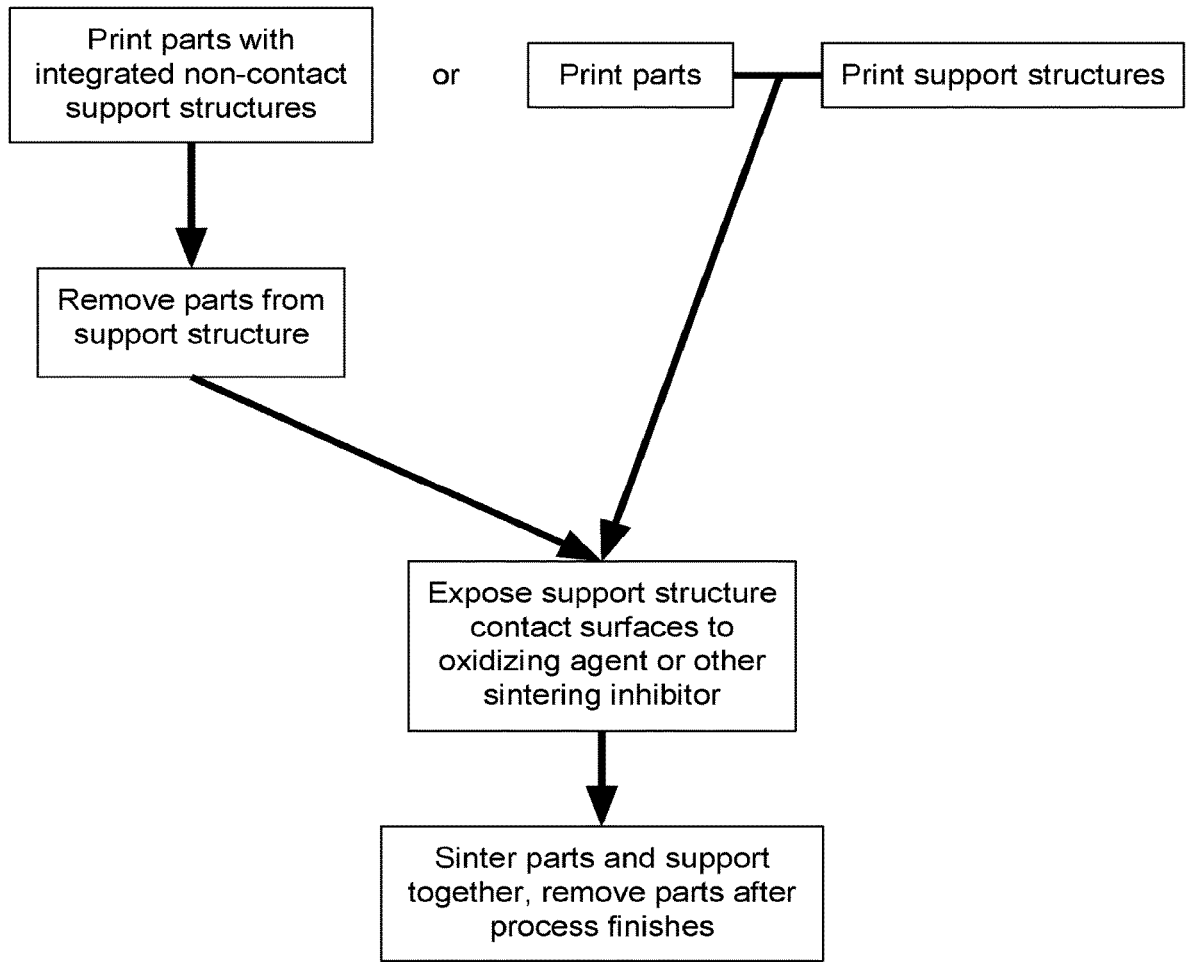
FIG. 85 is a schematic flow chart depicting a process for integrating support structures into a printing and sintering process.

FIG. 85 shows the process used in FIG. 82 as a schematic flow chart, wherein support structures may be printed either integrally or independently of a part or parts, are treated to inhibit adhesion to the part(s) during sintering, and are used as support during the sintering process. This may effectively increase the type of geometries that may be produced through this print-and-sinter method.

Figure 86:
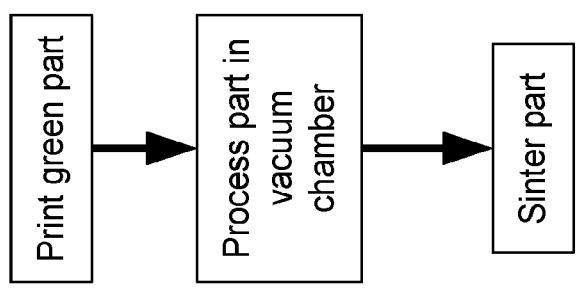
FIG. 86 is a schematic flow chart depicting a process for debinding a printed part.

FIG. 86 shows an additional method for post-processing a printed part. Traditionally, green parts are treated thermally, with a solvent, or with a catalytic process to remove a substantial portion of the binder material to prepare the part for sintering. However, it may be possible to remove a portion of the binder through exposure to vacuum pressures, especially if a portion of the binder material has higher volatility than the other components in the binder. This may provide a high speed, low temperature system for debinding in any of the previously described systems. It is worth nothing that this method is particularly applicable to the previously described systems wherein a porous part is produced; the porous structures built into the part allow for the rapid release of volatilized binder material without distortion or destruction of the part.

Figure 87:
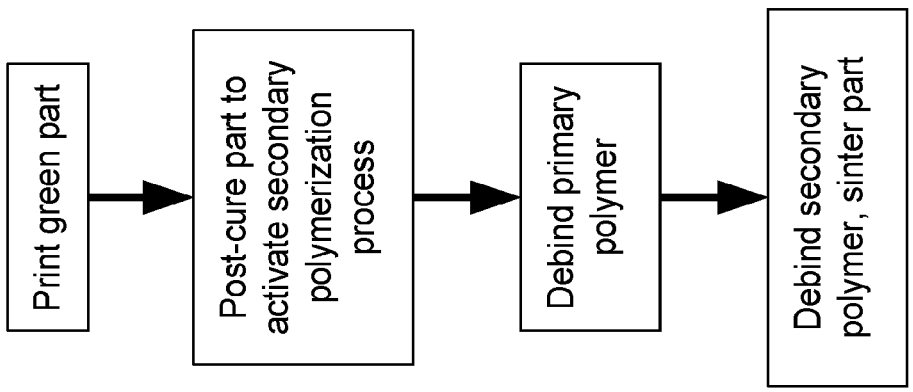
FIG. 87 is a schematic flow chart depicting a method for post-processing a printed part.

FIG. 87 shows an additional method for post-processing a printed part. While the systems described thus far could potentially use a wide variety of binder formulations, it may be advantageous to use a specific blend with multiple types of monomers and multiple curing processes. In particular, if at least one monomer in the formulation may be polymerized through a photopolymerization process (primary monomer), and another monomer (secondary monomer) may be polymerized through a thermal process, and the polymer (primary polymer) formed by curing the primary monomer is soluble in a solvent in which the polymer (secondary polymer) formed by curing the secondary monomer is not soluble, and the secondary polymer has the ability to decompose cleanly in an inert or reducing atmosphere, this may be used with a variety of reactive metal powders to produce sintered metal parts. One such example could use an acrylate system as the primary monomer/polymer, and an olefin system as the secondary monomer/polymer. Though solvent debinding is one option for removing the primary polymer in such a formulation, any formulation in which the primary polymer may be removed without negatively impacting the secondary polymer may be used advantageously. This is of particular interest for metals that cannot be exposed to oxygen during sintering, wherein the most readily photopolymerizable materials may not be able to decompose in an inert or reducing atmosphere, which is the typical atmosphere for processing metals in a sintering process.

While specific combinations of systems have been depicted herein, any combination of the aforementioned subsystems may be implemented to a similar end. Any system which provides for powder deposition, powder infusion, and irradiation, in accordance with any of the previously mentioned methods or systems, may be understood to be an embodiment of the present subject matter.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A method for fabricating a three-dimensional (3d) object, the method comprising:
   delivering a build material to a build surface, wherein the build material comprises a blended composition of a powder material and a binder material;
   increasing a powder loading density of the build material delivered on the build surface; and
   selectively irradiating the build material to alter the physical state of a portion of the build material.

2. The method of claim 1, wherein said delivering the build material to the build surface comprises delivering the build material as a pre-mixed slurry.

3. The method of claim 1, comprising sequentially producing multiple layers of the build material and irradiating the multiple layers of the build material to produce the 3d object.

4. The method of claim 3, wherein selectively irradiating the build material comprises irradiating the build material with a pattern of irradiation such that the object has a structure that allows fluid to flow therethrough.

5. The method of claim 2, wherein said delivering the build material to the build surface comprises:
   lowering the build surface into a vat of build material; and
   moving the build surface by incremental motion away from the vat of build material.

6. The method of claim 2, wherein said delivering the build material to the build surface comprises:
   dispensing layers of the build material onto the build surface; and
   moving the build surface incrementally in a direction away from an imaging system.

7. The method of claim 6, comprising conditioning a surface of the build material delivered on the build surface using a doctoring blade.

8. The method of claim 6, comprising conditioning a surface of the build material delivered on the build surface using a film.

9. The method of claim 8, comprising stabilizing the film with a rigid surface during layer formation.

10. The method of claim 4, wherein said increasing the powder loading density of the build material comprises flowing fluid through the build surface.

11. The method of claim 10, wherein said increasing the powder loading density of the build material comprises flowing fluid through the 3d object being built.

12. The method of claim 2, wherein said increasing the powder loading density of the build material comprises applying ultrasonic agitation to compact the powder material.

13. The method of claim 2, wherein said increasing the powder loading density of the build material comprises at least partially evaporating an at least one component of the binder material.

14. The method of claim 13, wherein the at least one component is a volatile organic solvent.

15. The method of claim 3, wherein said increasing the powder loading density of the build material comprises removing an amount of the binder material from a given layer such that the layer has a porous structure.

* * * * *